US012664408B2

(12) United States Patent
Cleland et al.

(10) Patent No.: US 12,664,408 B2
(45) Date of Patent: Jun. 23, 2026

(54) NEUROMORPHIC ALGORITHM FOR RAPID ONLINE LEARNING AND SIGNAL RESTORATION

(71) Applicant: Cornell University, Ithaca, NY (US)

(72) Inventors: Thomas A. Cleland, Freeville, NY (US); Nabil Imam, San Francisco, CA (US); Ayon Borthakur, Ithaca, NY (US)

(73) Assignee: Cornell University, Ithaca, NY (US)

( * ) Notice: Subject to any disclaimer, the term of this patent is extended or adjusted under 35 U.S.C. 154(b) by 1205 days.

(21) Appl. No.: 17/603,171

(22) PCT Filed: Apr. 10, 2020

(86) PCT No.: PCT/US2020/027728
§ 371 (c)(1),
(2) Date: Oct. 12, 2021

(87) PCT Pub. No.: WO2020/210673
PCT Pub. Date: Oct. 15, 2020

(65) Prior Publication Data
US 2022/0198245 A1 Jun. 23, 2022

Related U.S. Application Data

(60) Provisional application No. 62/832,071, filed on Apr. 10, 2019.

(51) Int. Cl.
| | |
|---|---|
| *G06N 3/049* | (2023.01) |
| *G06N 3/044* | (2023.01) |
| *G06N 3/063* | (2023.01) |

(52) U.S. Cl.
CPC ............. *G06N 3/049* (2013.01); *G06N 3/044* (2023.01); *G06N 3/063* (2013.01)

(58) Field of Classification Search
CPC ........ G06N 3/049; G06N 3/044; G06N 3/063; G06N 3/088
See application file for complete search history.

(56) References Cited

U.S. PATENT DOCUMENTS

| | | |
|---|---|---|
| 9,129,221 B2 | 9/2015 | Piekniewski et al. |
| 2011/0119212 A1 | 5/2011 | De Bruin et al. |

(Continued)

FOREIGN PATENT DOCUMENTS

| | | |
|---|---|---|
| WO | 2018081657 A2 | 5/2018 |
| WO | PCT/US20/27728 | 7/2020 |

OTHER PUBLICATIONS

E. Martinelli et al., "An investigation on the role of spike latency in an artificial olfactory system," Dec. 20, 2011, Front. Neuroeng. (Year: 2011).*

(Continued)

*Primary Examiner* — Kieu D Vu
(74) *Attorney, Agent, or Firm* — Ryan, Mason & Lewis, LLP

(57) ABSTRACT

A computer-implemented method of training a neural network to recognize sensory patterns includes obtaining input data, preprocessing the input data in one or more preprocessors of the neural network, and applying the preprocessed input data to a core portion of the neural network. The core portion of the neural network includes a plurality of principal neurons and a plurality of interneurons, and is configured to implement a feedback loop from the interneurons to the principal neurons that supports persistent unsupervised differentiation of multiple learned sensory patterns over time. The method further includes obtaining an output from the core portion, and performing at least one automated action based at least in part on the output obtained from the core portion. The neural network may be adaptively expanded to facilitate the persistent unsupervised differen- (Continued)

tiation of multiple learned sensory patterns over time by incorporating additional interneurons into at least the core portion.

30 Claims, 14 Drawing Sheets

(56) References Cited

U.S. PATENT DOCUMENTS

| | | |
|---|---|---|
| 2013/0117210 A1 | 5/2013 | Hunzinger et al. |
| 2013/0117213 A1 | 5/2013 | Hunzinger et al. |
| 2013/0297541 A1 | 11/2013 | Piekniewski et al. |
| 2013/0297542 A1 | 11/2013 | Piekniewski et al. |
| 2014/0188771 A1 | 7/2014 | Modha |
| 2014/0229411 A1 | 8/2014 | Richert et al. |
| 2015/0242746 A1 | 8/2015 | Rao et al. |
| 2015/0262054 A1 | 9/2015 | Carey et al. |
| 2016/0004957 A1 | 1/2016 | Solari |
| 2017/0024644 A1 | 1/2017 | Van Der Made et al. |
| 2018/0174041 A1 | 6/2018 | Imam et al. |
| 2018/0174053 A1 | 6/2018 | Lin |

OTHER PUBLICATIONS

J.A. Yamani et al., "Glomerular latency coding in artificial olfaction," Jan. 3, 2012, Front. Neuroeng. (Year: 2012).*

M. Davies et al., "Loihi: A Neuromorphic Manycore Processor with On-Chip Learning," Jan./Feb. 2018, IEEE Micro, vol. 38, No. 1, pp. 82-99. (Year: 2018).*

J. G. Colonna et al., "Feature Subset Selection for Automatically Classifying Anuran Calls Using Sensor Networks," 2012 International Joint Conference on Neural Networks, doi.org/10.1109/IJCNN.2012.6252794, Jun. 2012, 8 pages.

J. J. M. Diaz et al., "Compressive Sensing for Efficiently Collecting Wildlife Sounds with Wireless Sensor Networks," 21st International Conference on Computer Communications and Networks, https://doi.org/10.1109/ICCCN.2012.6289298, Jul. 2012, 7 pages.

D. Dua et al., "UCI Machine Learning Repository," http://archive.ics.uci.edu/ml, University of California, School of Information and Computer Science, 2019, 2 pages.

S. Ioffe et al., "Batch Normalization: Accelerating Deep Network Training by Reducing Internal Covariate Shift," arXiv:1502.03167v3, Mar. 2, 2015, 11 pages.

B. Johnson, "UCI Machine Learning Repository: Forest type mapping Data Set," https://archive.ics.uci.edu/ml/datasets/Forest+type+mapping, 2015, 2 pages.

A. D. Ribas, "Similarity Clustering for Data Fusion in Wireless Sensor Networks using k-means," 2012 IEEE World Congress on Computational Intelligence, Jun. 10-15, 2012, Brisbane, Australia, pp. 488-494.

A. Vergara et al., "UCI Machine Learning Repository: Gas Sensor Array Drift Dataset at Different Concentrations Data Set," https://archive.ics.uci.edu/ml/datasets/Gas+Sensor+Array+Drift+Dataset+at+Different+Concentrations, 2013, 3 pages.

J. D. Whitesell et al., "Interglomerular Lateral Inhibition Targeted on External Tufted Cells in the Olfactory Bulb," The Journal of Neuroscience, vol. 33, No. 4, Jan. 23, 2013, pp. 1552-1563.

R. Beccherelli et al., "Design of a Very Large Chemical Sensor System for Mimicking Biological Olfaction," Sensors and Actuators B: Chemical, vol. 146, 2010, pp. 446-452.

A. Borthakur et al., "A Neuromorphic Transfer Learning Algorithm for Orthogonalizing Highly Overlapping Sensor Array Responses," ISOCS/IEEE International Symposium on Olfaction and Electronic Nose, Montreal, Quebec, Canada, 2017, 3 pages.

J. G. Colonna et al., "An Incremental Technique for Real-Time Bioacoustic Signal Segmentation," Journal of Expert Systems with Applications, vol. 42, No. 21, Nov. 2015, 26 pages.

J. J. Hopfield et al., "Computing with Neural Circuits: A Model," Science, New Series, vol. 233, No. 4764, Aug. 8, 1986, pp. 625-633.

Y.-M. Huang et al., "Fast Image Restoration Methods for Impulse and Gaussian Noises Removal," Institute for Computational Mathematics, Hong Kong Baptist University, May 17, 2008, 22 pages.

R. Huerta et al., "Inhibition in Multiclass Classification," Neural Computation, vol. 24, 2012, pp. 2473-2507.

B. Johnson et al., "Using Geographically Weighted Variables for Image Classification." Remote Sensing Letters, vol. 3, No. 6, Nov. 2012, pp. 491-499.

K. Länge et al., "Surface Acoustic Wave Biosensors: A Review," Analytical and Bioanalytical Chemistry, vol. 391, Feb. 12, 2008, pp. 1509-1519.

W. Maass, "Lower Bounds for the Computational Power of Networks of Spiking Neurons," Neural Computation, vol. 8, 1996, pp. 1-40.

N. Mandairon et al., "Cholinergic Modulation in the Olfactory Bulb Influences Spontaneous Olfactory Discrimination in Adult Rats," European Journal of Neuroscience, vol. 24, 2006, pp. 3234-3244.

S. Panzeri et al., "Sensory Neural Codes Using Multiplexed Temporal Scales," Trends in Neuroscience, vol. 33, No. 3, Jan. 4, 2010, pp. 111-120.

H. Shi et al., "Template-Imprinted Nanostructured Surfaces for Protein Recognition," Nature, vol. 398, Apr. 15, 1999, pp. 593-597.

J. Webster et al., "TruffleBot: Low-Cost Multi-Parametric Machine Olfaction," IEEE Biomedical Circuits and Systems Conference, Cleveland, Ohio, US, Oct. 17-19, 2018, 4 pages.

A. Hasan et al., "Linear Regression-Based Feature Selection for Microarray Data Classification," International Journal of Data Mining and Bioinformatics, vol. 11, Aug. 2015, 9 pages.

D. M. Mehta et al., "Behaving Cyborg Locusts for Standoff Chemical Sensing," IEEE International Symposium on Circuits and Systems, doi: 10.1109/ISCAS.2017.8050610, May 2017, 4 pages.

A. A. Koulakov et al., "Sparse Incomplete Representations: A Potential Role of Olfactory Granule Cells," Neuron, Oct. 6, 2011, pp. 124-136.

J. G. Colonna et al., "How to Correctly Evaluate an Automatic Bioacoustics Classification Method," Conferencia de la Asociación Española para la Inteligencia Artificial, Sep. 2016, 10 pages.

J. G. Colonna et al., "Recognizing Family, Genus, and Species of Anuran Using a Hierarchical Classification Approach," Discovery Science 2016, 15 pages.

R. Huerta et al., "Learning Classification in the Olfactory System of Insects," Neural Computation, vol. 16, Aug. 2004, pp. 1601-1640.

N. Imam et al., "Rapid Online Learning and Robust Recall in a Neuromorphic Olfactory Circuit," Nature Machine Intelligence, vol. 2, No. 3, Mar. 2020, 25 pages.

A. Vergara et al., "Gas Sensor Drift Mitigation using Classifier Ensembles," Sensor KDD'11, Aug. 21, 2011, 9 pages.

T. A. Cleland et al., "A Systematic Framework for Olfactory Bulb Signal Transformations," Frontiers in Computational Neuroscience, Vo. 14, No. 579143, Sep. 23, 2020, 15 pages.

E. Barkai et al., "Acetylcholine and Associative Memory in the Piriform Cortex," Molecular Neurobiology, 1997, 13 pages.

J. Fonollosa et al., "Reservoir Computing Compensates Slow Response of Chemosensor Arrays Exposed to Fast Varying Gas Concentrations in Continuous Monitoring," Sensors and Actuators B: Chemical, vol. 215, 2015, pp. 618-629.

Z. Iskierko et al., "Molecularly Imprinted Polymers for Separating and Sensing of Macromolecular Compounds and Microorganisms," Biotechnology Advances, vol. 24, 2016, pp. 30-46.

C. Kang et al., "Feature Selection and Tumor Classification for Microarray Data Using Relaxed Lasso and Generalized Multi-Class Support Vector Machine," Journal of Theoretical Biology, vol. 463, 2019, pp. 77-91.

M. Levandowsky et al., "Distance between Sets," Nature, vol. 234, Nov. 5, 1971, pp. 34-35.

Q. Liu et al., "Olfactory Cell-Based Biosensor: A First Step Towards a Neurochip of Bioelectronic Nose," Biosensors and Bioelectronics, vol. 22, Mar. 29, 2006, pp. 318-322.

Q. Liu et al., "Gas Recognition under Sensor Drift by Using Deep Learning," International Journal of Intelligent Systems, vol. 30, 2015, pp. 907-922.

(56) References Cited

OTHER PUBLICATIONS

W. Maass, "Paradigms for Computing with Spiking Neurons," in Models of Neural Networks IV: Physics of Neural Networks, Springer, 2002, pp. 373-402.

S. Marco et al., "Signal and Data Processing for Machine Olfaction and Chemical Sensing: A Review," IEEE Sensors Journal, vol. 12, No. 11, Nov. 2012, pp. 3189-3214.

M. Mccloskey et al., "Catastrophic Interference in Connectionist Networks: The Sequential Learning Problem," Psychology of Learning and Motivation, vol. 24, Academic Press, 1989, pp. 109-165.

J. S. Murguia et al., "Two-Dimensional Wavelet Transform Feature Extraction for Porous Silicon Chemical Sensors," Analytica Chimica Acta, vol. 785, 2013, pp. 1-15.

K. Persaud et al., "Analysis of Discrimination Mechanisms in the Mammalian Olfactory System Using a Model Nose," Nature, vol. 299, Sep. 23, 1982, pp. 352-355.

B. W. Strowbridge, "Role of Cortical Feedback in Regulating Inhibitory Microcircuits," International Symposium on Olfaction and Taste, NY Academy of Sciences, vol. 1170, 2009, pp. 270-274.

C. Tang et al., "Gene Selection for Microarray Data Classification via Subspace Learning and Manifold Regularization," Medical and Biological Engineering and Computing, 2018, pp. 1271-1284.

S. Wan, "Analyzing Microarray Data with Classification and Clustering Methods," 2015 Third International Conference on Advanced Cloud and Big Data, 2015, 5 pages.

H. Yin et al., "A Hierarchical Inference Model for Internet-of-Things," IEEE Transactions on Multi-Scale Computing Systems, vol. 4, No. 3, Jul.-Sep. 2018, 12 pages.

T. Hige, "What Can Tiny Mushrooms in Fruit Flies Tell Us About Learning and Memory?" Journal of Neuroscience Research, Apr. 2018, Abstract Only.

W. Maass et al., "Pulsed Neural Networks," MIT Press, 1998, Overview Only.

T. Senator, "Lifelong Learning Machines (L2M)," Defense Advanced Research Projects Agency, https://www.darpa.mil/program/lifelong-learning-machines, 2020, 2 pages.

E. Eaton, "Lifelong Machine Learning," http://lifelongml.org/, Apr. 3, 2020, 2 pages.

Y. Dan et al., "Spike Timing-Dependent Plasticity of Neural Circuits," Neuron, vol. 44, Sep. 30, 2004, pp. 23-30.

S. Song et al., "Competitive Hebbian Learning Through Spike-Timing-Dependent Synaptic Plasticity," Nature Neuroscience, vol. 3, No. 9, Oct. 2000, pp. 919-926.

M. Mayberry, "Intel's New Self-Learning Chip Promises to Accelerate Artificial Intelligence," https://newsroom.intel.com/editorials/intels-new-self-learning-chip-promises-accelerate-artificial-intelligence/#gs.2qg172, Sep. 25, 2017, 7 pages.

Y. Lecun, "Facebook Blog," https://bit.ly/2U6hlCU, Feb. 23, 2019, 2 pages.

W. Maass et al., "Real-Time Computing Without Stable States: A New Framework for Neural Computation Based on Perturbations," Neural Computation, 2002, 22 pages.

W. Maass et al., "On the Computational Power of Circuits of Spiking Neurons." Journal of Computer and System Sciences, vol. 69, Mar. 2004, pp. 593-616.

T. Masquelier et al., "Oscillations, Phase-of-Firing Coding, and Spike Timing-Dependent Plasticity: an Efficient Learning Scheme," The Journal of Neuroscience, vol. 29, No. 43, Oct. 28, 2009, pp. 13484-13493.

P. Ferre et al., "Unsupervised Feature Learning With Winner-Takes-All Based STDP," Frontiers in Computational Neuroscience, vol. 12, No. 24, Apr. 5, 2018, 12 pages.

S. R. Kheradpisheh et al., "STDP-Based Spiking Deep Convolutional Neural Networks for Object Recognition," Neural Networks, vol. 99, Dec. 23, 2017, pp. 56-67.

S. Klampfl et al., "Emergence of Dynamic Memory Traces in Cortical Microcircuit Models Through STDP," The Journal of Neuroscience, vol. 33, No. 28, Jul. 10, 2013, pp. 11515-11529.

D. Kappel et al., "STDP Installs in Winner-Take-All Circuits an Online Approximation to Hidden Markov Model Learning," PLoS Computational Biology, vol. 10, No. 3, Mar. 27, 2014, 22 pages.

D. Pecevski et al., "Learning Probabilistic Inference through Spike-Timing-Dependent Plasticity," eNeuro, vol. 3, No. 2, Mar. 25, 2016, 34 pages.

M. Davies et al., "A Nueromorphic Manycore Processor with On-Chip Learning," IEEE Micro, vol. 38, No. 1, Jan. 16, 2018, doi:10.1109/MM.2018.112130359, 10 pages.

S. K. Esser et al., "Convolutional Networks for Fast, Energy-Efficient Neuromorphic Computing," Proceedings of the National Academy of Sciences of the United States of America, vol. 113, No. 41, Oct. 11, 2016, pp. 11441-11446.

P. A. Bogdan et al., "Structural Plasticity on the SpinNaker Many-Core Neuromorphic System," Frontiers in Neuroscience, vol. 12, No. 434, Jul. 2, 2018, 20 pages.

M. Mikaitis et al., "Neuromodulated Synaptic Plasticity on the SpinNaker Neuromorphic System," vol. 12, No. 105, Feb. 27, 2018, 13 pages.

M. A. Petrovici et al., "Characterization and Compensation of Network-Level Anomalies in Mixed-Signal Neuromorphic Modeling Platforms," PLoS ONE, vol. 9, No. 10, Oct. 2014, 30 pages.

G. Haessig et al., "Spiking Optical Flow for Event-based Sensors Using IBM's TrueNorth Neurosynaptic System," IEEE Trans Biomed Circuits System, arXiv:1710.09820v1, Oct. 26, 2017, 11 pages.

N. Imam et al., "Implementation of Olfactory Bulb Glomerular-Layer Computations in a Digital Neurosynaptic Core," Frontiers in Neuroscience, vol. 6, No. 83, Jun. 6, 2012, 13 pages.

J. Kirkpatrick et al., "Overcoming Catastrophic Forgetting in Neural Networks," Proceedings of the National Academy of Sciences of the United States of America, vol. 114, No. 13, Mar. 28, 2017, pp. 3521-3526.

G. M. Hoerzer et al., "Emergence of Complex Computational Structures From Chaotic Neural Networks Through Reward-Modulated Hebbian Learning," Cerebral Cortex, vol. 24, Mar. 2014, pp. 677-690.

H. Jaeger, "The 'Echo State' Approach to Analysing and Training Recurrent Neural Networks," German National Research Center for Information Technology GMD Technical Report, Jan. 26, 2010, 47 pages.

H. Jaeger et al., "Optimization and Applications of Echo State Networks with Leaky Integrator Neurons," Neural Networks, vol. 20, No. 3, Apr. 1, 2007, 42 pages.

A. Vergara et al., "Sensor Selection and Chemo-Sensory Optimization: Toward an Adaptable Chemo-Sensory System," Frontiers in Neuroengineering, vol. 4, No. 19, Jan. 2012, 21 pages.

J. Fonollosa et al., "Chemical Discrimination in Turbulent Gas Mixtures with MOX Sensors Validated by Gas Chromatography-Mass Spectrometry," Sensors, vol. 14, Oct. 16, 2014, pp. 19336-19353.

A. Vergara et al., "On the Performance of Gas Sensor Arrays in Open Sampling Systems Using Inhibitory Support Vector Machines," Sensors and Actuators B: Chemical, Aug. 2013, 43 pages.

M. Schmuker et al., "Parallel Representation of Stimulus Identity and Intensity in a Dual Pathway Model Inspired by the Olfactory System of the Honeybee," Frontiers in Neuroengineering, vol. 4, No. 17, Dec. 28, 2011, 13 pages.

J. A. Yamani et al., "Glomerular Latency Coding in Artificial Olfaction," Frontiers in Neuroengineering, vol. 4, No. 18, Jan. 3, 2012, 9 pages.

E. Martinelli et al., "An Investigation on the Role of Spike Latency in an Artificial Olfactory System," Frontiers in Neuroengineering, vol. 4, No. 16, Dec. 20, 2011, 12 pages.

A. Capurro et al., "Non-linear Blend Coding in the Moth Antennal Lobe Emerges from Random Glomerular Networks," Frontiers in Neuroengineering, vol. 5, No. 6, Apr. 19, 2012, 16 pages.

M. Schmuker et al., "A Neuromorphic Network for Generic Multivariate Data Classification," Proceedings of the National Academy of Sciences of the United States of America, vol. 111, No. 6, Feb. 11, 2014, pp. 2081-2086.

M. Schmuker et al., "Processing and Classification of Chemical Data Inspired by Insect Olfaction," Proceedings of the National

(56) References Cited

OTHER PUBLICATIONS

Academy of Sciences of the United States of America, vol. 104, No. 51, Dec. 18, 2007, pp. 20285-20289.

T. A. Cleland, "Construction of Odor Representations by Olfactory Bulb Microcircuits," Progress in Brain Research, vol. 208, 2014, pp. 177-203.

T. A. Cleland et al., "Non-Topographical Contrast Enhancement in the Olfactory Bulb," BMC Neuroscience, vol. 7, No. 7, Jan. 24, 2006, 18 pages.

C. B. Delahunt et al., "Biological Mechanisms for Learning: A Computational Model of Olfactory Learning in the Manduca sexta Moth, With Applications to Neural Nets," Frontiers in Computational Neuroscience, vol. 12, No. 102, Dec. 19, 2018, 20 pages.

C. Assisi et al., "Synaptic Inhibition Controls Transient Oscillatory Synchronization in a Model of the Insect Olfactory System," Frontiers in Engineering, vol. 5, No. 7, Apr. 18, 2012, 10 pages.

A. Diamond et al., "Classifying Continuous, Real-time e-Nose Sensor Data Using a Bio-inspired Spiking Network Modelled on the Insect Olfactory System," Bioinspiration & Biomimetics, vol. 11, Feb. 2016, 12 pages.

T. Nowotny et al., "Self-Organization in the Olfactory System: One Shot Odor Recognition in Insects," Biological Cybernetics, vol. 93, No. 6, Nov. 17, 2005, 10 pages.

C. Linster et al., "Decorrelation of Odor Representations via Spike Timing Dependent Plasticity," Frontiers in Computational Neuroscience, vol. 4, No. 157, Dec. 28, 2010, 11 pages.

T. A. Cleland et al., "Relational Representation in the Olfactory System," Proceedings of the National Academy of Sciences of the United States of America, vol. 104, No. 6, Feb. 6, 2007, pp. 1953-1958.

G. Li et al., "A Two-Layer Biophysical Model of Cholinergic Neuromodulation in Olfactory Bulb," The Journal of Neuroscience, vol. 33, No. 7, Feb. 13, 2013, pp. 3037-3058.

Y. Chen et al., "The Sparse Manifold Transform," arXiv 1806. 08887, Dec. 2, 2018, 18 pages.

R. Alanni et al., "A Novel Gene Selection Algorithm for Cancer Classification Using Microarray Datasets," BMC Medical Genomics, vol. 12, No. 10, Jan. 15, 2019, 12 pages.

Z. Li et al., "Efficient Feature Selection and Classification for Microarray Data," PLoS One, Aug. 20, 2018, 21 pages.

J. Yang et al., "Iterative Ensemble Feature Selection for Multiclass Classification of Imbalanced Microarray Data," Journal of Biological Research, Thessalonike, Greece; vol. 23 (Suppl 1), No. 13, Apr. 30, 2016, 9 pages.

H. Saini et al., "Gene Masking—A Technique to Improve Accuracy for Cancer Classification with High Dimensionality in Microarray Data," BMC Medical Genomics, vol. 9 (Suppl 3), No. 74, Dec. 5, 2016, pp. 263-269.

H. Alshamlan et al., "mRMR-ABC: A Hybrid Gene Selection Algorithm for Cancer Classification Using Microarray Gene Expression Profiling," BioMed Research International, vol. 9, May 2015, 15 pages.

H. Saberkari et al., "Cancer Classification in Microarray Data using a Hybrid Selective Independent Component Analysis and u-Support Vector Machine Algorithm," Journal of Medical Signals and Sensors, vol. 4, No. 4, Oct.-Dec. 2014, 9 pages.

J. Fonollosa et al., "Quality Coding by Neural Populations in the Early Olfactory Pathway: Analysis Using Information Theory and Lessons for Artificial Olfactory Systems," PLoS One, vol. 7, No. 6, Jun. 18, 2012, 9 pages.

S. Marco et al., "A Biomimetic Approach to Machine Olfaction, Featuring a Very Large-Scale Chemical Sensor Array and Embedded Neuro-Bio-Inspired Computation," Microsystem Technologies, vol. 20, No. 4-5, Apr. 2014, pp. 729-742.

R. Huerta et al., "Bio-Inspired Solutions to the Challenges of Chemical Sensing," Frontiers in Neuroengineering, vol. 5, No. 24, Oct. 29, 2012, 2 pages.

V. M. Luna et al., "GABAergic Circuits Control Input-Spike Coupling in the Piriform Cortex," Journal of Neuroscience, vol. 28, No. 35, Aug. 27, 2008, pp. 8851-8859.

D. E. Feldman, "The Spike-Timing Dependence of Plasticity," Neuron, vol. 75, No. 4, Aug. 23, 2012, pp. 556-571.

P. Vincent et al., "Stacked Denoising Autoencoders: Learning Useful Representations in a Deep Network with a Local Denoising Criterion," Journal of Machine Learning Research vol. 11, Dec. 2010, pp. 3371-3408.

J. Xie et al., "Image Denoising and Inpainting with Deep Neural Networks," Proceedings of the 25th International Conference on Neural Information Processing Systems, Lake Tahoe, NV, 2012, 9 pages.

P. Ardin et al., "Using an Insect Mushroom Body Circuit to Encode Route Memory in Complex Natural Environments," PLoS Computational Biology, vol. 12, No. 2, Feb. 11, 2016, 22 pages.

Y. Bengio et al., "Towards Biologically Plausible Deep Learning," arXiv:1502.04156v3 [cs.LG], Aug. 9, 2016, 10 pages.

N. A. Cayco-Gajic et al., "Re-evaluating Circuit Mechanisms Underlying Pattern Separation," Neuron, vol. 101, No. 4, Feb. 20, 2019, 40 pages.

A. Diamond et al., "An unsupervised Neuromorphic Clustering Algorithm," Biological Cybernetics, vol. 113, No. 4, Aug. 2019, pp. 423-437.

P. U. Diehl et al., "TrueHappiness: Neuromorphic Emotion Recognition on TrueNorth," arXiv:1601.04183v1 [q-bio.NC], Jan. 16, 2016, 8 pages.

D. H. Gire et al., "Mitral Cells in the Olfactory Bulb are Mainly Excited through a Multistep Signaling Path," The Journal of Neuroscience, vol. 32, No. 9, Feb. 29, 2012, pp. 2964-2975.

J. Gonzalez et al., "The Multi-Chamber Electronic Nose (MCE-nose)," IEEE International Conference on Mechatronics, doi:10. 1109/ICMECH.2011.5971193, Apr. 2011, 6 pages.

R. Huerta et al., "Fast and Robust Learning by Reinforcement Signals: Explorations in the Insect Brain," Neural Computation, vol. 21, Sep. 2009, pp. 2123-2151.

N. Iman et al., "Rapid Online Learning and Robust Recall in a Neuromorphic Olfactory Circuit," arXiv:1906.07067, Jun. 17, 2019, 60 pages.

R. Kemker et al., "FearNet: Brain-Inspired Model for Incremental Learning," arXiv:1711.10563v2, Feb. 23, 2018, 16 pages.

D. P. Kingma et al., "Adam: A Method for Stochastic Optimization," arXiv:1412.6980v9, Jan. 30, 2017, 15 pages.

G. Lepousez et al., "Odor Discrimination Requires Proper Olfactory Fast Oscillations in Awake Mice," Neuron, vol. 80, No. 4, Nov. 20, 2013, pp. 1010-1024.

Z. Ma et al., "Online Sensor Drift Compensation for E-Nose Systems Using Domain Adaptation and Extreme Learning Machine," Sensors, vol. 18, No. 742, Mar. 1, 2018, 29 pages.

W. Maass, "To Spike or Not to Spike: That is the Question," Proceeding of the IEEE, vol. 103, No., Dec. 2015, pp. 2219-2224.

N. Mandairon et al., "Opposite Regulation of Inhibition by Adult-Born Granule Cells During Implicit Versus Explicit Olfactory Learning," eLife, DOI: 10.7554/eLife.34976, Feb. 28, 2018, 14 pages.

S. Nagayama et al., "Neuronal Organization of Olfactory Bulb Circuits," Frontiers in Neural Circuits, vol. 8, No. 98, Sep. 3, 2014, 19 pages.

B. Nessler et al., "STDP Enables Spiking Neurons to Detect Hidden Causes of Their Inputs," Advances in Neural Information Processing Systems, vol. 22, Jan. 2010, 9 pages.

P. O'Connor et al., "Temporally Efficient Deep Learning with Spikes," arXiv:1706.04159v1, Jun. 13, 2017, 11 pages.

F. Peng et al., "A Simple Computational Model of the Bee Mushroom Body Can Explain Seemingly Complex Forms of Olfactory Learning and Memory," Current Biology, vol. 27, No. 2, Jan. 23, 2017, pp. 224-230.

K. Persaud et al., "Neuromorphic Olfaction," Frontiers in Neuroengineering, Boca Raton (FL): CRC Press/Taylor & Francis; 2013, 111 pages.

N. Qiao et al., "A Reconfigurable On-line Learning Spiking Neuromorphic Processor Comprising 256 Neurons and 128K Synapses," Frontiers in Neuroscience, vol. 9, No. 141, Apr. 29, 2015, 17 pages.

B. Raman et al., "Mixture Segmentation and Background Suppression in Chemosensor Arrays with a Model of Olfactory Bulb-Cortex

(56)　　　　　References Cited

OTHER PUBLICATIONS

Interaction," Proceedings 2005 IEEE International Joint Conference on Neural Networks, Montreal, Canada, Jul. 31-Aug. 4, 2005, 6 pages.

B. Raman et al., "Processing of Chemical Sensor Arrays with a Biologically Inspired Model of Olfactory Coding," IEEE Transactions on Neural Networks, vol. 17, No. 4, Jul. 2006, pp. 1015-1024.

I. Rodriguez-Lujan et al., "On the Calibration of Sensor Arrays for Pattern Recognition using the Minimal Number of Experiments," Chemometrics and Intelligent Laboratory Systems, vol. 130, 2014, pp. 123-134.

J. T. Schmiedt et al., "Spike Timing-Dependent Plasticity as Dynamic Filter," Advances in Neural Information Processing Systems, vol. 23, 2010, 9 pages.

E. Chicca et al., "Neuromorphic Sensors, Olfaction," Encyclopedia of Computational Neuroscience, doi:10.1007/978-1-4614-6675-8_119, 7 pages.

J. Serra et al., "Overcoming Catastrophic Forgetting with Hard Attention to the Task," arXiv:1801.01423v3, May 29, 2018, 17 pages.

E. Serrano et al., "Gain Control Network Conditions in Early Sensory Coding," PLoS Computational Biology, vol. 9, No. 7, Jul. 18, 2013, 13 pages.

R. Velez et al., "Diffusion-Based Neuromodulation Can Eliminate Catastrophic Forgetting in Simple Neural Networks," PLoS One, doi:10.1371/journal.pone.0187736, Nov. 16, 2017, 24 pages.

W. Xiong et al., "Dynamic Gating of Spike Propagation in the Mitral Cell Lateral Dendrites," Neuron, vol. 34, Mar. 28, 2002, pp. 115-126.

K. Yan et al., "Correcting Instrumental Variation and Time-Varying Drift Using Parallel and Serial Multitask Learning," IEEE Transactions on Instrumentation and Measurement, vol. 66, Jun. 2017, pp. 2306-2316.

Q. Zaidi et al., "Perceptual Spaces: Mathematical Structures to Neural Mechanisms," The Journal of Neuroscience, vol. 33, No. 45, Nov. 6, 2013, pp. 17597-17602.

F. Zenke et al., "Continual Learning Through Synaptic Intelligence," arXiv:1703.04200v3, Jun. 12, 2017, 10 pages.

L. Zhang et al., "Domain Adaptation Extreme Learning Machines for Drift Compensation in E-nose Systems," IEEE Transactions on Instrumentation and Measurement, doi:10.1109/TIM.2014.2367775, 2015, 11 pages.

Y. Zhang et al., "A Gas Sensor Array for the Simultaneous Detection of Multiple VOCs," Scientific Reports, vol. 7, No. 1960, May 16, 2017, 8 pages.

M. J. Berry II et al., "Functional Diversity in the Retina Improves the Population Code," Neural Computation, vol. 31, No. 2, Feb. 2019, pp. 270-311.

J. Bjorck et al., "Understanding Batch Normalization," arXiv:1806.02375v4, Nov. 30, 2018, 24 pages.

T. A. Cleland, "Early Transformations in Odor Representation," Trends in Neurosciences, vol. 33, No. 3, Jan. 8, 2010, pp. 130-139.

J. Colonna et al., "Automatic Classification of Anuran Sounds Using Convolutional Neural Networks," Proceedings of the Ninth International C* Conference on Computer Science & Software Engineering, Jul. 2016, pp. 73-78.

J. G. Colonna et al., "A Distribute Approach for Classifying Anuran Species Based on Their Calls," Proceedings of the 2014 22nd International Conference on Pattern Recognition, Aug. 2014, pp. 1242-1247.

J. G. Colonna et al., "How to Correctly Evaluate an Automatic Bioacoustics Classification Method," Conference Paper, Sep. 2016, 11 pages.

J. G. Colonna et al., "Recognizing Family, Genus, and Species of Anuran Using a Hierarchical Classification Approach," Conference Paper, Oct. 2016, 15 pages.

J. G. Colonna et al., UCI Machine Learning Repository: Anuran Calls (MFCCs) Data Set, http://archive.ics.uci.edu/ml/datasets/Anuran+Calls+%28MFCCs%29, 2019, 3 pages.

E. Lotfi et al., "Gene expression microarray classification using PCA-BEL," Computers in Biology and Medicine, vol. 54, Nov. 2014, pp. 180-187.

B. Liao et al., "Learning a Weighted Meta-Sample Based Parameter Free Sparse Representation Classification for Microarray Data," PLoS One, vol. 9, No. 8, Aug. 12, 2014, 12 pages.

J. Bennet et al., "A Discrete Wavelet Based Feature Extraction and Hybrid Classification Technique for Microarray Data Analysis," The Scientific World Journal, doi.org/10.1155/2014/195470, Aug. 6, 2014, 9 pages.

D. Rinberg et al., "Sparse Odor Coding in Awake Behaving Mice," The Journal of Neuroscience, vol. 26, No. 24, Aug. 23, 2006, pp. 8857-8865.

S. A. Goff et al., "Plant Volatile Compounds: Sensory Cues for Health and Nutritional Value?" Science, vol. 311, Feb. 10, 2006, pp. 815-819.

R. C. Araneda et al., "The Molecular Receptive Range of an Odorant Receptor," Nature Neuroscience, vol. 3, No. 12, Dec. 2000, pp. 1248-1255.

R. C. Araneda et al., "A Pharmacological Profile of the Aldehyde Receptor Repertoire in Rat Olfactory Epithelium," The Journal of Physiology, vol. 555.3, Jan. 14, 2004, pp. 743-756.

J. P. Rospars, "Interactions of Odorants with Olfactory Receptors and Other Preprocessing Mechanisms: How Complex and Difficult to Predict?" Chemical Senses, vol. 38, No. 4, May 2013, pp. 283-387.

J. P. Rospars et al., "Competitive and Noncompetitive Odorant Interactions in the Early Neural Coding of Odorant Mixtures," The Journal of Neuroscience, vol. 28, No. 10, Mar. 5, 2008, pp. 2659-2666.

B. Raman et al., "Mimicking Biological Design and Computing Principles in Artificial Olfaction," ACS Chemical Neuroscience, vol. 2, No. 9, May 27, 2011, pp. 487-499.

B. Bathellier et al., "Circuit Properties Generating Gamma Oscillations in a Network Model of the Olfactory Bulb," Journal of Neurophysiology, vol. 95, No. 4, 2006, pp. 2678-2691.

G. Li et al., "A Coupled-Oscillator Model of Olfactory Bulb Gamma Oscillations," PLoS Computational Biology, doi.org/10.1371/journal.pcbi.1005760, Nov. 15, 2017, 36 pages.

S. T. Peace et al., "Coherent Olfactory Bulb Gamma Oscillations Arise From Coupling Independent Columnar Oscillators," bioRxiv, doi.org/10.1101/213827, Nov. 3, 2017, 36 pages.

H. Kashiwadani et al., "Synchronized Oscillatory Discharges of Mitral/Tufted Cells With Different Molecular Receptive Ranges in the Rabbit Olfactory Bulb," Journal of Neurophysiology, vol. 82, No. 4, Oct. 1, 1999, pp. 1786-1792.

T. A. Cleland et al., "Sequential Mechanisms Underlying Concentration Invariance in Biological Olfaction," Frontier in Neuroengineering, vol. 4, No. 21, Jan. 5, 2012, 12 pages.

P. Miller, "Itinerancy Between Attractor States in Neural Systems," Current Opinion in Neurobiology, doi:10.1016/j.conb.2016.05.005. vol. 40, Oct. 2016, 18 pages.

M. T. Tong et al., "Kinase Activity in the Olfactory Bulb is Required for Odor Memory Consolidation," Learning & Memory, vol. 25, No. 5, Apr. 16, 2018, pp. 198-205.

A. Banerjee et al., "An Interglomerular Circuit Gates Glomerular Output and Implements Gain Control in the Mouse Olfactory Bulb," Neruon, vol. 87, No. 1, Jul. 1, 2015, pp. 193-207.

M. W. Chu et al., "Lack of Pattern Separation in Sensory Inputs to the Olfactory Bulb during Perceptual Learning," eNeuro, vol. 4, No. 5, Sep. 27, 2017, 25 pages.

W. Doucette et al., "Profound Context-Dependent Plasticity of Mitral Cell Responses in Olfactory Bulb," PLoS Biology, vol. 6, No. 10, Oct. 28, 2008, pp. 2266-2285.

S. Sultan et al., "Learning-Dependent Neurogenesis in the Olfactory Bulb Determines Long-Term Olfactory Memory," The FASEB Journal, vol. 24, No. 7, Mar. 2010, pp. 2355-2363.

M. M. Moreno et al., "Olfactory Perceptual Learning Requires Adult Neurogenesis," Proceedings of the National Academy of Sciences of the United States of America, vol. 106, No. 42, Oct. 20, 2009, pp. 17980-17985.

(56)     References Cited

OTHER PUBLICATIONS

Y. Gao et al., "Long-Term Plasticity of Excitatory Inputs to Granule Cells in the Rat Olfactory Bulb," Nature Neuroscience, vol. 12, No. 6, Jun. 2019, 6 pages.

G. Lepousez et al., "Olfactory Learning Promotes Input-Specific Synaptic Plasticity in Adult-Born Neurons," Proceedings of the National Academy of Sciences of the United States of America, vol. 111, No. 38, Sep. 23, 2014, pp. 13987-13989.

L. De Almeida et al., "A Model of Cholinergic Modulation in Olfactory Bulb and Piriform Cortex," Journal of Neurophysiology, vol. 109, No. 5, Mar. 1, 2013, pp. 1360-1377.

S. Devore et al., "Noradrenergic and Cholinergic Modulation of Olfactory Bulb Sensory Processing," Frontiers in Behavioral Neuroscience, vol. 6, No. 52, Aug. 13, 2012, 12 pages.

G. Li et al., "Functional Differentiation of Cholinergic and Noradrenergic Modulation in a Biophysical Model of Olfactory Bulb Granule Cells," Journal of Neurophysiology, vol. 114, No. 6, Dec. 2015, pp. 3177-3200.

F. Kermen et al., "Consolidation of an Olfactory Memory Trace in the Olfactory Bulb is Required for Learning-Induced Survival of Adult-Born Neurons and Long-Term Memory," PLoS One, vol. 5, No. 8, Aug. 13, 2010, 9 pages.

G. Lepousez et al., "The Impact of Adult Neurogenesis on Olfactory Bulb Circuits and Computations," Annual Review of Physiology, doi: 10.1146/annurev-physiol-030212-183731, vol. 75, 2013, pp. 339-363.

A. B. R. Mcintyre et al., "Biophysical Constraints on Lateral Inhibition in the Olfactory Bulb," Journal of Neurophysiology, vol. 115, No. 6, Jun. 7, 2016, pp. 2937-2949.

S. Lagier et al., "GABAergic Inhibition at Dendrodendritic Synapses Tunes $\gamma$ Oscillations in the Olfactory Bulb," Proceedings of the National Academy of Sciences of the United States of America, vol. 104, No. 17, Apr. 24, 2007, pp. 7259-7264.

T. S. Mctavish et al., "Mitral Cell Spike Synchrony Modulated by Dendrodendritic Synapse Location," Frontiers in Computational Neuroscience, vol. 6, No. 3, Jan. 30, 2012, 12 pages.

A. Borthakur et al., "Signal Conditioning for Learning in the Wild," Proceedings of the 7th Annual Neuro-inspired Computational Elements Workshop, Mar. 26-28, 2019, Albany, NY, USA, 11 pages.

A. Borthakur et al., "A Spike Time-Dependent Online Learning Algorithm Derived From Biological Olfaction," Frontiers in Neuroscience, vol. 13, No. 656, Jun. 27, 2019, 14 pages.

R. M. French, "Catastrophic Forgetting in Connectionist Networks: Causes, Consequences and Solutions," Trends in Cognitive Sciences, vol. 3, No. 4, Apr. 1999, pp. 128-135.

S. F. Chow et al., "Neurogenesis Drives Stimulus Decorrelation in a Model of the Olfactory Bulb," PLoS Computational Biology, vol. 8, No. 3, Mar. 15, 2012, 18 pages.

M. M. Moreno et al., "Action of the Noradrenergic System on Adult-Born Cells is Required for Olfactory Learning in Mice," The Journal of Neuroscience, vol. 32, No. 11, Mar. 14, 2012, pp. 3748-3758.

M. E. Hasselmo et al., "Cholinergic Modulation of Cortical Function," Journal of Molecular Neuroscience, 10.1385/JMN:30:1:133, vol. 30, No. 1-2, 2006, pp. 133-135.

N. Mandairon et al., "Context-Driven Activation of Odor Representations in the Absence of Olfactory Stimuli in the Olfactory Bulb and Piriform Cortex," Frontiers in Behavioral Neuroscience, vol. 8, No. 138, Apr. 29, 2014, 11 pages.

W. Adams et al., "Top-Down Inputs Drive Neuronal Network Rewiring and Context-Enhanced Sensory Processing in Olfaction," PLoS Computational Biology, https://doi.org/10.1371/journal.pcbi.1006611, Jan. 22, 2019, 27 pages.

J. J. Hopfield, "Neural Networks and Physical Systems with Emergent Collective Computational Abilities," Proceedings of the National Academy of Sciences of the United States of America, vol. 79, No. 8, Apr. 1, 1982, pp. 2554-2558.

C. J. Rozell et al., "Sparse Coding via Thresholding and Local Competition in Neural Circuits," Neural Computation, vol. 20, No. 10, Oct. 2008, 28 pages.

Y. Burak et al., "Accurate Path Integration in Continuous Attractor Network Models of Grid Cells," PLoS Computational Biology, vol. 5, No. 2, Feb. 20, 2009, 16 pages.

H. S. Seung "How the Brain Keeps the Eyes Still," Proceedings of the National Academy of Sciences of the United States of America, vol. 93, Nov. 1996, pp. 13339-13344.

J. J. Hopfield, "Pattern Recognition Computation using Action Potential TIming for Stimulus Representation," Nature, vol. 376, Jul. 6, 1995, pp. 33-36.

E. M. Izhikevich, "Polychronization: Computation with Spikes," Neural Computation, vol. 18, No. 2, Feb. 2006, pp. 245-282.

S. J. Thorpe et al., "Spike-Based Strategies for Rapid Processing," Neural Networks, vol. 14, No. 6-7, Jul.-Sep. 2001, 28 pages.

P. A. Merolla et al., "A Million Spiking-Neuron Integrated Circuit with a Scalable Communication Network and Interface," Science, vol. 345, No. 6197, Aug. 8, 2014, 40 pages.

J. W. Gardner et al., "Guest Editorial—Special Issue on Machine Olfaction," IEEE Sensors Journal, vol. 12, No. 11, Nov. 2012, pp. 3105-3107.

A. Vanarse et al., "An Investigation into Spike-Based Neuromorphic Approaches for Artificial Olfactory Systems," Sensors, vol. 17, No. 11, Nov. 10, 2017, 16 pages.

* cited by examiner

EXCITATORY PLASTICITY

INHIBITORY PLASTICITY

× MCs SPIKE IN PERMISSIVE PHASE OF GAMMA
○ GCs SPIKE IN INHIBITORY PHASE OF GAMMA (a)

(b)

NEUROMORPHIC ALGORITHM FOR RAPID ONLINE LEARNING AND SIGNAL RESTORATION

CROSS-REFERENCE TO RELATED APPLICATION(S)

The present application claims priority to U.S. Provisional Patent Application Ser. No. 62/832,071, filed Apr. 10, 2019 and entitled "Neuromorphic Algorithm for Rapid Online Learning and Signal Restoration," which is incorporated by reference herein in its entirety.

STATEMENT OF GOVERNMENT SUPPORT

This invention was made with government support under Grant Nos. R01 DC012249, R01 DC014367 and R01 DC014701 of the National Institutes of Health (NIH). The government has certain rights in the invention.

FIELD

The field relates generally to information processing systems, and more particularly to processing algorithms implemented in neural networks in such systems.

BACKGROUND

Machine learning systems for rapid and reliable pattern recognition have a vast plethora of applications, from visual object recognition to air quality control to waste identification to signal detection. A correspondingly wide range of machine learning implementations have been developed to address these applications, ranging from traditional machine learning algorithms to deep neural networks that are able to learn and recognize arbitrarily complex patterns via extensive training. The state of the art in deep networks, however, exhibits a number of well-known weaknesses that are the focus of intensive study and development. These include catastrophic forgetting, in which networks rapidly lose their memories for trained exemplars when subsequent training is not carefully structured to retain this information (e.g., via retraining with previous training samples intercalated with the new training), vulnerability to adversarial examples in which subtle differences in inputs can lead to robust misclassification, and limits to memory capacity in which only a certain number of classes can be constructed within the network before they begin to interfere with one another and degrade performance. Moreover, deep networks are notoriously slow to train, and are computationally costly in part because the backpropagation algorithm that underlies their learning propagates all error signals back across the entire network. These weaknesses limit the utility of deep learning approaches for many applications, particularly field-deployable systems that require rapid learning/adaptation and cannot practically incorporate high-end computational power in their designs.

SUMMARY

Illustrative embodiments provide neuromorphic algorithms for rapid online learning and signal restoration. For example, some embodiments more particularly provide spiking neural network (SNN) algorithms, inspired by olfactory brain circuitry, that enable the rapid online learning of sensor array responses and the subsequent identification of source signatures under highly suboptimal conditions. Such embodiments overcome significant drawbacks of conventional approaches.

In one embodiment, a computer-implemented method of training a neural network to recognize sensory patterns comprises obtaining input data, preprocessing the input data in one or more preprocessors of the neural network, and applying the preprocessed input data to a core portion of the neural network. The core portion of the neural network comprises a plurality of principal neurons and a plurality of interneurons, and is configured to implement a feedback loop from the interneurons to the principal neurons that supports persistent unsupervised differentiation of multiple learned sensory patterns over time.

The method in this embodiment further comprises obtaining an output from the core portion of the neural network, and performing at least one automated action based at least in part on the output obtained from the core portion of the neural network. A wide variety of different automated actions may be taken in different use cases.

In some embodiments, the neural network is adaptively expanded to facilitate the persistent unsupervised differentiation of multiple learned sensory patterns over time, illustratively by incorporating additional interneurons into the core portion and possibly also into at least one preprocessor.

The core portion of the neural network in some embodiments illustratively comprises a synaptic interaction matrix of the principal neurons and the interneurons, in which an n-dimensional representation in the principal neurons is mapped to an m-dimensional representation in the interneurons, where $m \gg n$.

In some embodiments, the neural network further comprises an inference network arranged between the principal neurons and the interneurons of the core network. The inference network is illustratively configured to deliver input to the interneurons that influences how the interneurons affect the principal neurons, such that the principal neurons thereby exert different effects on the interneurons and the inference network. For example, the inference network may be configured to selectively activate certain interneurons. By weakly or partially predicting a solution in this manner, the inference network substantially increases the likelihood of successful signal identification by the core network under extremely high impulse noise or other highly suboptimal conditions.

These and other illustrative embodiments of the invention include but are not limited to systems, methods, apparatus, processing devices, integrated circuits, and computer program products comprising processor-readable storage media having software program code embodied therein.

BRIEF DESCRIPTION OF THE FIGURES

FIG. 2 is a combined system and flow diagram showing one possible implementation of a neuromorphic algorithm using an SNN in an illustrative embodiment.

DETAILED DESCRIPTION

Illustrative embodiments can be implemented, for example, in the form of information processing systems comprising one or more processing platforms each having at least one computer, server or other processing device. A number of examples of such systems will be described in detail herein. It should be understood, however, that embodiments of the invention are more generally applicable to a wide variety of other types of information processing systems and associated computers, servers or other processing devices or other components. Accordingly, the term "information processing system" as used herein is intended to be broadly construed so as to encompass these and other arrangements.

Figure 1:
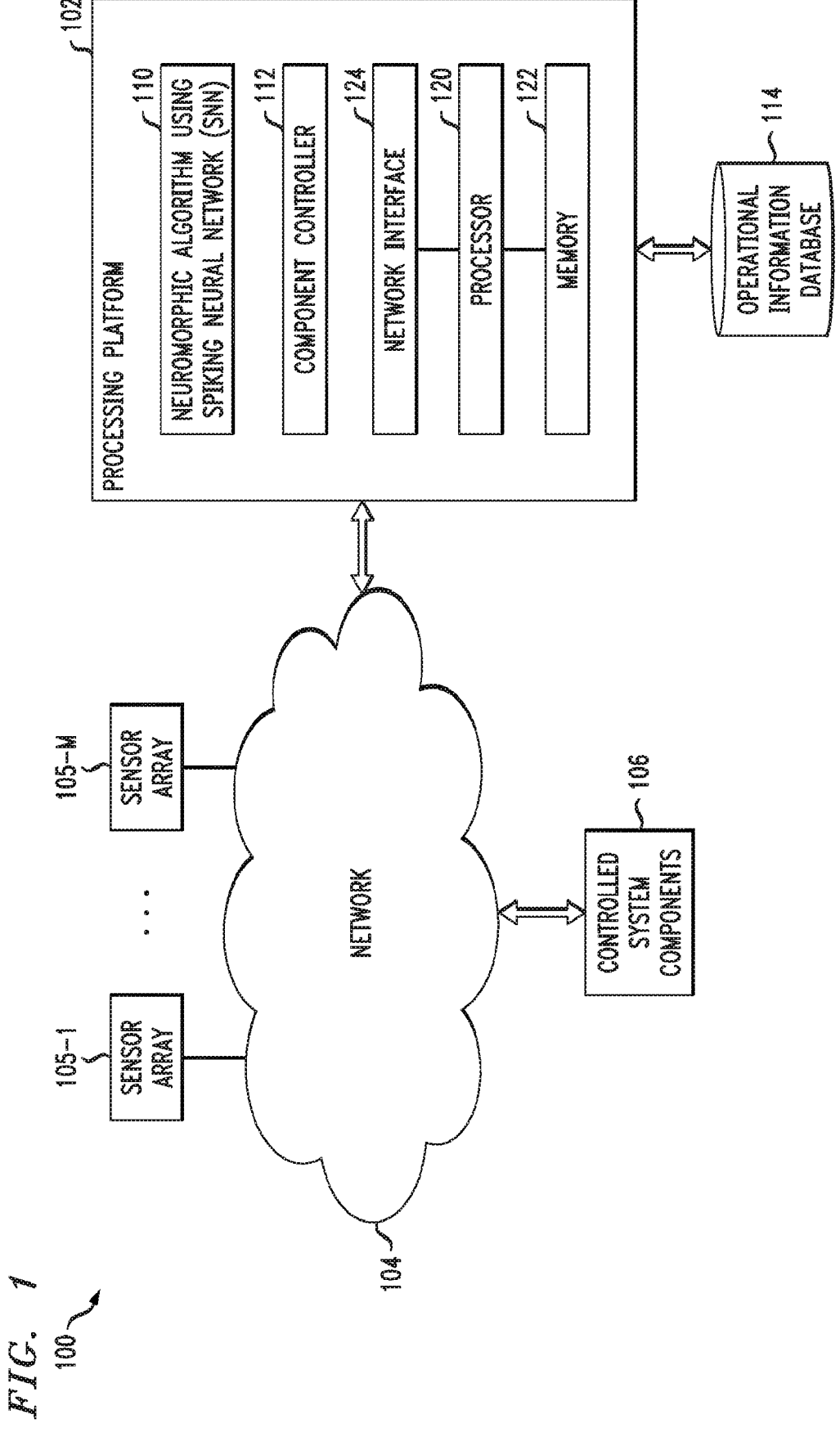
FIG. 1 shows an information processing system comprising a processing platform implementing a neuromorphic algorithm using a spiking neural network (SNN) in an illustrative embodiment.

FIG. 1 shows an information processing system 100 implementing a neuromorphic algorithm using a spiking neural network (SNN) in an illustrative embodiment. The system 100 comprises a processing platform 102 coupled to a network 104. Also coupled to the network 104 are sensor arrays 105-1, . . . 105-M and controlled system components 106. The processing platform 102 implements at least one neuromorphic algorithm 110 and at least one component controller 112. Although this embodiment includes multiple sensor arrays 105, other arrangements of sensors are possible, as described elsewhere herein. The term "sensor" as used herein is intended to be broadly construed, so as to encompass a sensor array or an individual sensing device of such an array. A sensor as the term is broadly used herein can itself comprise a set of sensing devices, such as a sensor array.

Examples of particular implementations of neuromorphic algorithm 110, including a neuromorphic algorithm more particularly referred to herein as Sapinet, and variants thereof, are described in detail elsewhere herein. The component controller 112 generates one or more control signals for adjusting, triggering or otherwise controlling various operating parameters associated with the controlled system components 106 based at least in part on outputs generated by the neuromorphic algorithm 110.

The processing platform 102 is configured to utilize an operational information database 114. Such a database illustratively stores operational information relating to operation of the neuromorphic algorithm 110 and the controlled system components 106. The controlled components 106 in some embodiments comprise system components that are driven at least in part by outputs generated by the neuromorphic algorithm. A wide variety of different types of components can make use of outputs generated by the neuromorphic algorithm 110, such as various types of equipment associated with one or more of the example use cases described elsewhere herein.

The operational information database 114 is illustratively configured to store outputs generated by the neuromorphic algorithm 110 and/or the component controller 112, in addition to the above-noted operational information relating to operation of the neuromorphic algorithm 110 and the controlled system components 106.

Although the neuromorphic algorithm 110 and the component controller 112 are both shown as being implemented on processing platform 102 in the present embodiment, this is by way of illustrative example only. In other embodiments, the neuromorphic algorithm 110 and the component controller 112 can each be implemented on a separate processing platform. A given such processing platform is assumed to include at least one processing device comprising a processor coupled to a memory.

Examples of such processing devices include computers, servers or other processing devices arranged to communicate over a network. Storage devices such as storage arrays or cloud-based storage systems used for implementation of operational information database 114 are also considered "processing devices" as that term is broadly used herein. In some embodiments, such processing devices comprise one or more neuromorphic processors.

The network 104 can comprise, for example, a global computer network such as the Internet, a wide area network (WAN), a local area network (LAN), a satellite network, a telephone or cable network, a cellular network such as a 4G or 5G network, a wireless network implemented using a wireless protocol such as WiFi or WiMAX, or various portions or combinations of these and other types of communication networks.

It is also possible that at least portions of other system elements such as one or more of the sensor arrays 105 and/or the controlled system components 106 can be implemented as part of the processing platform 102, although shown as being separate from the processing platform 102 in the figure.

For example, in some embodiments, the system 100 can comprise a laptop computer, tablet computer or desktop personal computer, a mobile telephone, or another type of computer or communication device, as well as combinations of multiple such processing devices, configured to incorporate at least one sensor array and to execute a neuromorphic algorithm for controlling at least one system component.

Examples of automated actions that may be taken in the processing platform 102 responsive to outputs generated by the neuromorphic algorithm 110 include generating in the component controller 112 at least one control signal for controlling at least one of the controlled system components 106 over the network 104, generating at least a portion of at least one output display for presentation on at least one user terminal, generating an alert for delivery to at least user terminal over the network 104, and/or storing the outputs in the operational information database 114.

A wide variety of additional or alternative automated actions may be taken in other embodiments. The particular automated action or actions will tend to vary depending upon the particular use case in which the system 100 is deployed. Examples of such use cases are provided elsewhere herein.

The processing platform 102 in the present embodiment further comprises a processor 120, a memory 122 and a network interface 124. The processor 120 is assumed to be operatively coupled to the memory 122 and to the network interface 124 as illustrated by the interconnections shown in the figure.

The processor 120 may comprise, for example, a neuromorphic processor, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

As a more particular example, in some embodiments, the processor 120 comprises one or more neuromorphic processor integrated circuits. Accordingly, in some embodiments, system 100 is configured to include a neuromorphic processor integrated circuit based processing platform.

As another example, in some embodiments, the processor 120 comprises one or more graphics processor integrated circuits. Such graphics processor integrated circuits are illustratively implemented in the form of one or more graphics processing units (GPUs). Accordingly, in some embodiments, system 100 is configured to include a GPU-based processing platform.

A wide variety of other types and arrangements of processors can be used in implementing processing platform 102 in other embodiments. The term "processing device" as used herein is therefore intended to be broadly construed, and comprises at least one such processor and at least one memory coupled to the at least one processor.

The memory 122 stores software program code for execution by the processor 120 in implementing portions of the functionality of the processing platform 102. For example, at least portions of the functionality of neuromorphic algorithm 110 and component controller 112 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with one or both of the neuromorphic algorithm 110 and the component controller 112 as well as other related functionality.

The network interface 124 is configured to allow the processing platform 102 to communicate over one or more networks with other system elements, and may comprise one or more conventional transceivers.

It is to be appreciated that the particular arrangement of components and other system elements shown in FIG. 1 is presented by way of illustrative example only, and numerous alternative embodiments are possible. For example, other embodiments of information processing systems can be configured to implement neuromorphic algorithm functionality of the type disclosed herein.

Terms such as "sensor array" and "controlled system component" as used herein are intended to be broadly construed. For example, a given sensor array in some embodiments can comprise multiple sensors collectively implemented on a single common device, or a set of geographically-distributed sensors associated with respective distinct Internet-of-Things (IoT) devices. A wide variety of different types of data sources can be used to provide input data in other embodiments.

For example, it is possible in some embodiments that a given sensor array can be replaced with a single sensor. It also is possible in some embodiments that each sensor, embedded within a sensor array, can itself comprise a set of multiple physical sensors, with signals generated by such multiple physical sensors being combined by averaging, weighted averaging, or another designated function, prior to being sampled for delivery to a preprocessor, such that this set of sensors effectively acts as a single sensor delivering input data to a single column of a neural network. It further is possible in some embodiments that this example association of sets of multiple sensors with respective columnar inputs of the neural network will be computed within one or more preprocessors, after some preprocessing steps but before other preprocessing steps. The term "sensor" as used herein is intended to encompass a device providing input data to a single column of a neural network, irrespective of how many physical sensors may be combined to generate this input.

Terms such as "signal restoration" and "signal identification" as used herein are also intended to be broadly construed, so as to encompass, for example, various arrangements for recognizing a particular sensory pattern given certain input data from a sensor array or other type of data source.

Neuromorphic algorithms of the type disclosed herein can be implemented on any platform that can benefit from their rapid online learning and signal restoration advantages. Such platforms can include any type of computer, mobile telephone, handheld sensor device or other type of processing device that is configured to utilize a neuromorphic algorithm in processing sensory input. It is also possible that a platform implementing a neuromorphic algorithm as disclosed herein can comprise a robot or other type of automaton. For example, the sensor arrays 105, neuromorphic algorithm 110 and component controller 112 can be collectively configured to provide olfactory functionality for such entities. These and other aspects of illustrative embodiments disclosed herein are therefore presented by way of example only, and should not be construed as limiting in any way.

Additional details regarding illustrative embodiments will now be described with reference to FIGS. 2 through 4.

These embodiments include a particular SNN implementation referred to herein as "Sapinet." It is to be appreciated that the particular features and functionality of Sapinet as described herein are presented by way of non-limiting example only, and can be varied in other embodiments. Sapinet and its variants described below therefore represent examples of possible implementations of the neuromorphic algorithm 110 of FIG. 1. Although Sapinet uses an SNN, it is to be appreciated that other embodiments disclosed herein can implement neuromorphic algorithms using different types of neural networks not necessarily involving SNNs. Accordingly, use of an SNN in illustrative embodiments herein should be viewed as exemplary rather than as limiting in any way.

Figure 2:
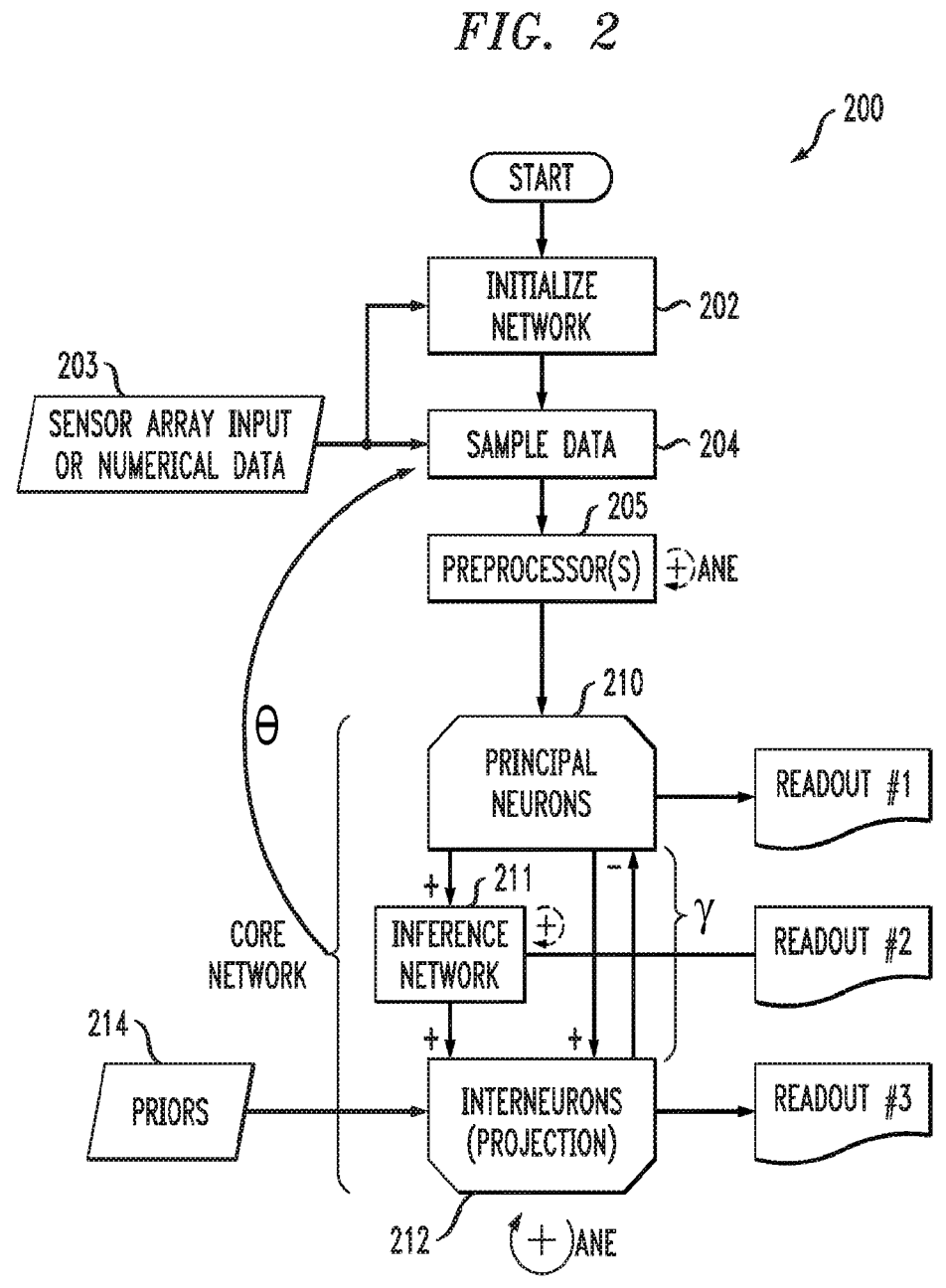
Figure 3:
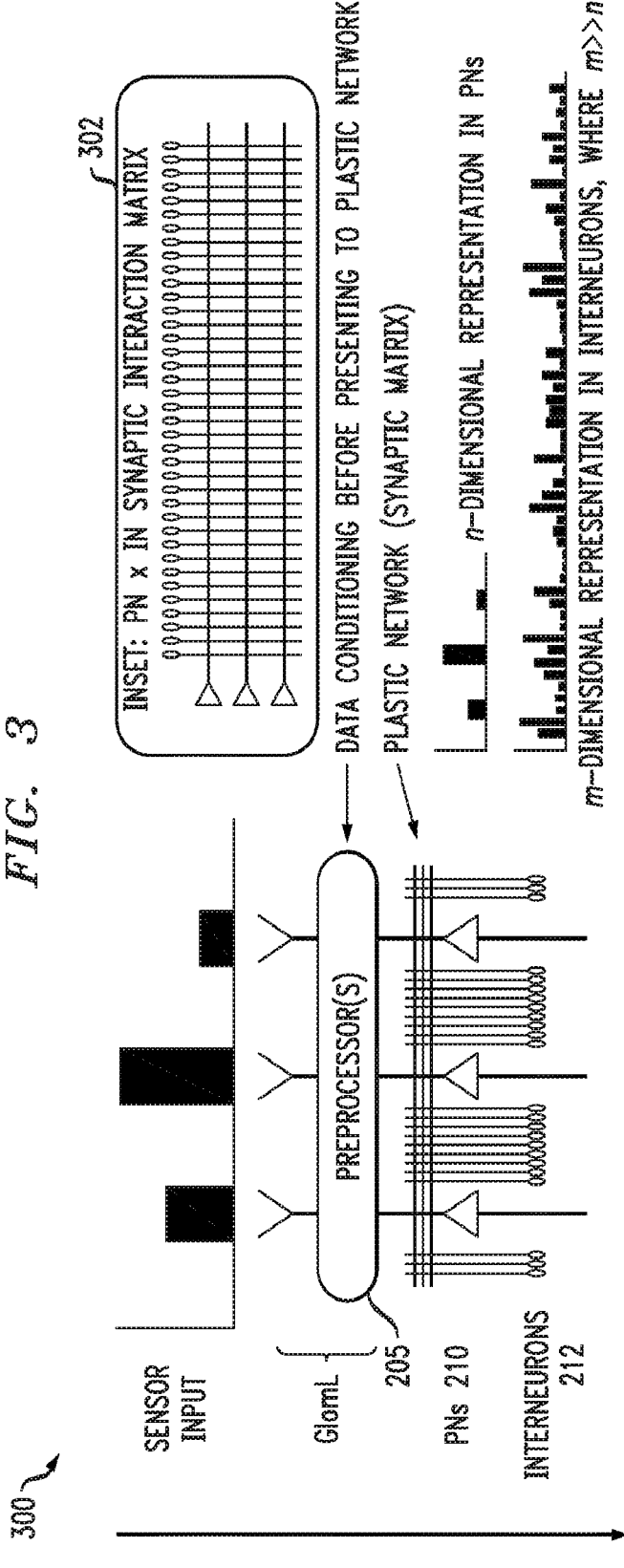
FIG. 3 is a schematic diagram showing operation of a neuromorphic algorithm using an SNN in an illustrative embodiment.
Figure 4:
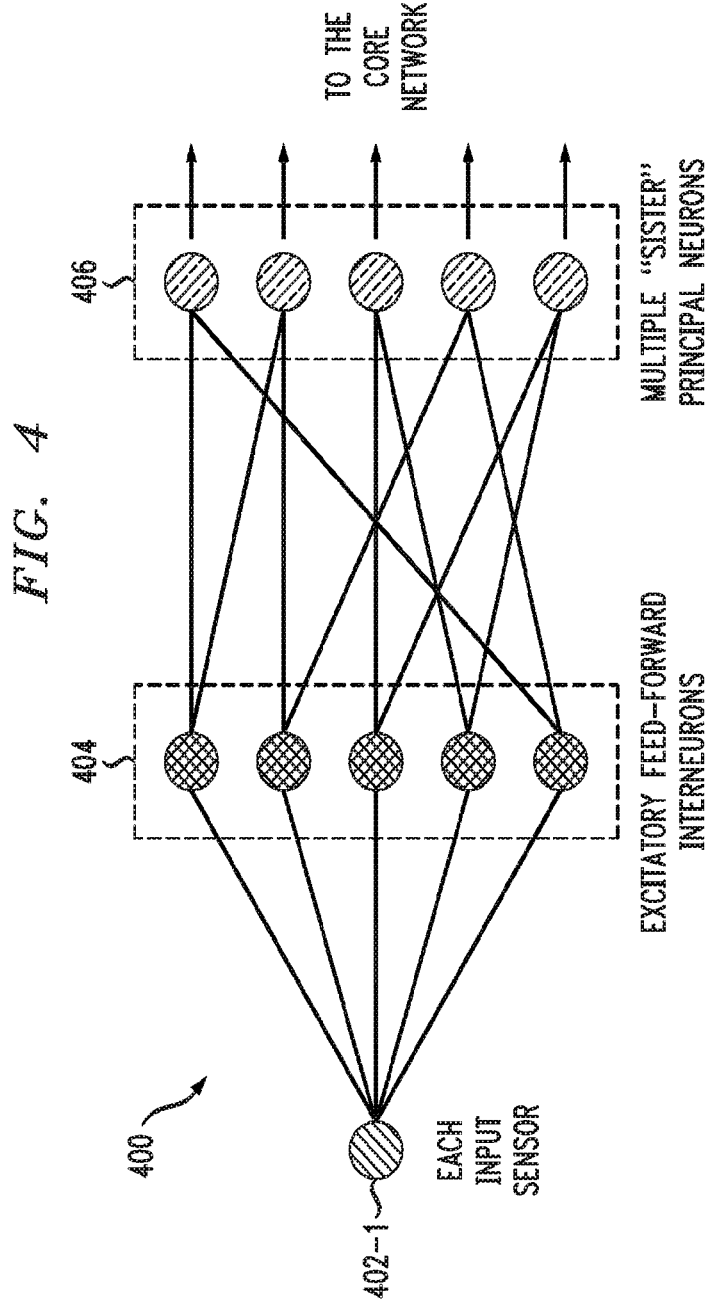
FIG. 4 shows an example of a heterogeneous duplication preprocessor of a neuromorphic algorithm using an SNN in an illustrative embodiment.

The following description will first introduce each of FIGS. 2 through 4, and will then provide additional details regarding the operation of Sapinet in illustrative embodiments.

FIG. 2 illustrates the operation of an example implementation 200 of the Sapinet algorithm, which is illustratively used as neuromorphic algorithm 110 in system 100 in some embodiments. In the implementation 200, the Sapinet algorithm includes initial process steps 202 and 204, inputs 203 and 214, one or more preprocessors 205 and a core network that includes principal neurons 210, inference network 211 and interneurons 212. The preprocessor(s) 205 and core network, having principal neurons 210, inference network 211 and interneurons 212, collectively comprise an example of a neural network, and more particularly an example of an SNN, in which the Sapinet algorithm executes in implementation 200. Such an SNN is also referred to herein as a Sapinet network.

There are two distinct feedback loops in the implementation 200, denoted as theta and gamma feedback loops in the figure. Theta (θ) indicates the loop governing data sampling; gamma (γ) indicates the faster feedback loop of the core Sapinet learning/attractor network. Illustrative embodiments herein implement adaptive network expansion (ANE) functionality. For example, ANE allows new interneurons to be added to a Sapinet network to dynamically add capacity without disrupting existing engrams, as illustrated by the solid circular arrow adjacent interneurons 212 in the figure. ANE can also be deployed in the inference network 211 and in certain preprocessors, as illustrated by the dashed circular arrows adjacent the corresponding components in the figure.

The Sapinet network is initialized in initialization step 202, and input data is obtained in data sampling step 204. Such operations illustrative utilize sensory array input and/or numerical data provided via input 203. The input data is preprocessed in the one or more preprocessors 205, and the preprocessed input data is then applied to the core network that include principal neurons 210 and interneurons 212. The interneurons 212 may be configured in accordance with priors via input 214.

The inference network 211 is arranged between the principal neurons 210 and the interneurons 212 within the core network and is illustratively configured to deliver input to the interneurons 212 that influences how the interneurons 212 affect the principal neurons 210, such that the principal neurons 210 thereby exert different effects on the interneurons 212 and the inference network 211.

As indicated above, the core network in this embodiment implements the gamma feedback loop from the interneurons 212 to the principal neurons 210. This gamma feedback loop is an example of what is more generally referred to herein as a feedback loop that supports persistent unsupervised differentiation of multiple learned sensory patterns over time, as will be described in more detail elsewhere herein.

The gamma feedback loop in some embodiments is configured to control delivery of synaptic inhibition information from the interneurons 212 back to the principal neurons 210 of the core network, illustratively based at least in part on synaptic excitatory information delivered from the principal neurons 210 to the interneurons 212.

The theta feedback loop is an example of what is more generally referred to herein as a data sampling loop, and is utilized in obtaining input data for the one or more preprocessors 205. Multiple cycles of the gamma feedback loop are illustratively executed within a single cycle of the theta feedback loop.

The input data in implementation 200 can be obtained, for example, from one or more sensor arrays or other arrangements of sensors, via input 203, using the data sampling step 204 with timing controlled by the theta feedback loop.

Outputs are illustratively obtained from the core network, including readouts from the principal neurons 210, the inference network 211 and the interneurons 212, with such readouts being denoted as Readout #1, Readout #2 and Readout #3 in the figure. Various automated actions may be taken based at least in part on these and other outputs of implementation 200, also as described elsewhere herein.

In the FIG. 2 embodiment, the SNN is configured to provide spike timing for the gamma feedback loop, with inhibition delaying the spike timing and relatively strong sensory input advancing the spike timing.

Operation of the gamma feedback loop in adapting synaptic weights of the core network is illustratively controlled based at least in part on spike timing information represented by relative timing of spikes for at least a portion of the principal neurons 210 and the interneurons 212.

In some embodiments, at least a subset of the principal neurons 210 of the core network are configured to represent respective mitral cells (MCs) of an olfactory learning system and at least a subset of the interneurons 212 of the core network are configured to represent respective granule cells (GCs) of the olfactory learning system, although numerous other arrangements are possible, and the disclosed arrangements should therefore not be viewed as being restricted to olfactory learning applications. MCs are therefore considered examples of what are more generally referred to herein as principal neurons or PNs, and GCs are considered examples of what are more generally referred to herein as interneurons or INs. Other types of principal neurons and interneurons can be used in other embodiments.

As indicated above, the SNN of implementation 200 can be adaptively expanded by incorporating additional interneurons 212 into the core network, and additionally or alternatively by incorporating additional interneurons into the inference network 211 and/or at least one of the one or more preprocessors 205.

In some embodiments, the additional interneurons 212 are advantageously incorporated into the core network in a manner that does not disrupt existing learned sensory patterns of the core network.

Additionally or alternatively, the SNN of implementation 200 can be configured to provide a neuromodulatory dynamic state trajectory configured to adjust neuronal properties systematically and select a particular outcome.

These and other features of illustrative embodiments will be described in more detail below.

Referring now to FIG. 3, a portion 300 of the Sapinet implementation 200 is shown in more detail. Sensor inputs received via input 203 and sampled in data sampling step 204 are filtered through the one or more preprocessors 205 and cause excitation of principal neurons 210 of the core network, which are illustratively MCs and are shown as triangles in the figure. These excitatory principal neurons 210 form a synaptic interaction matrix 302 in the core network with inhibitory interneurons 212 of the core network, which are illustratively GCs and shown as ovals in the figure. In this figure and elsewhere herein, the principal neurons 210 are also referred to as PNs, and the interneurons 212 are also referred to as INs. The one or more preprocessors 205 in this embodiment are associated with a glomerular layer ("GlomL") as shown. Details of such a layer are described in more detail elsewhere herein.

The synaptic interaction matrix 302 of the principal neurons 210 and the interneurons 212 in the present embodiment illustratively comprises an n-dimensional representation in the principal neurons 210 which is mapped to an m-dimensional representation in the interneurons 212, where m>>n. The synaptic interaction matrix 302 is also referred to in the figure as characterizing a plastic network.

The horizontal lines near the principal neurons 210 at the left side of the figure denote lateral dendrites of those principal neurons 210, and the particular intersections marked with a dot denote the branch points of an MC dendritic tree. The inset in the figure depicts such interconnections as represented by the synaptic interaction matrix 302, in which intersecting lines have some initial probability of being connected to each other (e.g., 20%). During training, the weights of these synaptic interactions are iteratively modified over multiple learning cycles corresponding to respective gamma cycles of the gamma feedback loop of FIG. 2. During testing/classification, the pattern of learned weights in the synaptic interaction matrix 302 mediates an attractor network. Representations can be read out from principal neurons 210, via Readout #1 of FIG. 2, or from interneurons 212, via Readout #3 of FIG. 2. The inference network is not depicted in FIG. 3.

Additional details relating to illustrative embodiments of the one or more preprocessors 205 will now be described.

A given one of the one or more preprocessors 205 illustratively comprises a plurality of input nodes, each adapted to receive input data associated with a different data source. For example, the input nodes may be adapted to receive input data from respective different sensors of a sensor array. In some embodiments, each input node may receive input data from a data source comprising any number of physical sensors.

In some embodiments, the given preprocessor more particularly comprises a heterogeneous duplication preprocessor configured to statistically regularize diverse sensory inputs of the obtained input data.

As a more particular example, the given preprocessor may comprise, for a particular one of the input nodes, a plurality of excitatory feed-forward interneurons each coupled to the particular input node, and a plurality of principal neurons each coupled to one or more of the excitatory feed-forward interneurons.

FIG. 4 shows a schematic of a heterogeneous duplication preprocessor 400 in one embodiment. In this embodiment, each sensor stream from a given input sensor 402-1 is fanned out to a set 404 of multiple excitatory feed-forward interneurons, each of which projects sparsely and randomly to a number of "sister" principal neurons in a set 406 of principal neurons. Here, the number of principal neurons N is 5*C, where C is the number of input sensors; this number can vary, and some variations of this architecture have individual principal neurons receiving input from more than one sensor. Also, as indicated previously, the term "sensor" as used herein is intended to be broadly construed, and can in some embodiments include a set of multiple physical sensors. It should be noted that the cellular properties of the interneurons and principal neurons, and the weights of the synaptic projections, are heterogeneous. When implemented following sensor scaling and global normalization, this preprocessor 400 serves to statistically regularize diverse sensory inputs. Outputs of the preprocessor 400 are provided to the core network as illustrated in the figure. In some embodiments, at least portions of the principal neurons 406 are considered part of the core network rather than part of the preprocessor 400.

In the FIG. 4 embodiment, the brain-mimetic implementation of heterogeneous duplication of the preprocessor 400 is modeled after aspects of the intraglomerular circuitry of the mammalian main olfactory bulb (MOB), and serves to statistically regularize the distribution of amplitudes among inputs. Each sensor input is delivered to a number of excitatory feedforward interneurons (here, five) comparable to the external tufted (ET) cells of the MOB, and from there, via sparse, random, feedforward projections, to the principal neurons of the core learning network (analogous to MOB MCs). This example preprocessor configuration illustratively expands the size of the core learning network; here, each sensor now corresponds to a column with five computing units/sister MCs.

Additional details relating to illustrative aspects of Sapinet and its variants will now be described.

SNNs, also known as neuromorphic networks, comprise an alternative to traditional analogue-valued deep networks. Like traditional deep networks, they are based on a neuroscience metaphor, comprising a large number of state variables ("neurons") coupled pairwise by transfer functions ("synapses"). Unlike deep networks, the communication between neurons is based on discrete spikes (also referred to as events, or pulses); accordingly, they sometimes have been referred to these as pulsed, pulse-coupled, or event-based networks. In principle, spiking networks have universal computational power—that is, they are theoretically capable of computing any algorithm. However, SNNs also can be constructed with specific architectures, as is observed in the brain, thereby favoring improved effectiveness at certain tasks at the cost of generality (i.e., the architecture is part of the algorithm). This neuromorphic principle can be extended to incorporate multiple different neuronal and synaptic types, feedback loops, sparse connectivity, localized synaptic learning rules, and other heterogeneities that are generally not considered in traditional deep learning systems.

When implemented on appropriate hardware, SNNs are extremely energy efficient and uniquely scalable to very large problems; consequently, marrying the efficiency of neuromorphic processors with the algorithmic power of deep learning is an important industry goal.

The theoretical promise of SNNs has motivated the development of multiple neuromorphic hardware platforms, including the academic platforms SpiNNaker and BrainScaleS, as well as IBM's TrueNorth platform and, most recently, the Loihi platform of Intel Labs, which embeds rapid, iterative plasticity ("self-learning") in a compact, scalable chip. These hardware platforms are considered illustrative examples of what are more generally referred to herein as "processing devices" or "processing platforms." A premise of these hardware projects is that the availability of these platforms would spur the development of practical, useful neuromorphic algorithms by highlighting their particular strengths in energy efficiency and scalability.

Figure 10:
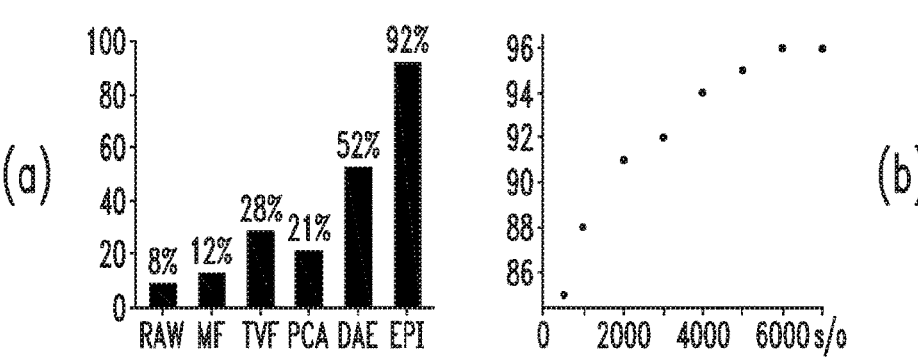
FIG. 10 is a set of graphical plots (a) through (g) showing aspects of performance of a neuromorphic algorithm using an SNN in illustrative embodiments. The plots are also referred to herein as respective FIGS. 10(*a*) through 10(*g*).
Figure 10:
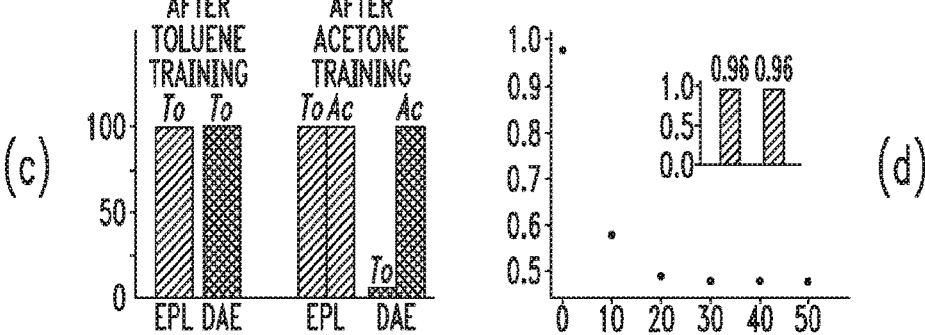
Figure 10:
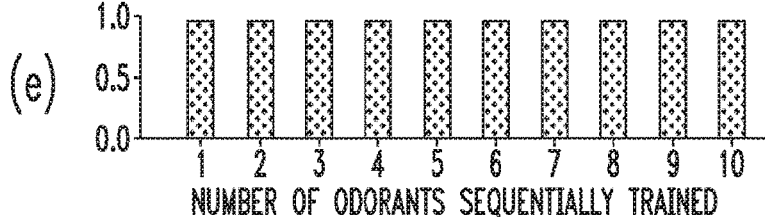
Figure 10:
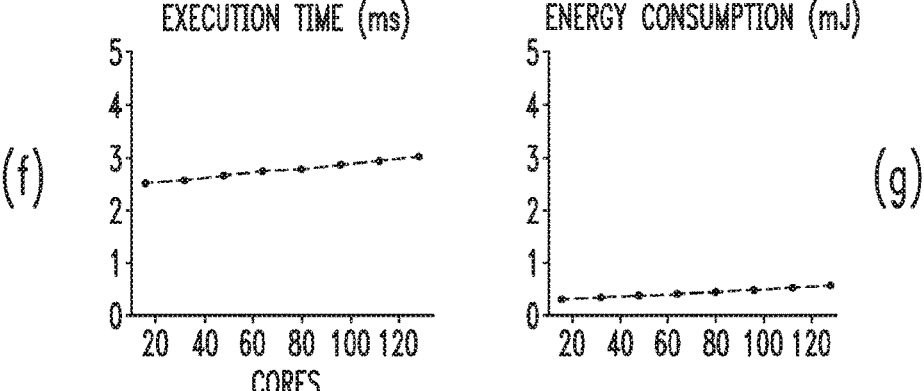

Illustrative embodiments such as Sapinet provide significant improvements over conventional techniques. Such conventional techniques include the following:

1. Traditional deep learning/deep neural networks (DNNs). This is a vast field of research with powerful applications. These networks are generally unstructured a priori and can learn nearly any patterns given enough training. However, training is very slow (thousands to millions of iterations), and updating ("learning") depends on a global backpropagation rule that requires highly interconnected (and correspondingly slow) networks. SNNs have many fewer current applications, and none to our knowledge that are currently commercially important. Rather, SNNs are competing with DNNs on the basis of their lower energy expenditure and ability to be deployed on specialized hardware (like the Intel Loihi or IBM TrueNorth). Additionally, SNNs are most effectively competing with DNNs by implementing custom architectures that are specialized for certain applications ("the architecture is part of the algorithm"). Sapinet is taking this approach, and comparisons against a contemporary DNN are illustrated in FIG. 10. Briefly, Sapinet exhibits few-shot learning, online learning (lack of catastrophic forgetting), and other features that DNNs do not exhibit. Some specialized DNNs are working to limit catastrophic forgetting by slowing/freezing certain weights after learning a given stimulus, so that that stimulus will not be forgotten after subsequent learning of other stimuli. However, success in this approach is still limited, and a great deal of supervision is required to identify and stabilize the more important weights. In short, SNNs like Sapinet are far superior to DNNs for a limited range of problems. The rapid learning, rapid updating in response to sensor drift, and energetically efficient hardware implementations are the most substantive and relevant advantages of Sapinet and some other SNNs over potential DNN competitors.

2. Other SNN implementations. Echo state networks and liquid state machines are the state of the art in the theoretical description of the capabilities of SNNs. Compared to Sapinet, however, these networks eschew specific architectural designs in favor of exploring the universal computational capabilities of SNNs. In this way, these approaches are more directly comparable to the state of the art in DNNs. Sapinet, in contrast, has instantiated nonplastic structure inspired by the neural circuitry of the mammalian olfactory system. Accordingly, Sapinet excels at problems that resemble the problem of odor learning and identification. Fortunately, this problem structure is quite broad, and includes many nonchemosensory applications. Specifically, Sapinet is applicable to any problem based on the classification of input populations that do not exhibit relevant low-dimensional structure, such as the two-dimensional patterns of a visual image. Additional description elsewhere herein provides particular use cases in illustrative embodiments. Such use cases can involve taking various automated actions based at least in part on Sapinet outputs.

3. Other ways of analyzing chemosensory data (machine olfaction, artificial nose research). Conventional machine olfaction essentially comprises that portion of the chemosensors market that is focused on large arrays of broadly sensitive sensors (see, e.g., K. C. Persaud et al., "Neuromorphic Olfaction," CRC Press, Boca Raton, FL 2013), sometimes including processes of environmental adaptation or learning. Most machine olfaction research uses traditional machine learning approaches; these approaches are outclassed by Sapinet. There also is a small but interesting literature concerning biologically inspired algorithms of modest complexity. Several emphasize concentration tolerance, as that is one of the simplest problems to resolve under theoretical no-noise conditions. Two such algorithms are based on the premise that the rank order of spike latencies following stimulus onset is concentration-invariant, and hence can recognize odors across concentrations. There is some truth to this principle, though it falls apart at lower or higher concentrations where individual sensor responses begin to asymptote, and there is no provision for recognition under noise. Several other biomimetic models emphasize the utility of decorrelation using lateral inhibition, though these networks largely ignore the dimensionality problems that nonplastic lateral inhibition presents in such systems. Some other biomimetic models are based on higher-dimensional projections using Hebbian learning (roughly comparable to the feed-forward component of the Sapinet core network), after which linear classifiers are used; however, these approaches lack feedback and do not develop or utilize properties comparable to the k-order receptive fields of interneurons in Sapinet. A more recent Hebbian plasticity-based model achieves rapid, few-shot odor learning and explores the utility of sparse representations, but is based on spike rates and primarily oriented towards exploring the control possibilities of the neuromodulator octopamine in insects. Some models include dynamics—e.g., oscillations comparable to Sapinet's gamma network, as these oscillations are prominent in mammalian and insect olfactory systems; however, oscillations and spike synchrony are not directly functional, and are not applied towards enhancing classification performance. Other work using SNNs for odor classification is limited to proofs of concept that higher-dimensional projections coupled with simple plasticity rules can quickly generate robustly distinct representations. Although this principle is well established, and is utilized in some embodiments herein, conventional approaches remain underdeveloped for practical, real-world applications.

Unique to Sapinet are the use of gamma oscillations as a clock to measure spike latencies and establish attractor dynamics, and the deployment of feedback network inhibition to delay, rather than prevent, principal neuron spike times. Sapinet establishes the principle of the permanent, unsupervised differentiation of interneurons, and supports lifelong learning owing to its ANE functionality. Sapinet has been developed to the point where the statistical unreliability of natural signals has been recognized as a challenge to the network, and resolved with cascades of preprocessors (the exception is concentration tolerance, a problem that has been solved several times as noted above). Sapinet uses sophisticated parameters for its excitatory learning rules to regulate the value of k, and uniquely includes inhibitory learning rules. No other approach to date has developed or even proposed the inclusion of the functions of the Sapinet inference network, or of the neuromodulatory sweep. Indeed, only Sapinet has been explicitly tested for recognition and classification performance under high levels of noise. Finally, Sapinet also is being developed in concert with an analytical mathematical framework that underlies its approach to hierarchical classification and supervised perceptual learning.

The uniqueness of Sapinet is not primarily in specific unique features or algorithmic strategies, though it does include several of each. Rather, Sapinet is a robust and well-vetted system that, because of its inclusion of several layers of processing intended to solve multiple practical problems of learning and recognition, has achieved strong performance under realistically problematic circumstances.

Accordingly, there are multiple illustrative embodiments disclosed herein exhibiting different instantiations of Sapinet's core principles. For example, as described below, the excitatory synaptic learning rule serves to develop increasingly specific experience-dependent receptive fields in interneurons (e.g., GCs), whereas the inhibitory synaptic learning rule serves to denoise representations in principal neurons (e.g., MCs). The specific implementations and parameters of these rules, however, differ among illustrative embodiments, particularly depending on factors such as the hardware platform on which they are instantiated. For example, different instantiations of the excitatory learning rule, with associated parameters, are described for x86 architectures in some embodiments herein, whereas the same rule in a form compatible with the Loihi neuromorphic chip instruction set is described in conjunction with other embodiments herein. Moreover, there are multiple sources of noise (e.g., error) that Sapinet is designed to identify and disregard. Each of these is described separately below, in some cases in conjunction with different illustrative embodiments, but examples include (1) random (Gaussian) noise, (2) variance arising from odor plume dynamics, (3) variance arising from unregulated odor concentration (or other signal intensities), (4) variance arising from unpredictable sensor drift, and (5) impulse (Bernoulli) noise arising from competitive interference (e.g., background odors/signals) that effectively randomize the responses of a proportion of the sensors.

In the following, we describe in detail certain illustrative embodiments of a SNN-based algorithm for signal restoration and identification (classification) that we refer to herein as Sapinet (FIGS. 2 and 3).

Sapinet is based on architectural and computational principles extracted from the neural circuitry of the mammalian olfactory system. It is designed for the rapid learning of arbitrary, high-dimensional patterns and the subsequent recognition and classification of such patterns in the presence of high levels of interference (for example, in which an unknown 60% of the sensors return random, noninformative values, and/or all sensor response profiles have drifted, and/or signal intensities are fluctuating unpredictably). Specifically, Sapinet is broadly applicable to input derived from arbitrary sensor arrays (including heterogeneous arrays of sensors) or arbitrary lists of features (such as a set of cellular characteristics derived from a breast cancer biopsy). For these purposes, Sapinet's performance is superior to deep network-based alternatives within most realistic, deployable scenarios—in particular, those in which limited computing power is immediately available, or that do not permit indefinite periods of training and retraining (e.g., see FIG. 10). Unlike deep networks, Sapinet also is capable of robust online learning, in which new patterns can be learned, and the size of the network can be dynamically expanded, without impairing the network's memory for patterns already learned. Sapinet can be much more rapidly trained than a deep network—often requiring only one- or few-shot training to learn to robustly recognize patterns embedded within copious noise. Unlike generically trained networks, Sapinet explicitly embeds representations of similarity (e.g., intrinsic quantification of the similarity of different inputs), which counteracts the effectiveness of adversarial examples and enables generalization beyond experience. Representations are based in part on spike timing properties, enabling the fast and unambiguous communication and computation of information by the SNN. Finally, plasticity in Sapinet is based on local synaptic learning rules, and hence takes advantage of the optimizations of specialized neuromorphic hardware platforms (in particular, the colocalization of memory and compute). An implementation of Sapinet on the Intel Loihi neuromorphic hardware platform is described elsewhere herein with reference to FIGS. 5 through 10.

Illustrative implementations of Sapinet are not designed for visual images or other signals in which embedded low-dimensional information is critical (e.g., ImageNet, MNIST), and is not expected to be competitive for visual classification problems in its present form. Rather, it is appropriate for pattern recognition in any dataset comprised of unstructured lists of input or sensor values, such as genomics datasets, microarrays, sets of medical diagnostic criteria, band-discretized spectral signatures, and chemosensor arrays. With the inclusion of the appropriate preprocessors, Sapinet can accept as input any arbitrary sets of values or can be connected to any arbitrary battery of sensors that can provide a numerical representation of their activity to the network.

Accordingly, a wide variety of different sensors can be used in illustrative embodiments herein, including any sensor that can provide a signal or other numerical representation to the network. Such representations can include, for example, voltage values, current values, resistance measurements, as well as many other variants without limitation. Examples of sensors that can be used in illustrative embodiments herein include numerous different types of chemical sensors and/or gas sensors as well as other types of sensors, including, in some embodiments, image sensors. It is therefore to be appreciated that the term "sensor" as used herein is intended to be broadly construed, and as indicated elsewhere herein, such a sensor can itself comprise a sensor array having multiple physical sensors. These and other sensors can comprise or otherwise be implemented in, for example, IoT devices, mobile devices, and a wide variety of other types of processing devices.

As indicated previously, an example Sapinet implementation 200 is depicted in FIG. 2. A network is constructed and initialized based on the size of the input (sensor) array as well as on other user-dependent criteria. Sensor array input (or an equivalent vector of input values) is presented to the network; the input to each sensor can be a single value, a list of values (e.g., sampled in turn according to the "theta" cycle) or a continuous sensory stream (e.g., sampled at discrete intervals according to the "theta" cycle). Each input sample vector is filtered through a set of preprocessors for signal conditioning. Ultimately, preprocessor output is delivered to the complement of principal neurons (PNs) that comprise part of the core attractor network. (Each sensor's activity may be ultimately mapped onto a single PN, or may be mapped onto a different number of PNs by one of the preprocessors).

The core network projects PN activity onto a larger number of interneurons (INs), activating them such that they, in turn, deliver synaptic inhibition back onto the PN array. The weight matrix between PNs and INs (FIG. 3) is initially sparse (i.e., only a fraction of the possible connections between PNs and INs actually exist), and becomes sparser and more selective with learning. During sensory activation, this excitatory-inhibitory feedback loop is driven through several recurrent cycles (the gamma cycle). When learning is active, synaptic weights at the excitatory (PN→IN) and inhibitory (IN→PN) synapses are updated over successive gamma cycles according to local learning rules. During testing, successive gamma cycles underlie an attractor network in which these learned synaptic weights shape the attractor state, leading to pattern recognition even under highly noisy conditions.

An inference network can be included in a Sapinet instantiation, receiving a copy of PN activity and delivering its output onto INs in parallel to direct PN→IN excitation. When present, the inference network provides additional pattern completion capacities, and embeds additional memory that can be deployed to select among competing engrams so as to enable the (sequential) recognition of multiple knowns within a single sample. (The latter effect also can be achieved by externally imposed priors, also generally delivered onto INs, as illustrated in FIG. 8(d)). Lastly, inference networks can be used to govern more sophisticated learning methods (e.g., odor learning methods, etc.), enabling, for example, experience-based changes to the intrinsic discriminability of similar inputs with different implications (perceptual learning). Briefly, by selectively deploying inhibition in service to the need to increase the discriminability of two similar inputs (e.g., physically similar inputs, chemically similar inputs, etc.), their representations in the network can be permanently driven apart.

Finally, Sapinet is capable of "lifelong learning"—summarized as the capacity to keep learning new patterns indefinitely. Online learning—the ability to learn new patterns as they occur, without disrupting earlier learning—also is implicit in lifelong learning. To do this, Sapinet dynamically expands the number of interneurons via ANE, as illustrated in FIG. 2. It should be noted that ANE does not disrupt existing memories and does not require parameter adjustments to maintain performance. This capacity for online/lifelong learning also can be used to counteract sensor drift. ANE also can be deployed in the inference network and in certain preprocessors.

This combination of biomimetic features constitutes a new SNN-based algorithm for pattern learning and recognition under noise that is competitive in performance with state-of-the-art deep networks while also exhibiting clearly superior practical properties such as very rapid, lifelong learning, a robustness to widely variable input signals, resistance to catastrophic forgetting, and compatibility with dedicated neuromorphic hardware platforms.

Sapinet is an SNN algorithm, which is an example of what is more generally referred to herein as a neuromorphic algorithm. SNNs in general, and Sapinet in particular, are based on several core principles that differentiate them from contemporary deep neural networks:

1. Event-based architecture, by which communications between neurons are mediated by discrete pulses, or spikes, as opposed to direct analogue values. This has some advantages in embedded systems, because it favors very low-power implementations and is not susceptible to miscommunications based on environmental factors such as ambient temperature.

2. Neurons and synapses are not necessarily uniform; they can be of multiple types and exhibit arbitrarily different computational properties. In Sapinet, for example, principal neurons (PNs) excite the neurons that they target, whereas interneurons (INs) are inhibitory. Neurons may act as strict integrators, leaky integrators, or exhibit more complex responses to input. They may also exhibit other internal structure; for example, in some implementations, Sapinet PNs have two compartments that follow different rules, but work in concert to produce a common output (e.g., as described elsewhere herein regarding an illustrative embodiment on the Loihi chip). Additionally, the density of synaptic connections among neurons in SNNs often is much sparser than is common in deep networks.

3. Network architectures are not necessarily feed-forward; they can include any number of feedback loops. Feedback-inclusive spiking networks are sometimes referred to as recurrent neural networks (RNNs), examples of which include echo state networks and liquid state machines. Recurrent networks may exhibit dynamical systems properties, such as Sapinet's gamma cycle (FIG. 2).

4. Information can be highly localized, such that synaptic learning rules may depend only on local interactions without reference to global network state. This enables SNNs to take advantage of the benefits of the "colocalization of memory and compute," a core efficiency principle of neuromorphic hardware whereby memory resources can be effectively localized across a physical network. The corresponding constraint is that computations at particular synapses will not have global access to information about network state.

5. While general reservoir computing SNN models can be as generic and pluripotent as traditional deep networks, the architectural non-uniformities described above imply that some aspects of network architecture may be predesigned and application-specific. Particular SNN designs therefore favor some capabilities at the expense of others, as represented by the principle that "the architecture is part of the algorithm." These may include multiple computational layers comprised of different network elements that process signals sequentially or recurrently. Sapinet is designed around a specific layered architecture that enables its fast learning and robust classification-under-noise performance, at the expense of its generality.

6. SNN models are capable of processing continuous-time inputs, discretely sampled by a network's internal dynamics (e.g., Sapinet's theta cycle; FIG. 2).

As illustrated in FIG. 2, Sapinet comprises a set of one or more input preprocessors, a core SNN of sparsely coupled excitatory and inhibitory neurons, and a set of supervisory and storage systems that regulate the core SNN. These supervisory systems may be fully instantiated networks or simple, task-specific control mechanisms. Each of these components is illustrated in FIG. 2 and described below.

With regard to input 203, which illustratively comprises sensor array input and/or numerical data, Sapinet can accept as input any arbitrary set of C values, presented in parallel, or can be connected to any arbitrary battery of C sensors. Sapinet will periodically sample the state of these sensors in data sampling step 204 at a frequency controlled by the theta feedback loop. Each sample may be, for example, a simple reading, an average, or a weighted average over time. Samples that are averaged across a timespan can improve performance by reducing random sampling error noise.

In the initialize network step 202, Sapinet will construct a new network at initialization based on user-specified parameters. In particular, the new network typically will be initialized with a number of principal neurons N equal to or larger than the number of sensor inputs C. Any or all of the available preprocessors 205 may be included in the newly initialized network. Note that some of these preprocessors 205 stream individual sensor inputs to multiple principal neurons; additionally, individual principal neurons may receive input from just one sensor or combine inputs from multiple sensors. Accordingly, the selection of preprocessors and their parameters, together with the number of sensors C, determines the number of principal neurons N in the newly initialized network.

The nonplastic hyperparameters of a newly instantiated network and the initial conditions of plastic parameters are tuned to the structure and scale of the network and the statistical structure of the inputs intended to be delivered to the core network of FIG. 2. Preprocessors 205 are utilized to ensure that arbitrary sensor input patterns are systematically conditioned to adhere to the requirements of the core network; this ensures that Sapinet can productively respond to any arbitrary input profile (this is referred to as the capacity for "learning in the wild").

Different types of preprocessors 205 can be instantiated in any given network. These range from simple signal conditioning algorithms to specialized network components comprising additional neuron types (e.g., ET neurons, periglomerular (PG) neurons) and synaptic connection patterns that are embedded into the network during initialization.

The core network of Sapinet comprises principal neurons 210, interneurons 212, and (optionally) an inference network 211 organized in a gamma feedback loop. This gamma feedback loop is periodic and exhibits an intrinsic processing frequency called the gamma cycle. Multiple gamma cycles (e.g., five) are embedded within each data sample period (successive samples are taken at the slower theta frequency as described above). During test sampling, these gamma cycles underlie attractor dynamics that enable the network to identify trained patterns under noisy conditions. Sapinet can also deliver a "none of the above" result based on a user-specified level of certainty.

The core network is initialized with a sparse degree of connectivity from principal neurons 210 to interneurons 212; this connection density is a parameter of interest but a 10-20% random connectivity is typical. If an inference network is present, the connection densities from principal neurons 210 to the inference network input layer and from the inference network output layer to interneurons 212 are similarly sparse and random at initialization. In contrast, the connections from interneurons 212 onto principal neurons 210 are specific and determined at initialization, generally with an equal, or roughly equal, number of interneurons set up to synaptically inhibit each principal neuron. Interneurons are individually limited in the number of principal neurons that they inhibit; the specific number is a parameter of interest.

The principal neurons 210 integrate sensor information following preprocessing, and emit spikes (events, pulses) as output. There are multiple specific implementations, but they share the property of spiking earlier within each gamma cycle in proportion to the strength of the sensory input that they are receiving. (This "phase precedence code" bypasses a common flaw of SNNs in which values are communicated via mean spike rates, hence requiring substantial time and energy to be spent on a statistically reliable period of firing in order for downstream network elements to measure the mean rate). Earlier spikes are interpreted as stronger signals for pattern recognition (Readout #1), and also are delivered to interneurons (and to the inference network 211 if present). The plasticity rule for excitatory neuronal projections is sensitive to relative spike timings on the gamma scale, such that interneurons and the inference network input layer will adapt their receptive fields to principal neuron input during learning.

The interneurons 212 receive synaptic excitation from principal neurons 210. As noted above, each interneuron initially receives input from a randomly selected proportion of principal neurons (e.g., 20%) drawn from across the entire principal neuron population. Interneurons spike when a sufficient number of their presynaptic principal neurons fire (this number is illustratively the interneuron receptive field order k, and, in some embodiments, will vary among interneurons), and an excitatory synaptic plasticity rule strengthens those inputs from the principal neurons that caused the interneuron to fire and weakens the other inputs. This progressively narrows the field of effective inputs to a small number of principal neurons k, where the order k depends on factors such as the inhibitory neuron's spike threshold and the limit on the maximum excitatory synaptic weight. Hence, individual interneurons learn to become responsive to diagnostic feature combinations of order k. They deliver their activity as inhibition onto principal neurons, where it serves to delay principal neuron spike firing according to the inhibitory synaptic weight. This weight is determined by one of a set of inhibitory synaptic learning rules that depend on the structure of the network and the presence of an inference network. The effects of this synaptic inhibition on principal neurons causes them to fire at different times in the next gamma cycle, thereby activating a different population of interneurons and evoking recurrent activity that exhibits attractor dynamics.

The core network in some embodiments is illustratively constructed with neuron populations exhibiting heterogeneous properties (such as thresholds, initial synaptic weights, and maximum synaptic weights). Heterogeneous properties across the interneuron population ensures that different interneurons will exhibit different values of k, such that some interneurons are responsive to relatively common low-order diagnostic feature combinations and others are responsive only to rarer, higher-order diagnostic feature combinations. Heterogeneous properties among the principal neuron population can influence the particular populations of principal neurons that will constitute effective inputs to interneurons, and also contributes to the efficacy of the heterogeneous duplication preprocessor, as described elsewhere herein in conjunction with heterogeneous duplication features of illustrative embodiments.

The plastic network of the core feedback loop, consequently, is based on a simple matrix of excitatory-inhibitory interactions (FIG. 3). An important aspect of the Sapinet algorithm in some embodiments is in the local learning rules that govern changes in these synaptic weights, and in the emergent properties that these learning rules engender, as will be described in more detail elsewhere herein. Sapinet natively performs few-shot online learning, and can be trained in a semi-supervised or unsupervised mode (with post hoc labeling). More sophisticated instantiations can learn correspondingly more sophisticated representations. The SNN framework in which Sapinet is constructed further enables its instantiation on neuromorphic hardware such as the Intel Loihi research chip. This is of particular value because Sapinet benefits from the dimensionality inherent in large numbers of sensors (e.g., to limit background interference under high-noise conditions), even when these sensors are not individually characterized. Specifically, it does not suffer from the "curse of dimensionality" (i.e., geometrically increasing computational load as dimensionality increases) when implemented on appropriate hardware such as the Loihi chip (FIG. 5B).

With regard to the preprocessors 205, neural networks typically require well-behaved input data. Specifically, nonplastic network hyperparameters are generally optimized for particular ranges and distributions of input amplitudes, and the network may perform poorly if these limits are violated.

For example, mean input values that are much larger or smaller than the optimized range will often drive a network's state into uninteresting cul-de-sacs, whereas input values that are too unbalanced in their amplitudes can lead to overtraining on the stronger inputs while failing to train on weaker inputs, thereby impairing the network's ability to learn the structure of the input data. For a network to operate smoothly on unprocessed, real-world datasets, preprocessor algorithms are needed to automatically transform the resulting inputs into a form palatable to the network without losing the critical information that they contain. We have developed several such algorithms, as disclosed herein, any or all of which may be applied to raw input data (whether numerical or from sensor arrays) before presentation to the core Sapinet network.

One example of a preprocessor that is utilized in illustrative embodiments herein is a heterogeneous duplication preprocessor of the type illustrated in FIG. 4, as will now be described in more detail.

Ordinal forcing solves the input-distribution problem, but it loses useful information about the relative amplitudes of sensory inputs. To replace this, we developed a statistical regularization method that achieves the same outcome by employing two layers of input neurons with heterogeneously-weighted synapses, corresponding roughly to a matrix multiplication with randomized weights (FIG. 4). Specifically, within each column, sensors project to a heterogeneous set of excitatory feed-forward interneurons, rather than directly activating principal neurons. These excitatory neurons then project in turn (sparsely and randomly) to a heterogeneous set of principal neurons; the weights of these projections also are heterogeneous. The effect of this transformation (following sensor scaling and global normalization) is to standardize the distribution of activation levels across the incoming sensory streams, improving the capacity of the network to perform well under diverse, unpredictable environmental conditions. The principal neurons at the right hand side of FIG. 4 are illustratively part of the core network, and their outputs are applied to other portions of the core network, although numerous other arrangements are possible.

Other examples of preprocessors that can be used in illustrative embodiments include the following:

Sensor scaling. Neural network algorithms receiving sensor-array data implicitly assume that each sensor is weighted equally. Heterogeneous sensors or differently-scaled input sources violate this assumption and will lead to impaired network performance. This compensatory preprocessor algorithm rescales diverse sensors such that all inputs to the SNN are statistically similarly scaled. This can be achieved manually if different sensor input ranges are known (e.g., 5V sensors mixed with 1.8V sensors), or inferred based on training set data. Sensor scaling also improves performance when a substantial fraction of deployed sensors are not particularly sensitive to any features of the dataset being analyzed, which typically occurs when the sampling strategy is to deploy a great diversity of sensors without established responsivity to the signals of interest.

Non-topographical contrast enhancement (NTCE). This is also referred to as high-dimensional contrast enhancement. This preprocessor algorithm applies an adjustable high-dimensional sharpening filter onto raw input patterns for purposes of contrast enhancement.

Unsupervised global normalization. This preprocessor algorithm decrements the activity of all individual sensor inputs based on their mean, or widely projects all-to-all inhibition across sensor inputs, so as to limit the total input activation of the network to a narrow range without disrupting the relational pattern of amplitudes across sensors that is the basis for signal specificity. Generally, global normalization should be applied after sensor scaling if that preprocessor is also used. This algorithm also underlies concentration tolerance (also referred to as concentration invariance)—the concomitant ability to recognize the same signal across a range of intensities even without explicit training on the full range of intensities tested.

Mirror encoding. A related problem arises when multiple patterns (classification groups) are to be learned by an SNN, but one or more of these classification groups comprise substantially larger mean activity across sensors than others. This can lead to an imbalance in network training and a prevalence of one-sided classification errors. The process of mirror encoding generates a negative duplicate of each sensory input (doubling their number), then offsets and scales the resulting values if necessary.

Ordinal forcing. Some versions of the Sapinet algorithm allow the network to determine the population of interneurons that is made available for differentiation during training (rather than allocating separate populations explicitly). While this flexibility improves generalization performance, it renders the network sensitive to the statistical distribution of input amplitudes, with broader, flatter distributions systematically recruiting more interneurons. To address this problem, input levels are ranked and then assigned values drawn from a standard distribution as determined by their rank. This forces the input vector to conform to a single, optimized amplitude distribution. This strategy is fast and effective, though it loses substantial signal information; consequently, it is presently used mainly for testing purposes. It has been largely superseded by heterogeneous duplication.

Several extensions and/or variants of Sapinet have been developed, as described in more detail elsewhere herein.

Neuronal and synaptic heterogeneities. The ability to leverage heterogeneity has long been recognized in neuromorphic systems. Heterogeneities in the properties of principal neurons, interneurons, and their synapses in Sapinet variants improve statistical regularization, generalization properties, and classification performance, expanding the capacity of the network to perform well under diverse, unpredictable environmental conditions. These heterogeneities include the heterogeneous duplication preprocessor described above, but also include heterogeneities in interneuron and principal neuron spiking thresholds, in the maximum synaptic weights that determine the feedback interneuron receptive field order k, in synaptic learning rates, in convergence and projection ratios, and in other cellular and synaptic properties, often specific to particular network layers. Each of these heterogeneities can provide improvements to network performance under particular circumstances.

Neuromodulation. Neuromodulation broadly describes a constellation of interdependent state changes across a network that can dynamically reconfigure it for different purposes. An additional, novel extension to the neuromodulation concept in Sapinet is to implement neuromodulation as a trajectory across state configurations (neuromodulatory sweep), such that the results of the best available state configuration can be applied to the current input stream without the need to introspectively assess which configuration to apply. We have shown this to improve classification performance under very high noise (FIG. 8(c)). Second, neuromodulation also can be used to regulate the stringency of the non-topographical contrast enhancement preprocessor, in either a static or trajectory form. Third, neuromodulation within the inference network can be deployed to regulate the learning versus recall states, as has been proposed for the biological piriform cortex. In concert with other inference network properties, this function can improve "learning in the wild" performance by dynamically shifting between learning and recall modes without supervision (e.g., using an inference network). More broadly, Sapinet will broadly deploy the concept of transitioning through orderly sequences of interdependent parameter states in order to increase the performance and adaptability of the network.

Adaptive network expansion (ANE). Sapinet intrinsically excels at online learning—the ability to acquire new class memories without losing existing memories or requiring careful retraining protocols. Its extension, lifelong learning, describes the highly desirable property wherein these new class memories can be acquired indefinitely. Sapinet achieves online learning in part through the permanent differentiation of feedback interneurons in the core network; this process takes these differentiated interneurons out of the "trainable" population and hence limits the learning capacity of an instantiated network as the trainable interneuron population becomes depleted. However, Sapinet is able to add new, differentiable interneurons to an existing, trained network without disrupting the existing class memories (adult neurogenesis). Accordingly, new interneurons can be added indefinitely to replace those that have been differentiated out of the trainable pool, expanding the network in proportion to the number of different class memories that have been learned.

The strict allocation and replacement of interneurons described in conjunction with illustrative embodiments herein is straightforward and effective, but a more complex algorithm for the allocation and differentiation of GC interneurons increases the capacity of Sapinet to generalize among input patterns. This is referred to in the machine learning literature as "learning beyond experience," a potent form of transfer learning. Specifically, a large undifferentiated population of core network interneurons is provided for any encountered stimulus to differentiate. Distinct but similar input patterns therefore may share a fraction of their responsive interneurons even after full differentiation, thereby creating a basis for similarity. The challenge is to regulate the number of interneurons differentiated by any new representation irrespective of its internal statistics. The statistical regularization enabled by the heterogeneous duplication preprocessor, coupled with excitatory weight and interneuron threshold heterogeneities, enables this variable to be managed (e.g., with heterogeneous duplication, as described above, replacing ordinal forcing).

Under this interneuron recruitment model, fully differentiated interneurons are then replaced post hoc by new, trainable interneurons via ANE in order to enable lifelong learning. It should be noted that such references to replacement of differentiated interneurons herein do not imply that the differentiated interneurons are removed from the network. Instead, both the differentiated interneurons and the new interneurons now are embedded within the expanded network. ANE increases coding efficiency and reduces memory interference by allocating interneurons preferentially where they are most needed, and/or pursuant to the learning of specific fine discriminations between very similar sensor inputs (supervised perceptual learning). ANE can also be applied to certain preprocessors (e.g., to the inhibitory interneurons utilized by the non-topographical contrast enhancement and global normalization preprocessors) and to certain instantiations of the inference network (e.g., to support supervised perceptual learning), as illustrated in FIG. 2.

The inference network 211 illustratively has multiple levels of complexity that can encompass several distinct functions in the complete Sapinet network.

A simple effect of an inference network is "contextual priming," in which the priming of the interneuron population in the core feedback network enhances classification performance (e.g., FIG. 8(d)). This priming effect also can enable the sequential recognition of multiple known signals that may be simultaneously present, rather than forcing the network toward only a single conclusion. Contextual priming can also be deployed as part of a stimulus, to enable the correct parsing of a situation where the same signal should be classified differently depending on other situational factors that are not part of the signal. This priming signal of course can be determined based on a sensor or equivalent input, but this mechanism (deploying the priming signal onto interneurons) is a more powerful method of achieving such an outcome compared with communicating this contextual signal via additional standard sensor inputs.

A slightly more complex version of the inference network conducts associative memory-like pattern completion operations, participating in the gamma cycle in parallel with the direct principal neuron—interneuron feedback loop and serving in part to counteract negative noise (FIG. 2). This form of inference network can increase the performance and flexibility of a Sapinet network, incorporating two memory systems within a single recurrent attractor network. It also is capable of the "neuromodulatory" regulation of learning vs. recall, as discussed above, enabling Sapinet to, for example, turn on learning whenever a stimulus was not recognized (i.e., a "none of the above" outcome). Finally, in a "hypothesis testing" mode, this network also can drive priming effects so as to facilitate the recognition of multiple knowns within a single sample.

A more sophisticated implementation of the inference network incorporates and enriches each of the above capabilities within a manifold learning context. Briefly, by constructing the more sophisticated, lifelong-learning version of the core feedback network described above, similarity can be more richly and specifically represented, and repeated sensory experiences then can be used to build explicit manifolds within the inference network to define class memories (e.g., via stacked sparse manifold transforms). Among other potential advantages, this process enables two qualitatively new capacities to be developed: supervised perceptual learning and hierarchical classification. Hierarchical classification enables classification models to be built where additional precision can be gained under favorable circumstances. A class of "orange" odors hence can be subdivided into "Valencia orange," "tangerine," and "clementine" (based on sufficient differential training). If a signal is not clean enough to identify with the desired certainty which of these three classes it falls into, it can be identified with greater certainty as the next broader hierarchical class (equivalence class; here corresponding to "orange"). In the absence of such hierarchy, training on these three finer-scale classes impairs the capacity to recognize the broader class. Supervised perceptual learning, in turn, enables the network to learn to more strongly differentiate two physically similar signals by learning to emphasize their reliable differences and elide their similarities by adjusting the allocation of inhibition. Essentially, relatively reliable sub-patterns are deployed in the same manner as the full patterns in order to remap similarity relationships in service to their relative implications rather than strictly to their physical natures.

In these ways, manifold learning enables full instantiation of a similarity-based hierarchical learning scheme, in which poor-quality signals (with substantial noise and inter-sample random differences) can be accurately identified as members of the broadest equivalence group of the class memory, whereas higher-quality, lower-noise signals can additionally be sub-classified within finer-scale equivalence groups within the hierarchical representation. That is, after training, "wine" could be identified under very high background interference, whereas a well-trained Sapinet could, under low-noise circumstances, distinguish "Merlot" from "Malbec." Like the mammalian olfactory system, this would of course require prior training to learn to differentiate the two varieties. In both cases, the primary limitation on classification precision (as opposed to accuracy) is the richness of training, and the secondary limitation is sampling error (noise).

A number of example use cases of illustrative embodiments will now be described in more detail. These example use cases may be viewed as carrying out particular automated actions using outputs generated by Sapinet.

Sapinet is applicable to any problem based on the learning and classification of sensory input populations that do not exhibit relevant low-dimensional structure, such as the two-dimensional patterns of a visual image. This is likely to render Sapinet non-competitive in visual classification problems such as ImageNet and MNIST. However, a wide variety of applications are effectively addressed by Sapinet. It should be noted that, even beyond the algorithmic relevance of Sapinet, the existence of energy-efficient neuromorphic hardware such as the Intel Loihi means that functional embedded devices based on the Sapinet algorithms are achievable in the near term. Advantageously, Sapinet can be used with arbitrary sensor arrays of any sort, enabling an end user or applications developer to select sets of sensors that best match customer requirements. Sapinet can run on a variety of different types of processing platforms, including by way of example, generic GPU hardware and on the Intel Loihi platform. Some examples of Sapinet applications include:

1. Air quality monitoring, fire detection. Ongoing air quality monitoring is increasingly important in factories, mines, office buildings, laboratories, HVAC systems, and other environments including homes and schools. Sapinet-based embedded devices can be standalone or networked devices, configured, for example, to report the presence of specific detected contaminants along with estimates of certainty.

2. Chemical waste identification, chemosensory landmine detection, acute disaster site chemical monitoring. Handheld devices with embedded neuromorphic hardware and arbitrary sensor arrays can be carried into challenging conditions and deployed to quickly identify airborne or dissolved chemicals (depending on the sensor arrays utilized). Sensor poisoning and time- or exposure-based sensor decay and drift can be compensated for in the field by rapid retraining with standards. Similarly, replacement sensors can be quickly calibrated in the field in the same way.

3. Chemical species leak detection. Chemical species sensor systems for leak detection are of specific interest to NASA and other industries.

4. Spectral signature identification. Hyperspectral cameras deployed by surveillance drones and aircraft produce single-pixel spectral signatures. These spectra, discretized into defined bands, are diagnostic for features of interest and are well matched to Sapinet's strengths. Because these signals vary in time, this is an application that would make use of the ongoing sampling mode of the Sapinet theta cycle.

5. Medical diagnostic dataset assessment. Diagnostic datasets include arbitrary lists of measurements at arbitrary scales; patterns among these measurements are diagnostic for clinical status. For example, the Wisconsin Breast Cancer dataset includes several measurements of cell nuclei: their areas, their radii, their perimeters, and definitions of texture, concavity, and fractal dimension, among others. These values each have different units and vastly different ranges of magnitude. With the appropriate preprocessors, these numbers can be used directly to train Sapinet and then to classify additional samples for malignancy with high fidelity.

6. Microarray and other gene or protein expression signatures. Applications include cancer diagnostics, risk factor assessment for genetic conditions, and many other biomedical assessments; at present, a wide variety of analysis techniques are being assessed and compared with one another for diagnostic reliability. Microarray signatures comprise large sets of sensor values (i.e., high-dimensional patterns) without internal low-dimensional structure, and hence are well matched to Sapinet's strengths. Moreover, very high-dimensional patterns, which are computationally intensive to assess on hardware that is not highly parallel, can be analyzed very quickly with Sapinet on appropriate neuromorphic hardware (FIG. 10($b$)).

It is to be appreciated that the particular use cases described above are examples only, intended to demonstrate utility of illustrative embodiments, and should not be viewed as limiting in any way. Automated actions taken based on outputs generated by a neuromorphic algorithm of the type disclosed herein can include particular actions involving interaction between a processing platform implementing the neuromorphic algorithm and other related equipment utilized in one or more of the use cases described above. For example, outputs generated by a neuromorphic algorithm can control one or more components of a related system. In some embodiments, the neuromorphic algorithm and the related equipment are implemented on the same processing platform, which may comprise a computer, mobile telephone, handheld sensor device or other type of processing device.

These and other Sapinet implementations are illustratively configured to achieve the rapid—even one-shot—learning of multiple arbitrary signals in sequence and the subsequent detection of any of these signals under high levels of interference, even when the distribution of that interference is wholly unpredictable.

Conventional techniques generally depend on substantial amounts of training (hundreds or thousands of training trials, occupying many hours per sample). Moreover, this training in conventional implementations typically needs to encompass the actual variability in sample quality that will be encountered during testing. Such conventional approaches therefore need to know what that variability is, and this becomes a problem in environments where the background statistics may differ from those present under training conditions. Finally, in these conventional approaches, all of the samples that one might want to detect and discriminate are trained at the same time; in order to add a new sample later, network training is started over from scratch.

Sapinet embodiments disclosed herein advantageously overcome these and other drawbacks of conventional practice, through implementation of features and functionality that illustratively include one or more of the following.

1. The generation in the core network via learning of a heterogeneous population of permanently differentiated interneurons that respond to increasingly higher-order diagnostic features of a trained signal.

2. The implementation of in the core network ANE to enable lifelong learning. This illustratively refers to the addition of new, naïve neurons to replace those that are permanently differentiated by learning. This enables "lifelong learning" by supplying enough new neurons to enable the subsequent learning of an indefinite number of new signals. Sapinet is particularly configured to facilitate such lifelong learning.

3. Preprocessing using heterogeneous duplication. This preprocessing technique reduces the statistical variability of diverse input signals without significantly reducing their distinguishing features. With a preprocessor of this type, the network can be deployed into increasingly unpredictable environments and process a broader range of inputs with high fidelity.

4. The implementation of a neuromodulatory sweep, using a dynamical trajectory of changing states in particular network elements to essentially re-compute network output over a range of different network properties and then choose the best one.

5. The implementation of an inference network. This network in illustrative embodiments is highly heterogeneous; it constitutes multiple central computations that improve performance. For example, the inference network inserts illustratively itself into the core network's feedback loop, further biasing the network into particular attractor(s) by extracting and/or providing additional information. This information can arise from richer learned representations (e.g., manifold learning for hierarchical classification, as described elsewhere herein), or from prior information derived from other (multimodal) networks (for example, on a robot, visual information might provide some cues as to which chemical cues are more likely, and the inference network can insert these priors into the core network to make a correct result that much more likely even when it is really difficult). Such embodiments integrate various types of rich information into the core network, by having the inference network also learn about the permanently differentiated interneurons and be able to associate these with arbitrary external sources of information. Its eventual effect is to bias some proportion of the "correct" interneurons to improve performance (e.g., as illustrated in FIG. 8(d)).

6. Many of the above techniques rely on a core principle of structured heterogeneity—that is, use a population of slightly different elements (or different states over time) to represent information in a distributed form, and use this distributed information to maximize performance.

7. Configuration of an SNN to use the phase (fine scale timing) of spikes within gamma oscillations as an information metric, and/or to self-modify a representation via feedback to learn and follow an attractor.

These particular features and functionality of illustrative embodiments are presented by way of example only, and should not be considered as limiting in any way.

These and other features and functionality in some embodiments achieve online learning and lifelong learning capabilities by, for example, implementing a gamma feedback loop for iterative denoising and odor identification, and using the specific phase (timing) of spikes within gamma as an information metric.

In some embodiments, Sapinet provides what is referred to herein as "learning in the wild," a term highlighting that such embodiments are deployable in diverse environments with unknown stimuli without needing to tune the network specifically for these environments. Such a property is particularly important in the context of practical embedded devices.

Additional features and functionalities of some Sapinet embodiments include the following.

1. "Online learning" is a term meaning that a network can keep learning new things without disrupting prior learning ("catastrophic forgetting"). For example, Sapinet can learn a few signals, work to classify noisy signals for a while, and then be trained on one or more new signals that will simply add to that network's "library" of trained signals without disrupting the old ones or impairing its performance. In general, deep networks cannot do this; the new training not only takes a long time but disrupts the older training weights.

2. "Lifelong learning" is a central unsolved problem that is, for example, the focus of a major program at DARPA and elsewhere. Sapinet instantiates clear, effective lifelong learning, illustratively by the deployment of new interneurons into the network via ANE to replace those that have become dedicated, via learning, to recognizing a particular signal or group of signals. Again, such replacement does not imply that the dedicated interneurons are removed from the network. The network therefore gradually adds neurons over time, if and when new learning is performed.

3. One-shot (or few-shot) learning simply refers to the fact that the network can learn a representation effectively after only one (a few) training exposure(s), where one sample is processed over several gamma cycles.

4. "Learning in the wild" is our term for a set of properties (including properties based on preprocessor capabilities) that enable Sapinet networks to be deployable in diverse environments with many unknowns, without needing to tune the network specifically for these environments, as described previously.

In some embodiments, the core network is configured to allow Sapinet to rapidly learn input patterns (particular odors or other particular signals) and to identify them in the presence of powerful interference. The input pattern is presented to an array of principal neurons. Every individual sensor activates one (or, in variants, more than one) of these principal neurons. The pattern of activity across these sensors is diagnostic for a given odor/signal, but can easily be disrupted by interference.

The core network in some embodiments is continuously driven by two oscillatory frequencies; the slower one governs sampling whereas the faster one ("gamma") governs processing. The faster oscillations are embedded within the slower one; in some embodiments, there is a particular number of gamma cycles (e.g., five gamma cycles) embedded within one sampling cycle (though this ratio can vary).

Principal neurons each generate zero or one "spike" (activity pulses) per gamma cycle. Strongly activated principal neurons evoke their spikes earlier in the gamma cycle, moderately weakly activated principal neurons evoke spikes later in the gamma cycle, and very weakly activated principal neurons do not evoke a spike. This spike timing-dependent pattern of activity across these sensors directly reflects the raw activation levels of sensors, and hence also is diagnostic for a given odor/signal, but also can easily be disrupted by interference.

There also is a large population of interneurons. Principal neurons are each connected to a random subset of these interneurons (say, 20%, though this can vary) and excite them. Interneurons in turn are specifically assigned to deliver inhibition to the principal neurons associated with one given sensor (this rule can be varied, but there will typically be some specificity). This inhibition will cause delays in principal neuron spike times.

During training, relatively clean (low-noise) signals are used to train the network. Spiking activity in principal neurons activates interneurons. The interneurons have one or more embedded learning rules, illustratively implemented as one or more spike timing-dependent plasticity (STDP) rules, that cause them to be activated only by sufficient numbers of inputs from different principal neurons. When a given interneuron is activated, the one or more STDP rules (over the course of a few gamma cycles) adjust the synaptic weights of the starting inputs so that that interneuron now is only activatable by that specific set of k principal neuron inputs. This process is termed the differentiation of an interneuron, and it is irreversible. Some number of interneurons is now selective for some higher-order diagnostic feature of that odor/signal input. Important network variants include those in which the interneurons are heterogeneous such that some interneurons have relatively low values of k (e.g., they will be activated by the coactivation of, say, three specific principal neurons) and others have high k values (e.g., will only be activated by the coactivation of, say, fifteen specific principal neurons). An important principle here is that interneurons learn to become activated only by (somewhat to highly) specific and diagnostic features of learned odors/signals, and this learning is permanent. This process uses up interneurons every time a new odor/signal is learned. This is addressed in illustrative embodiments through the implementation of ANE functionality—the addition of new "naïve" interneurons with (for example) 20% random connectivity—so that new odors can be learned.

These activated interneurons then inhibit the principal neurons to which they are assigned. During training, the inhibitory synapses will progressively alter their efficacies so as to form attractors to the trained examples. In one illustrative embodiment, for example, an inhibitory synapse will learn to match the activity of its target principal neuron so that it releases that principal neuron from inhibition just at the time when the principal neuron spikes—guiding that neuron to do what it would do anyway under low-noise conditions. There are variants to the specific details of this rule.

During testing, odor/signal patterns may be disrupted by presentation variabilities (concentration differences, plume dynamics, etc.) or by occlusion (other background odors/ signals add to or subtract from the activation of particular sensors, disrupting the pattern unpredictably). An important mechanism of Sapinet is that any diagnostic features that remain detectable in that disrupted signal will activate their corresponding interneurons (initially the lower-k interneurons). These will deploy the "correct" inhibition onto principal neurons, affecting their spike timing such that the principal neurons more accurately reflect the odor/signal that is associated with those interneurons. This causes the principal neuron activity in the second gamma cycle to be a little bit closer to the memory of the learned odor/signal. The process then iterates, and starts recruiting higher-k interneurons as the activity pattern on each gamma cycle becomes closer to the learned odor/signal. After a number of gamma cycles, the principal neuron activity will converge onto a clear pattern that substantially matches one of the learned patterns.

If the signal does not converge, then either the pattern was too occluded to be recognized or the odor/signal presented was not one of those that had been learned. In either case, the network illustratively returns an answer of "none of the above." (This would be a correct result in the latter case, or a Type II error in the former case).

The initial presentation of an occluded test sample may well recruit lower-k interneurons from more than one learned representation. This is normal. As the gamma cycles iterate, the evolving representation will be drawn towards one or the other as the higher-k interneurons are recruited (because as k increases, the probability of multiple high-k interneurons from different learned representations being responsive to the same input pattern systematically decreases).

That is, Sapinet learns representations during training that are embedded in the pattern of synaptic weights to and from a heterogeneous population of newly differentiated interneurons. These interneurons remain in the network permanently and generate an attractor in the network that pulls any representation toward it that shares some of its higher-order diagnostic features. If multiple attractors initially attract a given representation, one will eventually win as the higher-k diagnostic features are progressively included.

Multiple odors/signals can be learned in sequence, each forming its own attractor in the network. (Odors/signals during training are labelled, so that a repeatedly presented odor can be used to modify its existing attractor rather than creating a separate attractor). Generally, learning a new odor/signal will be followed by the addition of new neurons via ANE—adding in new naïve interneurons to replace those that were differentiated by prior learning—so that new odors/signals can be learned with maximal effectiveness. This learning of new odors/signals can go on at any time without disrupting prior learning, and can in principle continue indefinitely ("lifelong learning").

Because inputs are expected to be higher-dimensional (i.e., a reasonably large number of sensors are deployed), these attractors can be kept substantially apart from one another. If very large numbers of odors/signals are to be learned, the dimensionality (number of different sensors) can be made correspondingly higher to maintain performance.

Accordingly, the Sapinet core network in illustrative embodiments is configured for generation via learning of a heterogeneous population of permanently differentiated interneurons that respond to increasingly higher-order diagnostic features of a trained signal. When a noisy signal is presented, some number of the lower-k diagnostic features are still likely to be present, and their activation of interneurons will nudge the noisy signal closer to one or more of the trained signals. As this signal gets iteratively de-noised by this process, higher-k diagnostic features will become present, and will increasingly serve to draw the signal towards just one of the learned representations. The permanent differentiation of interneurons also enables their efficient replacement so that the network remains ready to learn any new arbitrary signals that might be presented to it.

As indicated previously, Sapinet performance can be improved via the addition of preprocessors, an expanded inference network, neuromodulation, and/or other features, as disclosed in conjunction with illustrative embodiments herein.

With regard to preprocessors, an important problem in real-world deployments is the unpredictability of the environment. Sensors respond differently based on temperature, humidity, air quality, wear and tear over time, accumulated damage, and other factors. Conventional training-based systems, such as deep networks, have vulnerabilities to certain changes in the statistical distribution of inputs (see, e.g., the substantial literature on "adversarial examples," which disrupt deep network performance using examples that usually appear easily classifiable to humans). Highly similar odor/signal patterns that have different meanings can be difficult to separate reliably (because their learned representations will share even higher-k differentiated interneurons in common). The capacity of the Sapinet core network to effectively deal with these realistic problems can be substantially enhanced by its series of preprocessors. For example, preprocessors as disclosed herein are illustratively configured to provide enhanced performance through heterogeneous duplication.

Heterogeneous duplication serves to regularize the distribution of input levels across the sensor array. Simple normalization corrects for potentially large differences in absolute activity across the array, such that if you plotted the activation levels of sensors (Y axis) against a list of all sensors arranged in declining order of activation (X axis) the area under these curves could be made essentially constant. However, this still permits some inputs to yield broader/flatter versus taller/narrower distributions, and these can have different enough effects on interneuron activation patterns that the network cannot be well optimized for both. Heterogeneous duplication takes these distributions and regularizes them so that they all assume a more common distribution.

In some embodiments, a heterogeneous duplication method is configured such that, instead of each sensor directly feeding into a principal neuron (after preprocessing), each sensor feeds into one or more excitatory interneurons, and these in turn each feed into one or more principal neurons. Hence, there will be multiple excitatory interneurons and multiple principal neurons per sensor ("per column"), and each will have slightly heterogeneous properties so as not to simply duplicate one another. Interestingly, this process leads to regularization among the activity patterns of principal neurons (i.e., the distribution of activity levels follows a more predictable curve that enables the core network that follows to be better optimized for a wider range of sensory inputs, without having to tune the network for particular input types). In some embodiments, heterogeneous duplication allows the coefficient of variation (CV) to be reduced (or, equivalently, the coefficient of determination ($R^2$) to be increased) as the numbers of principal neurons (e.g., MCs) and excitatory feedforward interneurons (e.g., ET neurons) per sensor (column) increase. For a given number of principal neurons per sensor/column, increasing the convergence ratio (the number of excitatory interneurons that converge onto each principal neuron) also reduces the coefficient of variation. Lower values of CV denote greater consistency, and in this context imply improved network performance. In some embodiments, the mechanistic basis for this heterogeneous duplication effect illustratively involves an effect of drawing the rate of decay of sensor activation levels (across the principal neuron population after sorting for activation amplitude) towards a decay function that is embedded in the degree and form of heterogeneity among the properties of the neurons.

Additional illustrative embodiments will now be described with reference to FIGS. 5 through 10.

The embodiments to be described provide a neural algorithm for the rapid online learning and identification of odorant samples under noise, based on the architecture of the mammalian MOB and implemented on the Intel Loihi neuromorphic system. As with biological olfaction, the spike timing-based algorithm utilizes distributed, event-driven computations and rapid (one-shot) online learning. Spike timing-dependent plasticity rules operate iteratively over sequential gamma-frequency packets to construct odor representations from the activity of chemosensor arrays mounted in a wind tunnel. Learned odorants then are reliably identified despite strong destructive interference. Noise resistance is further enhanced by neuromodulation and contextual priming. Lifelong learning capabilities are enabled by adult neurogenesis. The algorithm is applicable to any signal identification problem in which high-dimensional signals are embedded in unknown backgrounds.

Spike timing-based mechanisms of coding and computation operating within plastic neural circuits present a central problem of interest to both neuroscience and neuromorphic computing. We have found that a coordinated set of these mechanisms, hypothesized for the neural circuitry of the external plexiform layer (EPL) of the mammalian MOB, exhibits rapid learning of arbitrary high-dimensional neural representations and robust memory recall despite occlusion by random sources of destructive interference. Based on these mechanisms, we derived a neural algorithm for the learning of odorant signals and their robust identification under noise, and instantiated it in the Intel Loihi neuromorphic system. The algorithm operates over a network of excitatory and inhibitory units that embed feedforward and recurrent feedback circuit motifs. Information in the network is represented by sparse patterns of spike timing measured against an underlying network rhythm. Learning is based on local spike timing-dependent plasticity rules, and memory is retrieved over sequential gamma-breadth packets of spiking activity. The network can be effectively trained using one-shot learning, and innately supports online learning; that is, additional training on new stimuli does not disrupt prior learning.

While both biological and artificial olfaction systems recognize chemical analytes based on activity patterns across arrays of weakly specific chemosensors, mammalian olfaction demonstrates levels of performance in signal restoration and identification currently unmatched by artificial systems. Indeed, the underlying identification problem is deceptively difficult. Natural odors comprise mixtures of many different odorant molecules; moreover, under natural conditions, different odors from many separate sources intermingle freely and, when sampled together, chemically occlude one another in competition for primary chemosensor binding sites. This occlusion substantially disrupts the primary sensory activation patterns that provide the basis for odor recognition. Moreover, the patterns of potential occlusion are unrelated to the input statistics of the odors of interest, and hence unpredictable. This presents an extraordinary signal restoration challenge that has been recognized as one of the central problems in neuromorphic olfaction. By designing a neuromorphic algorithm based on computational principles extracted from the biological system, and implementing it on a compact, field-deployable hardware platform, we sought to dramatically improve the performance and capabilities of artificial chemosensory systems deployed into uncontrolled environments.

This biological system exhibits several important properties and mechanisms that we used to address the problem. Primary sensory representations of odor stimuli at steady state constitute intrinsically high-dimensional feature vectors, the dimensionality of which is defined by the number of receptor types (columns) expressed by the olfactory system; this number ranges from the hundreds to over 1000 in different mammalian species. Each of these receptor types induces spiking in a corresponding group of principal neurons (e.g., MCs). Mechanistically, fast coherent oscillations in the gamma band (approximately 30-80 Hz), which are intrinsic to MOB circuitry, phase-restrict the timing of these MC action potentials. This property discretizes spiking output into gamma-breadth packets, here enabling a robust within-packet phase precedence code[17, 18] that disambiguates phase-leading from phase-lagging spikes within the permissive epoch of each gamma cycle. Recurrent activity loops in MOB circuitry evince control systems architecture, implementing gain control in the superficial layers and enabling autoassociative attractor dynamics in the deeper network. Odor learning in the biological system is localized and rapid, and depends substantially on plastic synapses within the MOB, here instantiated as spike timing-dependent plasticity rules. The neuromodulatory tuning of MOB circuit properties here is leveraged as an optimization trajectory rather than a fixed state variable. Adult neurogenesis in the MOB, known to be required for odor learning and memory, here provides indefinite capacity for lifelong learning through the permanent differentiation and replacement of plastic interneurons.

An example algorithm in the illustrative embodiments to be described is derived from these computational properties of the EPL neural circuit in the biological MOB. We train and test the algorithm using data from the Vergara et al. dataset, acquired from an array of 72 chemosensors mounted across a wind tunnel, and show that it rapidly learns odor representations and robustly identifies learned odors under high levels of destructive interference, as well as in the presence of natural variance arising from odorant plume dynamics. The destructive interference model, impulse noise, is designed to model the effects of intermixed, simultaneously sampled background odorants that effectively randomize the activation levels of a substantial fraction of the primary sensors on which odor recognition depends. The algorithm exhibits online learning and generalizes broadly beyond experience; accordingly, it can be trained on relatively clean diagnostic samples using one- or few-shot learning and then deployed into environments containing unknown contaminants and other sources of interference.

Figure 5A:
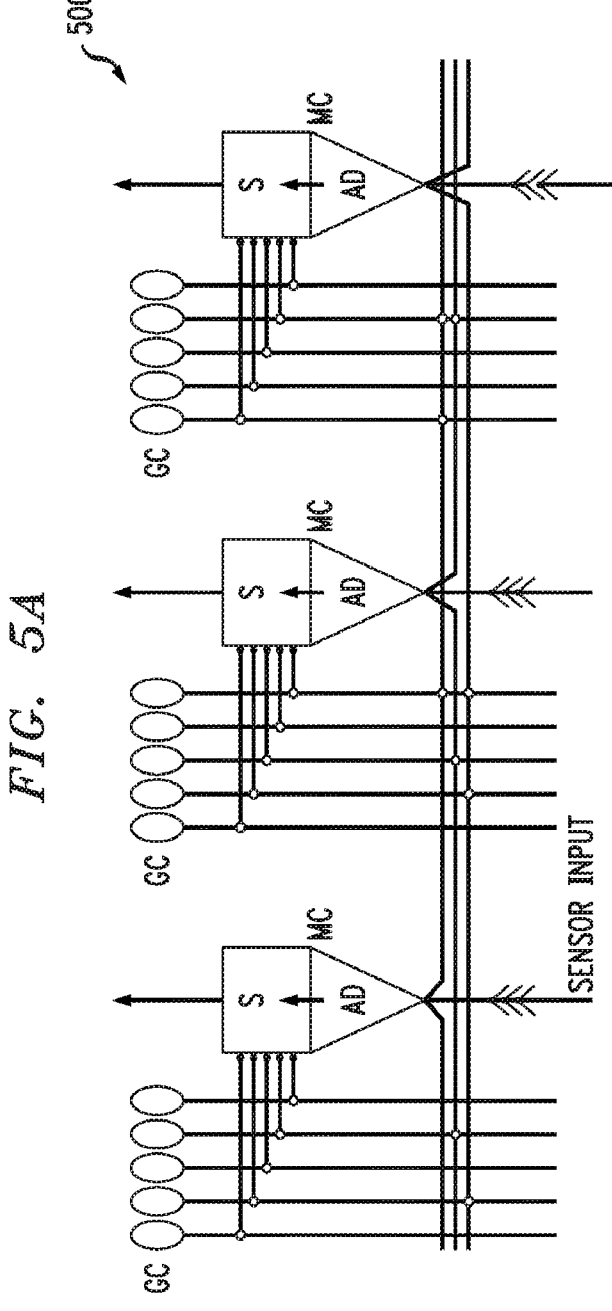
FIG. 5A shows a portion of an SNN utilized in implementing a neuromorphic algorithm in an illustrative embodiment.
Figure 5B:
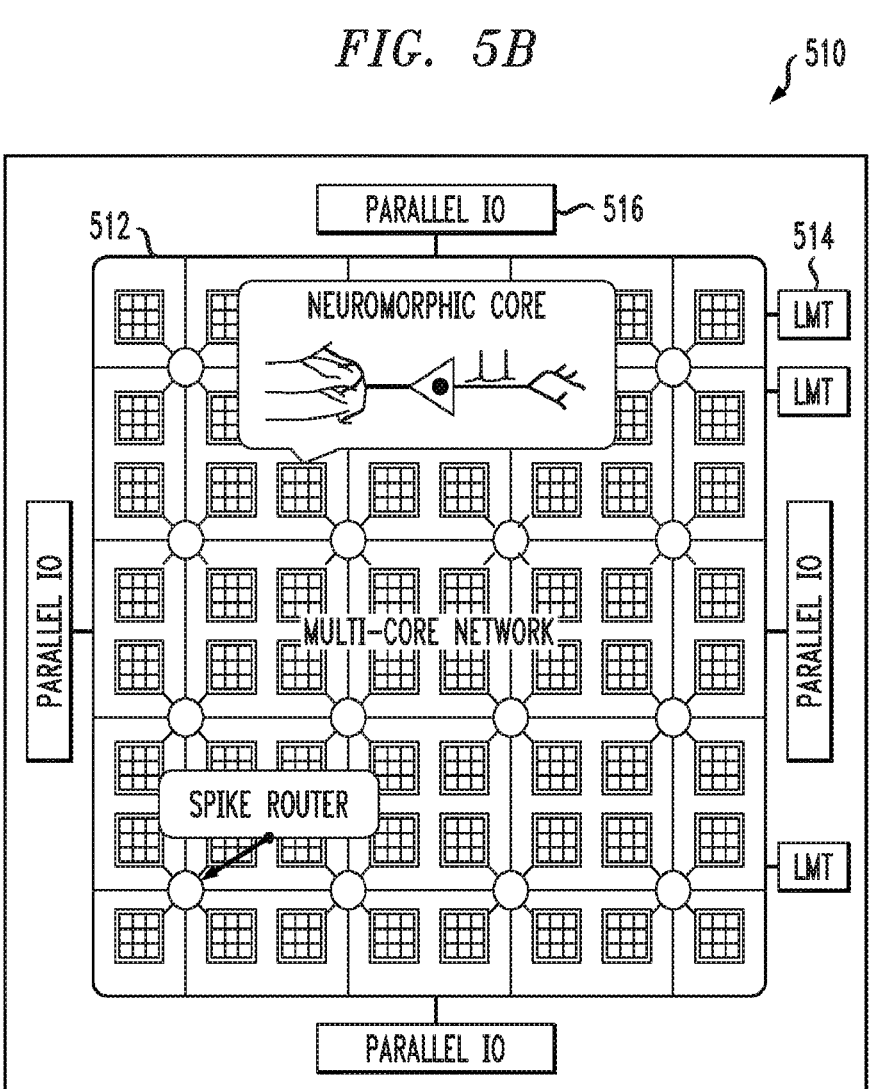
FIG. 5B shows an example of a processing device implementing a neuromorphic algorithm using an SNN in an illustrative embodiment.

FIG. 5A shows a portion 500 of an SNN utilized in implementing a neuromorphic algorithm in an illustrative embodiment. More particularly, FIG. 5A illustrates the architecture of the neuromorphic model. Sensor input is delivered to the apical dendrite (AD) of each MC, which in turn excites its corresponding soma (S). The resulting MC activation is propagated out via its lateral dendrites to synaptically excite the dendrites of GCs. The distribution of excitatory connections (open circles) is sparse and independent of spatial proximity. In contrast, GC spiking activity is delivered as inhibition onto its local, cocolumnar MC.

FIG. 5B shows an example of a processing device 510 implementing a neuromorphic algorithm using an SNN in an illustrative embodiment. In this embodiment, the processing device 510 comprises an Intel Loihi neuromorphic chip having a multi-core network 512 that includes 64 neuromorphic cores interconnected by a mesh of spike routers as illustrated. The neuromorphic cores (small squares) of the multi-core network 512 operate in parallel and communicate through the mesh of spike routers (circles). Also depicted are three embedded x86 Lakemont cores (LMT) 514 and four parallel input/output (IO) interfaces 516. The Loihi neuromorphic chip illustrated in the figure is fabricated in Intel's 14 nm FinFET process and includes 2.07 billion transistors over the many-core mesh. It is to be appreciated that use of the Intel Loihi neuromorphic chip in illustrative embodiments herein is by way of example only, and the disclosed neuromorphic algorithms can be implemented using a wide variety of alternative integrated circuits or other processing devices.

Figure 5C:
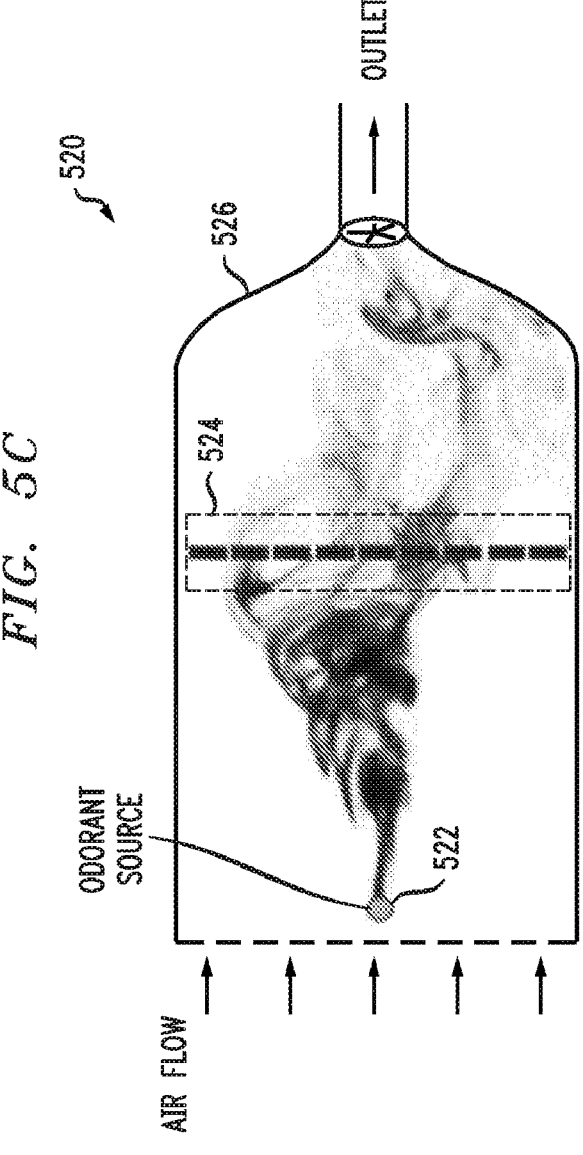
FIG. 5C shows an example deployment scenario of a sensor array in an illustrative embodiment.

FIG. 5C illustrates odorant delivery from an odorant source 522 to a 72-element chemosensor array 524 deployed within a wind tunnel 526. Nine banks of eight sensors each were deployed across the full 1.2 m breadth of the wind tunnel 526. In this embodiment, presentation of acetone or toluene to the chemosensor array 524 resulted in characteristic patterns of spiking activity across the 72 MCs. Stronger sensor activation led to correspondingly earlier MC spikes within each gamma cycle. In the absence of noise, the response was odor-specific but stationary across five sequential gamma cycles. Adjacent indices refer to sensors that are in adjacent locations across the wind tunnel, irrespective of their type. Inhibitory epochs were 20 timesteps (ts) in duration, as were permissive epochs.

These and other aspects of the illustrative embodiments of FIGS. 5A, 5B and 5C are described in more detail below.

The structure of the model network of FIG. 5A based on the circuitry and computational properties of the mammalian MOB, is optimized for efficient implementation as an SNN on the Loihi chip shown in FIG. 5B. In particular, we instantiated some core principles of MOB computation that we have hypothesized for the biological system, including (1) the dynamically acquired, learning-dependent topology of the lateral inhibitory network of the EPL, (2) the importance of gamma-discretized spike timing-based computation in the EPL, (3) the principle that MCs deliver excitation to GCs irrespective of distance, whereas GCs effectively inhibit MCs only locally, and only via GC spiking, (4) the principle that this inhibition of MCs by GCs predominantly manifests as delays in MC spike times on the gamma timescale, (5) the principle that these fine-timescale EPL computations do not meaningfully influence the coarse-timescale computations of the glomerular layer, (6) the principle that only a minority of principal neurons participate in gamma dynamics during any given stimulus presentation, (7) the permanent differentiation of GCs by the process of odor learning, and the consequent need for replacement by adult neurogenesis, and (8) the utility of treating neuromodulation as an optimization trajectory rather than as a stationary state.

Like the mammalian MOB, the neuromorphic EPL network is implicitly columnar, as illustrated in FIG. 5A. Each column comprises a single MC principal neuron as well as up to 50 inhibitory GC interneurons, coupled by moderately sparse intercolumnar excitatory synapses (connection probability=0.2) and local (intracolumnar) inhibitory synapses, although other arrangements can be used in other embodiments. We activated the MCs of a 72-column EPL network using the "Gas sensor arrays in open sampling settings" dataset published by Vergara et al. and available from the UCI Machine Learning Repository. Samples were drawn from the chemosensor array 524 of 72 metal oxide gas sensor (MOS) elements spatially distributed across the full 1.2 m breadth of the wind tunnel 526, as illustrated in FIG. 5C. From the 180 second datastreams comprising each odorant presentation in this dataset, sensor array responses were sampled ("sniffed") from a common point in time and presented to the EPL network for training or testing. That is, individual odor samples ("sniffs") comprised discrete feature vectors in which the pattern of amplitudes across vector elements reflected odor quality, as well as concentration-based variance owing to plume dynamics in the wind tunnel.

The biological EPL network is intrinsically oscillogenic in the gamma band (30-80 Hz), and MC action potentials are statistically phase-constrained with respect to these local oscillations. In our algorithm, MC spikes were constrained in time by an ongoing network oscillation with alternating permissive and inhibitory epochs reflecting the periodic inhibition of the MOB gamma cycle. Sensory integration and MC spiking were enabled only during permissive epochs, whereas inhibitory epochs reset and held the activation of all MCs at zero. Therefore, in the absence of learning, and given stationary sensor input, the temporal patterning of spikes evoked by a given odor directly reflected sensor activation levels—stronger excitation evoked correspondingly earlier spikes—and was repeated across successive gamma cycles. Different odors evoked correspondingly different spatiotemporal spike patterns across the MC population, thereby generating a hybrid channel/phase code, or precedence code, on the gamma timescale.

This dynamical architecture advantageously enables multiple iterative cycles of processing for each sample by taking advantage of the differences in timescale between sampling (4-8 Hz in rodent sniffing, 100 Hz in the Vergara et al. dataset) and processing (30-80 Hz gamma oscillations in the rodent MOB, 100 kHz in the Loihi chip). In the present instantiation of the algorithm, five gamma cycles, each requiring 0.4 ms to execute, were embedded within each odor presentation ("sniff") for both training and testing. After learning, GC feedback inhibition on each successive gamma cycle iteratively modified MC spike timing and hence altered the precedence code. Network output thus was interpreted as an evolving series of representations, in which each discrete representation comprised a population of spikes, with each spike defined by the identity of the active MC and the spike latency within the corresponding gamma cycle. These representations then were classified based on their similarities to each of the representations known by the network.

Figure 6A:
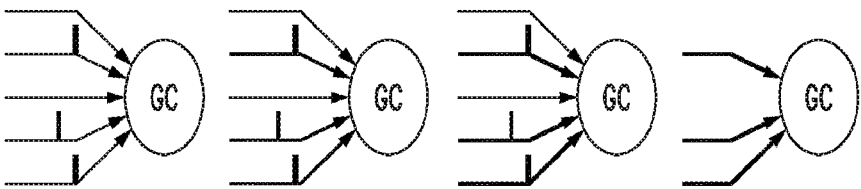
FIGS. 6A through 6C illustrate plasticity rules of a neuromorphic algorithm in illustrative embodiments.
Figure 6B:
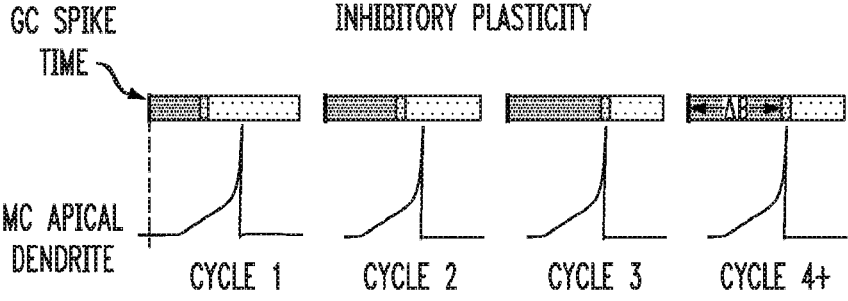
Figure 6C:
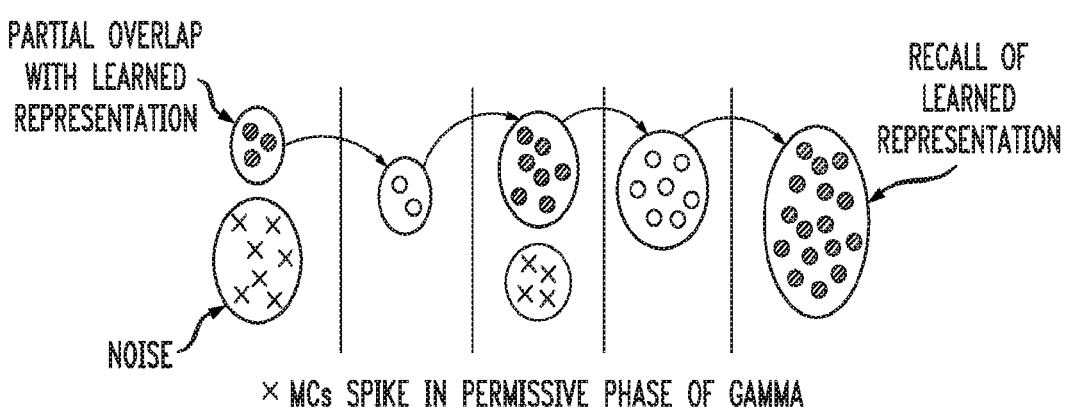

FIGS. 6A through 6C illustrate plasticity rules of a neuromorphic algorithm in illustrative embodiments.

Referring initially to FIG. 6A, this diagram illustrates an excitatory plasticity rule. During training, repeated coincident MC spikes converging onto a given GC activated that GC, and developed strong excitatory synaptic weights thereon, whereas other inputs to that GC were weakened and ultimately eliminated. Excitatory plasticity rendered GCs selective to higher-order features of odor representations. For example, after training on toluene or acetone, a number of GCs became responsive to specific combinations of activated MCs.

FIG. 6B illustrates an inhibitory plasticity rule. During training, the weight (duration) of spike-mediated GC inhibition onto its cocolumnar MC increased until the release of this inhibition coincided with spike initiation in the MC apical dendrite. The learned inhibitory weight corresponded to a blocking period ΔB during which spike propagation in the MC soma was suppressed.

Turning now to FIG. 6C, an illustration of the iterative denoising of an occluded test sample is shown. Partially-correct representations in MCs evoke responses in some of the correct GCs, which deliver inhibition that draws MC ensemble activity iteratively closer to the learned representation. Three permissive epochs interspersed with two inhibitory epochs are depicted. In the first permissive epoch, a partial overlap with a learned representation is shown, along with noise. MCs spike in the permissive phase of the gamma cycle and GCs spike in the inhibitory phase of the gamma cycle. In the third permissive epoch, a recall of the learned representation is shown.

These and other aspects of the illustrative embodiments of FIGS. 6A, 6B and 6C are described in more detail below.

Excitatory Plasticity Determines GC Receptive Fields

Each gamma-constrained array of MC action potentials, in addition to serving as network output, also drove its complement of postsynaptic GCs across the network. During learning, the synaptic weights between MCs and GCs were systematically modified by experience. GCs were modeled as single-compartment neurons that accumulated excitatory synaptic inputs from their widely distributed presynaptic MCs. Upon reaching threshold, they generated spike events that inhibited their cocolumnar postsynaptic MC in the subsequent gamma cycle.

GC spiking also initiated excitatory synaptic plasticity. Specifically, GCs learned to respond to higher-order stimulus features by becoming selective for specific combinations of MC spiking activity. To do this, we implemented an STDP rule that learned these input combinations in terms of a spike phase precedence coding metric on the gamma timescale. Under initial conditions, GCs required moderately synchronous spike inputs from several presynaptic MCs in order to evoke an action potential. Classical STDP most powerfully strengthens the synaptic weights of synapses mediating presynaptic spikes that immediately precede a postsynaptic spike; we implemented this principle with a heterosynaptic additive STDP rule that strengthened these synapses and weakened all other incoming synapses, including those in which the presynaptic MC spiked at other times or not at all (FIG. 6A). Accordingly, spiking GCs ultimately learned a fixed dependency on the synchronous firing of a set of k MC inputs, with inputs from other MCs decaying to zero (effectively a "k winners take all" learning rule). Consequently, at the end of the training period, the response to each trained odorant evoked a distributed ensemble of GCs tuned to a diversity of stimulus-specific higher-order correlation patterns.

Inhibitory Plasticity Denoises MC Representations

Spikes evoked by GC interneurons delivered synaptic inhibition onto the MC of their local column. As proposed for the biological system, the weights of GC-mediated inhibitory inputs regulated the timing of MC spikes within the permissive phase of the gamma cycle, with stronger weights imposing greater MC spike time delays within each gamma cycle. In the neuromorphic system, a GC spike blocked the generation of a spike on its follower MC for a period of time corresponding to the inhibitory synaptic weight. During odor learning, the durations of GC spike-evoked inhibitory windows were iteratively modified until the release of inhibition on the MC soma coincided with a threshold crossing in the MC apical dendrite resulting from integrated sensory input (FIG. 6B). During testing, the end of the GC inhibitory window permitted the MC to fire, and evoked a rebound spike in the MC even in the absence of sufficient apical dendritic input. Synaptic inputs from multiple local GCs onto a common MC were independent of one another, enabling a diverse range of higher-order GC receptive fields to independently affect the MC. During testing, occluded inputs activated some fraction of GCs, which then modified their postsynaptic MC spike times such that the representation in the next gamma cycle was closer to a learned odorant, hence activating an increased fraction of its corresponding GCs. This process continued iteratively until the learned representation was recalled (FIG. 6C).

This inhibitory plasticity rule enables the EPL network to learn the timing relationships among MC spikes in response to a given odor stimulus. Consequently, because relative spike times signify MC activation levels, the network effectively learns the specific ratiometric pattern of activation levels among MCs that characterizes a given odor. This spatiotemporal basis for odor representation enables a substantially greater memory capacity than would be possible with spatial patterning alone; for example, two odors that activate the same population of MCs, but at different relative levels, can readily be distinguished by the trained network. Moreover, it consumes fewer spikes than rate-coding metrics, and can be read out much more quickly because it does not need to integrate multiple spikes over time to estimate rate. Finally, this spike timing-based metric for relational encoding, coupled with odor-specific profiles of feedback inhibition, renders these memory states as attractors, enabling incoming stimuli to be correctly classified by the trained network despite surprisingly high degrees of destructive interference. The trained EPL network thus comprises a spike-timing based autoassociator, embedding an arbitrary number of content-addressable memories.

Figure 7:
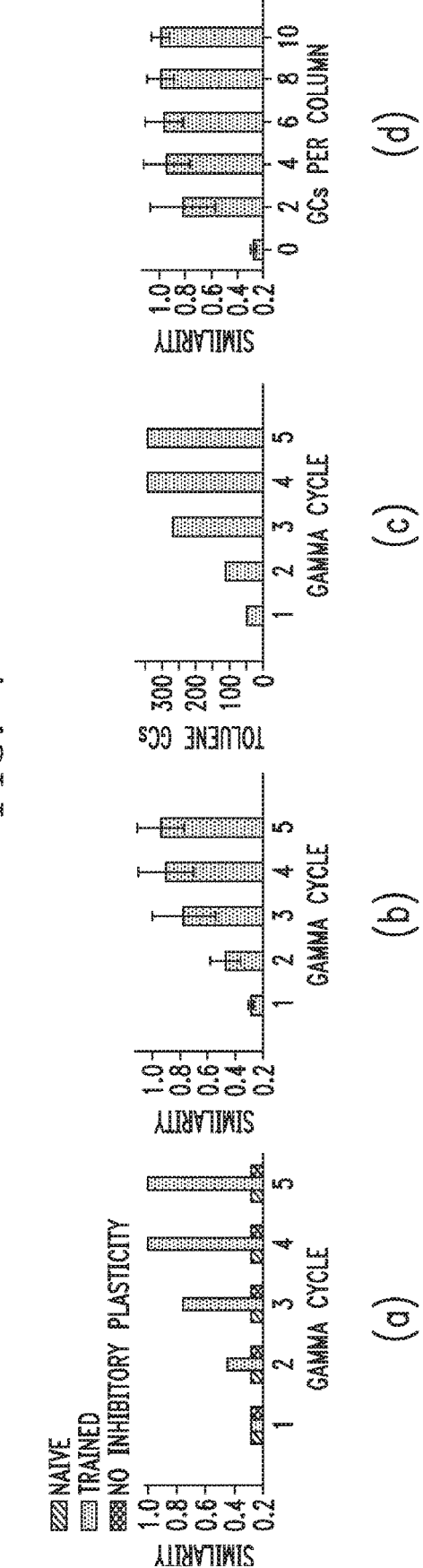
FIG. 7 is a set of graphical plots (a) through (d) showing aspects of odor learning in illustrative embodiments. The plots are also referred to herein as respective FIG. 7(*a*) through 7(*d*).

FIG. 7 is a set of graphical plots (a) through (d) showing aspects of odor learning in illustrative embodiments. In an initial simulation, an occluded instance of toluene (impulse noise P=0.6) was presented to an untrained network. The untrained network does not update the response to occluded toluene over five gamma cycles. The same occluded instance of toluene is then presented to a plastic network trained on (non-occluded) toluene. It was found that the activity profile evoked by the occluded sample was attracted to the learned toluene representation over successive gamma cycles. Finally, the same occluded instance of toluene was presented to a network trained on non-occluded toluene with excitatory, but not inhibitory, plasticity enabled. The omission of inhibitory plasticity rendered the network unable to denoise MC representations during testing.

FIG. 7(a) shows the Jaccard similarity between the response to occluded toluene and the learned representation of toluene systematically increased over five gamma cycles in the trained network (panel b), but not in the untrained network (panel a) or the network with inhibitory plasticity disabled (panel c).

FIG. 7(b) illustrates that the Jaccard similarity increased reliably over five gamma cycles when averaged over 100 independently generated instances of occluded toluene (impulse noise P=0.6). Error bars denote standard deviation.

FIG. 7(c) shows that, during learning, the number of GCs tuned to toluene increased over the five successive gamma cycles of training.

FIG. 7(d) shows mean Jaccard similarity in the fifth gamma cycle as a function of the number of undifferentiated GCs per column. Mean similarity is averaged across 100 occluded instances of toluene (impulse noise P=0.6); error bars denote standard deviation. Five GCs per column were utilized for all other simulations described herein.

These and other aspects of the illustrative embodiments of FIG. 7 are described in more detail below.
Odor Learning Enables Identification of Occluded Stimuli We first trained the 72-column network on the odorant toluene in one shot (i.e., one sniff, enabling learning over five gamma cycles), and then, with plasticity disabled, tested the response of the trained network to presentations of toluene contaminated with destructive interference. To generate this interference, we entirely replaced a proportion P of the sensory inputs with random values (impulse noise, P=0.6 unless otherwise indicated) to represent strong and unpredictable receptor occlusion through simultaneous activation or inhibition by other ambient odorants. The occluded inputs remained consistent over the five gamma cycles of a sniff. In a naïve network, the presentation of occluded toluene yielded an essentially stationary and uninformative representation (FIG. 7(a)). However, in the trained network, the spiking activity generated by occluded toluene was attracted over the five gamma cycles toward the previously learned toluene representation, enabling clear identification of the occluded unknown (FIGS. 7(a)-7(b)). In contrast, if inhibitory plasticity (FIGS. 6B and 6C) was suppressed during training, the trained EPL network was unable to denoise the MC representation (FIG. 7(a)).

As hypothesized for the biological MOB, odor learning in the network induces the permanent differentiation of granule cells (FIG. 7(c)) that thereby become selective for higher-order feature combinations that are relatively diagnostic of the learned odor. We tested whether increased allocations of GCs, enabling each MC to be inhibited by a broader selection of feature combinations, would improve odor learning and identification under noise. We found that increasing the number of undifferentiated GCs per column improved the robustness of signal restoration, increasing the similarity of the occluded signal to the learned representation after five gamma cycles (FIG. 7(d)). Nevertheless, we limited our simulations to five GCs per trained odorant and five gamma cycles per sniff in order to avoid ceiling effects and thereby better reveal the variables of greatest interest.

These illustrative embodiments also illustrate that adult neurogenesis enables lifelong learning. The learning algorithm in the present embodiments irreversibly consumes GCs. Each odor memory is associated with a distributed population of differentiated GCs tuned to its complex diagnostic features. Fully differentiated, mature GCs do not undergo further plasticity and hence are protected from catastrophic interference. The learning of successively presented new odorants, however, would be increasingly handicapped by the declining pool of undifferentiated GCs (FIG. 7(d)). The competition among distinct new odorants can be substantially reduced by sparser initial MC→GC connectivity and higher numbers of GCs, among other parameters; however, genuine lifelong learning in such a system requires a steady source of undifferentiated GCs. Exactly this resource is provided to the mammalian olfactory system by constitutive adult neurogenesis. The important role of adult neurogenesis in odor learning is therefore interpreted in this light, in some embodiments herein.

In the neuromorphic algorithm, constitutive adult neurogenesis was simulated by configuring a new set of five GCs in every column after each successively learned odor stimulus. Hence, training a 72-column network on ten odors yielded a network with 3600 differentiated GCs. New GCs each received initial synaptic connections from a randomly selected 20% of the MCs across the network, and delivered inhibition onto their cocolumnar MC.

Figure 8:
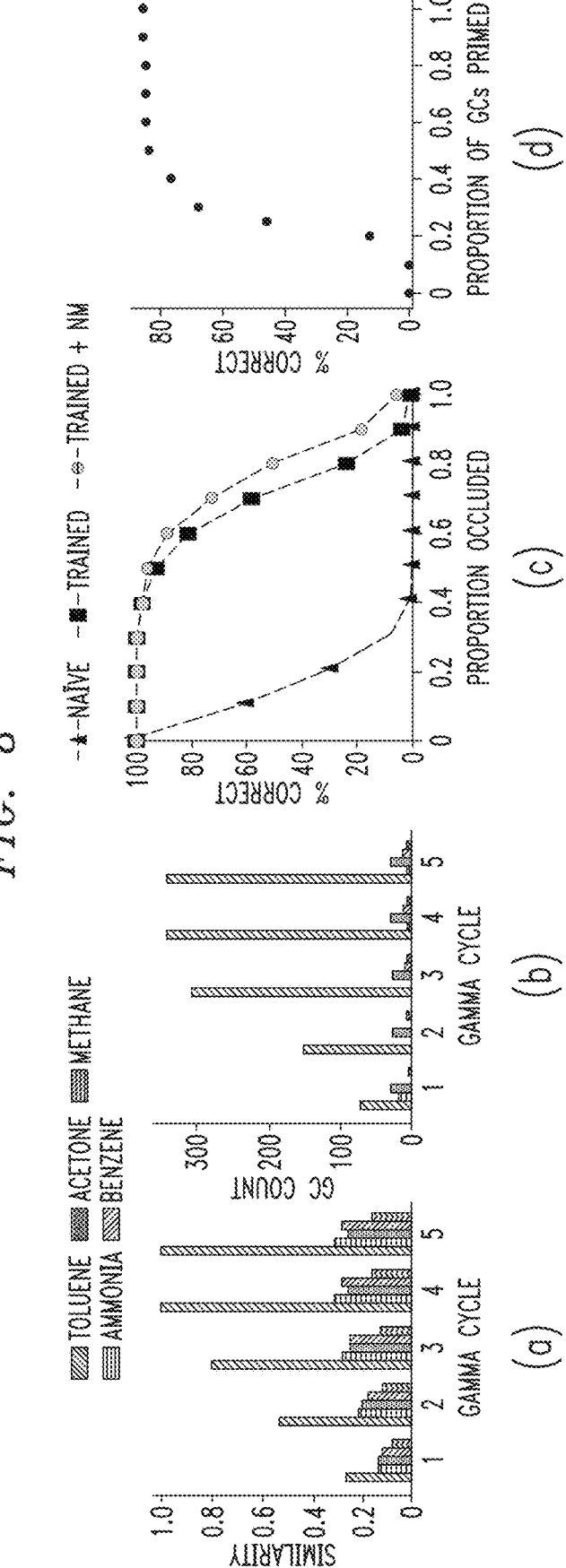
FIG. 8 is a set of graphical plots (a) through (d) showing aspects of multi-odor learning in illustrative embodiments. The plots are also referred to herein as respective FIG. 8(*a*) through 8(*d*).

FIG. 8 is a set of graphical plots (a) through (d) showing aspects of multi-odor learning in illustrative embodiments. The network was trained on ten odorants, including toluene, acetone, methane, ammonia and benzene.

A representation generated by a sample of occluded toluene (P=0.6) was progressively drawn towards the learned representation of toluene and away from the learned representations of acetone and the other eight odorants.

FIG. 8(a) shows the Jaccard similarity to toluene that was evoked by the occluded-toluene stimulus increased over five successive gamma cycles until the stimulus was classified as toluene (similarity >0.8). For clarity, only the above-noted five odorants are depicted.

FIG. 8(b) shows that the number of toluene-tuned GCs activated by the occluded-toluene stimulus progressively increased over five gamma cycles as the MC spiking activity pattern was attracted towards the learned toluene representation. GCs tuned to the other nine odorants were negligibly recruited by the evolving stimulus representation.

Additional simulations measured network activity evoked by presentation of occluded instances of each of the ten learned odors following one-shot learning. It was found that the same network can reliably recognize all ten odorants from substantially occluded examples (P=0.6).

FIG. 8(c) shows mean classification performance across all ten odorants under increasing levels of sensory occlusion (100 impulse noise instantiations per odorant per noise level). The abscissa denotes the level of impulse noise, that is, the proportion of MC inputs for which the sensory activation level was replaced with a random value. This figure shows the proportion of correct classifications by an untrained network, the proportion of correct classifications by a network trained on all ten odorants, and the proportion of correct classifications by a trained network with the aid of a neuromodulation-dependent dynamic state trajectory.

FIG. 8(d) illustrates the effects of GC priming on classification performance under extreme occlusion. One hundred independently generated samples of occluded toluene with impulse noise P=0.9 were presented to the fully-trained network. The putative effects of priming arising from piriform cortical projections onto bulbar GCs were modeled by lowering the spike thresholds of a fraction of toluene-tuned GCs. As the fraction of toluene-tuned GCs so activated was increased, classification performance increased from near zero to over 80% correct.

These and other aspects of the illustrative embodiments of FIG. 8 are described in more detail below.

Online Learning of Multiple Representations

We then trained the 72-column network sequentially with all ten odorants in the dataset, using a one-shot training regimen for each odor. In each case, the network was trained on one odor first, followed by a second odor, then by a third, until all ten odors had been learned. Similar results were obtained irrespective of the order in which the ten odorants were trained. A set of new, undifferentiated GCs was added to the network after each odor was learned, reflecting the effects of adult neurogenesis. It should be noted that subsequent odor training did not disrupt the memories of previously learned odors; that is, the EPL network supports robust online learning, and is resistant to catastrophic forgetting. This capacity for online learning is important for memory formation under natural conditions, as well as for continuous device operation in the field; in either case, new signals of potential significance may be encountered at unpredictable times, and incorporated nondestructively into an existing knowledge base.

We then tested the algorithm's capacity to recognize and classify odorant samples that were strongly occluded by impulse noise, reflecting the effects of any number of independent odorous contaminants that could mask the odor of interest in uncontrolled environments. Following training on all ten odorants, sensor-evoked activity patterns generated by strongly occluded odor stimuli (impulse noise P=0.6) were attracted specifically towards the learned representation of the corresponding odor. Notably, the same network was able to rapidly identify occluded instances of all ten odors within five gamma cycles. An odor was considered identified when the spatiotemporal pattern of its evoked spiking activity exceeded a Jaccard similarity of 0.75 to one of the network's learned representations. Performance on this dataset under standard conditions was strong up to sample occlusion levels of P=0.6, after which increased occlusion began to gradually impair classification performance (FIG. 8(c)).

Neuromodulation and Cortical Priming Improve Classification Performance

Neuromodulators like acetylcholine and noradrenaline generate powerful effects on stimulus representations and plasticity in multiple sensory systems including olfaction. Traditionally, they are treated as state variables that may sharpen representations, gate learning, or bias a network towards one source of input or another. We instead modeled neuromodulatory effects as a dynamic search trajectory. Specifically, as the neuromodulator is released in response to active olfactory investigation (sampling), the local concentration around effector neurons and synapses rises over the course of successive sniffs, potentially enabling the most effective of the transient neuromodulatory states along that trajectory to govern the outcome of the stimulus identification process. We implemented a gradual reduction in the mean GC spiking threshold over the course of five sniffs of a corrupted odor signal, reflecting a concomitant increase in neuromodulator efficacy, and used the greatest of the five similarity values measured in the last gamma cycle within each sniff to classify the test odorant. It should be noted that, under very high noise conditions, each of the five "neuromodulatory" states performed best for some of the test odors and noise instantiations, indicating that a trajectory across a range of neuromodulatory states could yield superior classification performance compared to any single state. Indeed, this strategy yielded a substantial improvement in classification performance at very high levels of impulse noise, approximately doubling classification performance at P=0.8 (FIG. 8(c)).

In the biological system, MOB activity patterns resembling those evoked by a specific odor can be evoked by contextual priming that is predictive of the arrival of that odor. We implemented this as a priming effect exerted by ascending piriform cortical neurons that synaptically excite GCs in the MOB, the mapping between which can be learned dynamically. Specifically, we presented the network with odor samples at an extreme level of destructive interference (P=0.9) that largely precluded correct classification under default conditions (FIG. 8(c)). When fractions of the population of GCs normally activated by the presented odor were primed by lowering their spike thresholds, classification performance improved dramatically, to a degree corresponding to the fraction of primed GCs (FIG. 8(d)). That is, even a weak prior expectation of an incoming odor stimulus suffices to draw an extremely occluded odor signal out of the noise and into the attractor.

Figure 9:
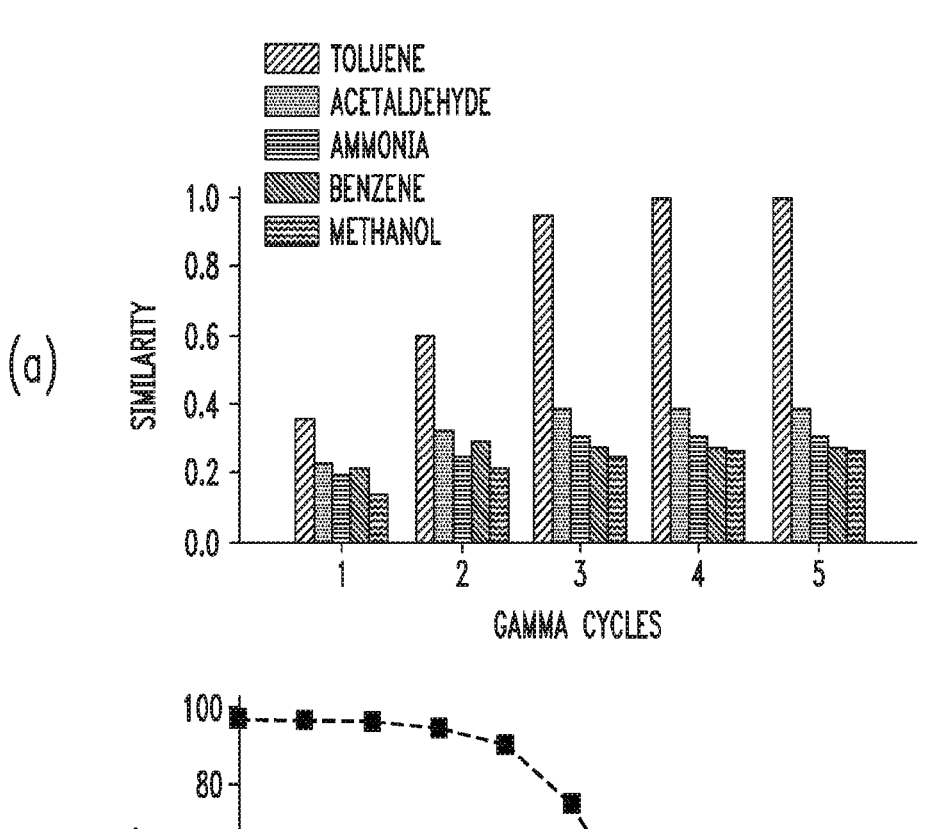
FIG. 9 is a set of graphical plots (a) and (b) showing aspects of odor learning with plume dynamics in illustrative embodiments. The plots are also referred to herein as respective FIGS. 9(*a*) and 9(*b*).
Figure 9:
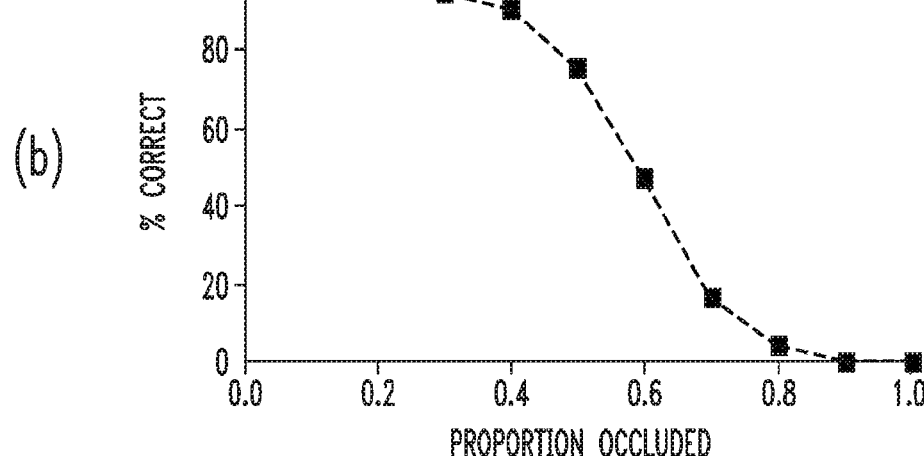

FIG. 9 is a set of graphical plots (a) and (b) showing aspects of odor learning with plume dynamics in illustrative embodiments.

In these simulations, ten sniffs of toluene were drawn from randomly-selected timepoints within the dataset to illustrate sampling variance arising from plume dynamics. It was found that the same network reliably recognized all ten odorants from plume-varying and substantially occluded examples (P=0.4).

FIG. 9(a) shows that the Jaccard similarity to toluene that was evoked by the occluded, plume-varying toluene stimulus increased over five successive gamma cycles until the stimulus was classified as toluene (similarity >0.8). For clarity, only five odorants are depicted.

FIG. 9(b) shows mean classification performance across all ten odorants, with plume dynamics, under increasing levels of sensory occlusion (100 impulse noise instantiations per odorant per noise level). The abscissa denotes the level of impulse noise. The curve shows the proportion of correct classifications by a network trained on all ten odorants.

These and other aspects of the illustrative embodiments of FIG. 9 are described in more detail below.

Sample Variance Arising from Plume Dynamics

In addition to occlusion by competing odorants, odor samples can vary based on the dynamics of their plumes (FIG. 5C), which evolve over time. We therefore tested the algorithm's ability to recognize and classify samples of each odorant that were drawn from the wind tunnel at different points in time. Specifically, in this paradigm, repeated samples of the same odorant differed from one another based on evolving odor plume dynamics, whereas samples of different odorants differed from one another both in plume dynamics and in the distribution of analyte sensitivities across the sensor array. Following one-shot training on all ten odors as described above, the spiking activity generated by odorant test samples was attracted over the five gamma cycles towards the corresponding learned representation. Notably, plume dynamics alone constituted a relatively minor source of variance compared to impulse noise.

We then tested the network on samples incorporating both plume dynamics and impulse noise (P=0.4). Following one-shot training on all ten odors, we sampled each odor across widely dispersed points in time, and contaminated each sniff with an independent instantiation of impulse noise. Spiking activity was again attracted over the five gamma cycles of each sniff towards the correct learned representation (FIG. 9(a)). Classification performance across levels of impulse noise from P=0.0 to P=1.0 (FIG. 9(b)) indicated that the addition of plume-based variability moderately reduced network performance (compare to FIG. 8(c)). Network performance was not affected by the introduction of noise correlations over time.

FIG. 10 is a set of graphical plots (a) through (g) showing aspects of performance of a neuromorphic algorithm using an SNN in illustrative embodiments.

FIG. 10(a) illustrates classification performance of the EPL network in comparison to four other signal processing techniques. Raw, classification of unprocessed sensor signals. MF, median filter. TVF, total variation filter. PCA, principal components analysis. DAE, a seven-layer deep autoencoder. EPL, the neuromorphic EPL model. Each of the 10 odorants was presented with 100 independent instantiations of impulse noise, yielding 1000 total test samples.

FIG. 10(b) shows that the performance of the DAE improved when it was explicitly trained to map a variety of occluded instances of each odor to a common representation. To achieve performance superior to the one-shot-trained EPL network, the DAE required 3000 occluded training samples per odorant. In this figure, the abscissa is the number of training samples per odorant (s/o), and the ordinate is the classification performance (%).

FIG. 10(c) illustrates online learning. After training naïve EPL and DAE networks with toluene, both recognized toluene with 100% accuracy. After then training the same network with acetone, the DAE learned to recognize acetone with 100% accuracy, but was no longer able to recognize toluene (catastrophic forgetting). In contrast, the EPL network retained the ability to recognize toluene after subsequent training on acetone.

FIG. 10(d) shows gradual loss of the toluene representation in the DAE during subsequent training with acetone. The ordinate denotes the similarity of the toluene-evoked activity pattern to the original toluene representation as a function of the number of training epochs for acetone. Values are the means of 100 test samples. The inset shows similarity between the toluene-evoked activity pattern and the original toluene representation in the EPL network before training with acetone (left) and after the completion of acetone training (right).

FIG. 10(e) illustrates similarity between the toluene-evoked activity pattern and the original toluene representation as the EPL network is sequentially trained on all 10 odorants of the dataset. Values are the means of 100 test samples.

FIG. 10(f) illustrates that the execution time to solution is not significantly affected as the EPL network size is expanded, reflecting the fine granularity of parallelism of the Loihi architecture. In the present implementation, one Loihi core corresponds to one MOB column.

FIG. 10(g) illustrates that the total energy consumed increases only modestly as the EPL network size is expanded.

These and other aspects of the illustrative embodiments of FIG. 10 are described in more detail below.

Classification Performance of the Neuromorphic Model

To evaluate the performance of the EPL model, we compared its classification performance to the performance of multiple conventional signal processing techniques: a median filter (MF), a total variation filter (TVF; both commonly used as impulse noise reduction filters), principal components analysis (PCA; a standard preprocessor used in machine olfaction), and a seven-layer deep autoencoder (DAE). Specifically, following training, we averaged the classification performance of each method across 100 different occluded presentations of each odor, with the occlusion level for each sample randomly and uniformly selected from the range P=[0.2, 0.8], for a total of 1000 test samples. Incorrect classifications and failures to classify both were scored as failures.

The neuromorphic EPL substantially outperformed MF, TVF, and PCA. To model "one-sample" learning on the DAE for comparison with one-shot learning on the EPL network, we trained a DAE with one sample from each of the ten odorants over 1000 training epochs per odorant, with the odorants intercalated in presentation. The EPL network substantially outperformed the DAE under these conditions, in which the training set contained no information about the distribution of error that would arise during testing owing to impulse noise (FIG. 10(a)). To improve DAE performance, we then trained it with 500 to 7000 samples of each of the ten odorants, with each sample independently occluded by impulse noise randomly and uniformly selected from the range P=[0.2, 0.8]. Under this training regimen, the deep network required 3000 samples per odorant, including the attendant information regarding the distribution of testing variance, to achieve the classification performance that the EPL model achieved with 1 sample per odorant. With further training, DAE performance exceeded that of the EPL network (FIG. 10(b)). We then tested the online learning capacities of the two networks, in which the presentations of different odorants during training were sequential rather than uniformly interspersed. After training both networks to recognize toluene using the methods of FIG. 10(*b*), both the EPL and the DAE exhibited high classification performance. However, after subsequent training to recognize acetone, the DAE lost its ability to recognize toluene, whereas the EPL network recognized both odors with high fidelity (FIGS. 10(*c*)-10(*d*)). Susceptibility to catastrophic forgetting is a well-established limitation of deep networks, though some customized networks recently have shown improvements in their online (continual) learning capabilities that reflect some of the strategies of the EPL network, such as the selective reduction of plasticity in well-trained network elements.

These results indicate that the EPL network ultimately serves a different purpose than techniques that require intensive training with explicit models of expected variance in order to achieve optimal performance. The EPL network is competitive with these algorithms overall, but excels at rapid, online learning with the capacity to generalize beyond experience in novel environments with unpredictable sources of variance. In contrast, the DAE evaluated here performs best when it is trained to convergence on data drawn from the distribution of expected variance; under these conditions, its performance exceeds that of the present EPL network. EPL network instantiations are thereby likely to be favored in embedded systems intended for deployment in the wild, where rapid training, energy-efficiency, robustness to unpredictable variance, and the ability to update training with new exemplars are at a premium.

The EPL algorithm, while derived directly from computational features of the mammalian olfactory system, essentially comprises a spike timing-based variant of a Hopfield autoassociative network, exhibiting autoassociative attractor dynamics over sequential gamma-breadth packets of spiking activity. Since their conception, Hopfield networks and their variants have been applied to a range of computational problems, including sparse coding, combinatorial optimization, path integration, and oculomotor control. Because these studies typically model neural activity as continuous-valued functions (approximating a spike rate), they have not overlapped significantly with contemporary research investigating spike-timing-based mechanisms of neural coding and computation—mechanisms that are leveraged in contemporary neuromorphic systems to achieve massive parallelism and unprecedented energy efficiency. The EPL algorithm combines insights from these two bodies of work, instantiating autoassociative attractor dynamics within a spike timing framework. By doing so, it proposes novel functional roles for spike timing-dependent synaptic plasticity, packet-based neural communications, active neuromodulation, and adult neurogenesis, all instantiated within a scalable and energy-efficient neuromorphic platform (FIG. 10(*f*)-10(*g*)).

Contemporary artificial olfaction research often emphasizes the development of sensors and sensor arrays. Associated work on the processing of electronic nose sensor data incorporates both established machine learning algorithms and novel analytical approaches, as well as optimizations for sensory sampling itself. The biological olfactory system has both inspired modifications of traditional analytical methods and guided biomimetic approaches to signal identification in both chemosensory and non-chemosensory datasets. In comparison to these diverse approaches, illustrative embodiments disclosed herein incorporate multiple innovations relating, for example, to the rapid learning of the EPL network, its spike timing-based attractor dynamics, its performance on identifying strongly occluded signals, and its field-deployable Loihi implementation.

The illustrative embodiments described in conjunction with FIGS. 5 through 10 demonstrate that a simplified network model, based on the architecture and dynamics of the mammalian MOB and instantiated in the Loihi neuromorphic system, can support rapid online learning and powerful signal restoration of odor inputs that are strongly occluded by contaminants. These results evince powerful computational features of the early olfactory network that, together with mechanistic models and experimental data, present a coherent general framework for understanding mammalian olfaction as well as improving the performance of artificial chemosensory systems. Moreover, this framework is equally applicable to other steady-state signal identification problems in which higher-dimensional patterns without meaningful lower-dimensional internal structure are embedded in highly interfering backgrounds.

Additional details regarding methods applied in testing of the illustrative embodiments will now be described.

Dataset and Odorant Sampling

Sensory input to the model was generated from the "Gas sensor arrays in open sampling settings" dataset published by Vergara et al. and available from the UCI Machine Learning Repository. The dataset comprises the responses of 72 metal-oxide based chemical sensors distributed across a wind tunnel. There are six different sensor mounting locations in the tunnel, three different settings of the tunnel's wind speed and three different settings of the sensor array's heater voltage. In the present embodiments, we consider the recordings made at sensor location "L4" (near the mid-point of the tunnel), with the wind speed set to 0.21 m s' and the heater voltage set to 500 V. The tunnel itself was 1.2 m wide×0.4 m tall×2.5 m long, with the sensors deployed in nine modules, each with eight different sensors, distributed across the full 1.2 m width of the tunnel at a location 1.18 m from the inlet (FIG. 5C). The nine modules were identical to one another. To maintain the generality of the algorithm rather than optimize it for this particular dataset, we here sampled the 72 sensors naïvely, without in any way cross-referencing inputs from the nominally identical sensors replicated across the nine modules, or attempting to mitigate the plume-based variance across these sensors. The turbulent plume shown in FIG. 5C is illustrative only; distribution maps of local concentrations in the plume, along with full details of the wind tunnel configuration, are provided in the publication first presenting the dataset.

Ten different odorants were delivered in the gas phase to the sensor array: acetone, acetaldehyde, ammonia, butanol, ethylene, methane, methanol, carbon monoxide, benzene, and toluene. For every tunnel configuration, each of these odorants was presented 10-20 times, and each presentation lasted for 180 seconds. In the present embodiments, we consider one of these 180-second plumes (chosen at random) for each odorant.

We discretized each sensor's range of possible responses into 16 levels of activation, corresponding to 16 time bins of the permissive epoch of each gamma cycle. The discretized sensor values were composed into a 72-dimensional sensor activity vector, which then was sparsened by setting the smallest 50% of the values to zero. Accordingly, each odorant sample ("sniff") presented to the EPL network comprised a discrete 72-element sensor vector drawn from a single point in time and presented as steady state. The training set underpinning one-shot learning was based on single-timepoint samples drawn from the 90 second timepoint in each of the 180 second long odorant presentations.

Test sets for the impulse-noise-only studies (FIGS. 7-8) comprised these same timepoints, each altered by 100 different instantiations of impulse noise. For the plume-variance studies (FIG. 9), test samples for each odorant were drawn from different time points in the corresponding plume (specifically, across the range 30-180 seconds after odorant presentation, at 5 second intervals) and were presented to the network both with and without added impulse noise.

The MOB EPL model therefore was instantiated with 72 columns, such that each column received afferent excitation proportional to the activation level of one sensor. Because we here present the network in its simplest form, we treated the 72 columns as independent inputs, without crafting the algorithm to combine the responses of duplicate sensor types, to weight the centrally located sensors more strongly, or to perform any other dataset-specific modifications that might improve performance. Each model MOB column comprised one principal neuron (e.g., an MC) and initially five GC interneurons that were presynaptic to that MC (for a total of 360 GCs across all columns), though the number of GCs per column rose as high as 50 in other examples of highly trained models described herein. MCs projected axons globally across all columns and formed excitatory synapses onto GCs with a uniform probability of 0.2 (20%). Each GC, in turn, synaptically inhibited the MC within its column with a probability of unity (100%). GCs did not inhibit MCs from other columns, though this constraint can be relaxed without affecting overall network function. To reflect the mapping of the algorithm to the physical layout of the Loihi chip, we consider an MC and its co-columnar GCs to be spatially local to one another. However, there is no computational basis for the physical locations of neurons in the model; an MOB column is simply "an MC plus those inputs that can affect its activity."

Intrinsic Gamma and Theta Dynamics

In the biological system, the profile of spike times across MCs is proposed to reflect a phase precedence code with respect to the emergent gamma-band field potential oscillations generated in the olfactory system. Spike timing-based coding metrics are known to offer considerable speed and efficiency advantages; however, they require computational infrastructure in the brain to realize these benefits. Fast oscillations in the local field potential are indicative of broad activity coherence across a synaptically coordinated ensemble of neurons, and thereby serve as temporal reference frames within which spike times in these neurons can be regulated and decoded. Accordingly, these reference frames are important components of the biological system's computational capacities.

In the MOB, gamma oscillations emerge from interactions of the subthreshold oscillations of MCs with the network dynamics of the EPL (PRING dynamics). For present purposes, the importance of these oscillations was twofold: (1) MC spike phases with respect to the gamma-band oscillations serve as the model's most informative output, and (2) by considering each oscillation as embedding a distinct, interpretable representation, repeated oscillations enable the network to iteratively approach a learned state based on stationary sensory input. Notably, in vivo, piriform cortical pyramidal neurons are selectively activated by convergent, synchronous MC spikes, and established neural learning rules are in principle capable of reading such a coincidence-based metric. Because MC spike times can be altered on the gamma timescale by synaptic inhibition from GCs, and their spike times in turn alter the responsivity of GCs, these lateral inhibitory interactions can iteratively modify the information exported from the MOB. In the neuromorphic EPL, each MC periodically switched between two states to establish the basic gamma oscillatory cycle. These two states were an active state in which the MC integrated sensory input and generated spikes (permissive epoch) and an inactive state in which the excitation level of the MC was held at zero, preventing sensory integration and spike generation (inhibitory epoch). The effects of the plastic lateral inhibitory weights from GCs were applied on top of this temporal framework. The correspondence with real time is arbitrary and hence is measured in timesteps (ts) directly; that said, as Loihi operates at about 100 kHz, each timestep corresponds to about 10 us. In the present implementation, the permissive epoch comprised 16 ts and the inhibitory epoch 24 ts, for a total of 40 ts per gamma cycle. Notably, the duration of the permissive epoch directly corresponds to the number of discrete levels of sensory input that can be encoded by our spike timing-based metric; it can be expanded arbitrarily at the cost of greater time and energy expenditures.

A second, slower, sampling cycle was used to regulate odor sampling. This cycle is analogous to theta-band oscillations in the MOB, which are driven primarily by respiratory sampling (sniffing) behaviors but also by coupling with other brain structures during certain behavioral epochs. Each sampling cycle ("sniff") consisted of a single sample and steady-state presentation of sensory input across five gamma cycles of network activity. The number of gamma cycles per sampling cycle can be arbitrarily determined in order to regulate how much sequential, iterative processing is applied to each sensory sample, but was held at five for all experiments herein.

It should be noted that these differences between the slower sampling timescale and the faster processing timescale can be leveraged to implement "continuous" online sampling, in which each sample can be processed using multiple computational iterations prior to digitizing the next sample. In the present implementation, for example, the Vergara et al. dataset sampled odorants at 100 Hz—one sample every 10 ms. On Loihi, operating at 100 kHz, the 200 timesteps (5 gamma cycles) used for the processing of a single sniff require a total of around 2 ms. As this is five times faster than the sampling rate of the sensors, there would be no update to sensor state during the time required for five cycles of processing.

Mitral Cells

Each MC was modeled by two compartments—an apical dendrite (AD) compartment that integrated sensor input and generated "spike initiation" events when an activation threshold was crossed, and a soma compartment that was excited by spike initiation events in the AD compartment and synaptically inhibited by spikes evoked in cocolumnar GCs. The soma compartment propagated the AD-initiated spike as an MC action potential after release from GC inhibition. Accordingly, stronger sensory inputs initiated earlier (phase-leading) spikes in MCs, but the propagation of these spikes could be delayed by inhibition arising from presynaptic GCs. Distinguishing between these two MC compartments facilitated management of the two input sources and their different coding metrics, and reflected the biophysical segregation between the mass-action excitation of MC dendritic arbors and the intrinsic regulation of MC spike timing governed by the gamma-band oscillatory dynamics of the MOB EPL.

Sensor activation levels were delivered to the AD compartment of the corresponding column, which integrated the input during each permissive epoch of gamma. If and when the integrated excitation exceeded threshold, a spike initiation event was generated and communicated to the soma compartment. Stronger inputs resulted in more rapid integration and correspondingly earlier event times. After generating an event, the AD was not permitted to initiate another for the duration of that permissive epoch.

A spike initiation event in the AD generated a unit level of excitation (+1) in the soma compartment for the remainder of the permissive epoch. This excitation state caused the MC soma to propagate the spike as soon as it was sufficiently free of lateral inhibition received from its presynaptic GCs. Accordingly, the main effect of GC synaptic inhibition was to modulate MC spike times with respect to the gamma cycle. The resulting MC spikes were delivered to the classifier as network output, and also were delivered to its postsynaptic GCs.

During the first gamma cycle following odor presentation, when GC inhibition was not yet active, the soma immediately propagated the MC spike initiated in the AD. After propagating a spike, the soma was not permitted to spike again for the duration of the permissive epoch. At the end of the permissive epoch, both the AD and soma compartments were reset to zero for the duration of the inhibitory epoch.

Granule Cells

GCs were modeled as single-compartment neurons, $$V = \Sigma_k w_k s_k \tag{1}$$

in which V indicates the excitation level of the GC, $w_k$ represents the excitatory synaptic weight from a presynaptic MC soma k, and k was summed over all presynaptic MCs. The boolean term $s_k$ denotes a spike at the k-th presynaptic MC soma; $s_k$ equals 0 at all times except for the d-th timestep following a spike in the k-th MC soma, when it was set to 1. Accordingly, d denotes a delay in the receipt of synaptic excitation by a GC following an MC spike. This delay d was randomly determined, synapse-specific, and stable (i.e., not plastic); it reflects heterogeneities in spike propagation delays in the biological system and served to delay GC excitation such that GC spikes were evoked within the inhibitory epoch of gamma.

A spike in an MC soma k that was presynaptic to a given GC excited that GC in proportion to its synaptic weight $w_k$. Once GC excitation rose above a threshold $\theta_{GC}$, the GC generated a spike and reset its excitation level to zero. Following a spike, the GC was not permitted to spike again for 20 timesteps, ensuring that only one spike could be initiated in a given GC per gamma cycle. In general, convergent excitation from multiple MCs was required for GC spike initiation.

Excitatory Synaptic Plasticity

The weights of MC-to-GC synapses were initialized to a value of we. Following an asymmetric, additive spike timing-dependent plasticity rule, these synaptic weights were modified during training following a spike in the postsynaptic GC. Specifically, synapses in which the presynaptic MC spike preceded the postsynaptic GC spike by 1 timestep were potentiated by a constant value of $\delta_p$ whereas all other synapses were depressed by a constant value of $\delta_d$. In the present embodiments, we set $\delta_p$ to $0.05w_e$ and $\delta_d$ to $0.2w_e$. GC spiking thresholds were set to Ewe.

The overall effect of this rule was to develop sparse and selective higher-order receptive fields for each GC, a process termed differentiation. Specifically, repeated coincidences of the same MC spikes resulted in repeated potentiation of the corresponding synapses, whereas synapses of other MCs underwent repeated depression. Individual excitatory synaptic weights were capped at a value of $1.25w_e$, ensuring that the spiking of differentiated GCs remained sensitive to coincident activity in a particular ensemble of MCs, the number of which constituted the order of the GC receptive field. By this process, odor learning transformed the relatively broad initial receptive field of a GC into a highly selective one of order M. These higher-order receptive fields reflected correlations between components of individual sensor vectors—i.e., the higher-order signatures of learned odors. Differentiated GCs thereby developed selectivity for particular odor signatures and became unresponsive to other sensory input combinations. While in principle this GC output can be used directly for classification purposes, the present algorithm instead deploys it to denoise the spike timing-based MC representation. Because there are many fewer MCs than GCs, there is a corresponding reduction in bandwidth and energy consumption by using MCs to communicate the representation for classification or further processing.

Adult Neurogenesis

The process of GC differentiation permanently depleted the pool of interneurons available for recruitment into new odor representations. To avoid a decline in performance as the numbers of odors learned by the network increased, $w_e$ periodically added new, undifferentiated GC interneurons to the network on a timescale slower than that of the synaptic plasticity rules—a process directly analogous to adult neurogenesis in the MOB. Specifically, the network was initialized with five GCs per column, as described above. After the learning of each new odor, an additional set of five undifferentiated GCs was configured in every column. As with the initial network elements, every MC in the network formed excitatory synapses onto new GCs with a probability of 0.2 (20%), and the new GCs all formed inhibitory synapses onto their cocolumnar MCs with initial inhibitory weights of zero.

Inhibitory Synaptic Plasticity

In the neuromorphic model, inhibitory synapses from presynaptic GCs onto their cocolumnar MC somata exhibited three functional states. The default state of the synapse was an inactive state I, which exerted no effect on the MC (i.e., equal to 0). When a spike was evoked in the GC, the synapse transitioned into an inhibitory blocking state B; this state was maintained for a period of time $\Delta_B$ that was determined by learning. While in this state, the synapse maintained a unit level of inhibition (equal to −1) in the postsynaptic MC soma that inhibited somatic spike propagation. The blocking period $\Delta_B$ therefore governed MC spike latency, and corresponded functionally to the inhibitory synaptic weight. At the end of the blocking state, the synapse transitioned to a release state R for 1 timestep, during which it generated a unit level of excitation (equal to +1) in the postsynaptic MC soma. The synapse then resumed the inactive state. An MC soma propagated a spike when the sum of the excitation and inhibition generated by its apical dendrite and by the synapses of all of its presynaptic GCs was positive. After spiking once, the MC soma was not permitted to spike again for the duration of that gamma cycle.

All inhibitory synaptic weights in new GCs were initialized to $\Delta_B$=0 ts. During training, additionally, the effects of inhibition on MC somata were suppressed. If an MC AD initiated a spike within the permissive epoch immediately following a cocolumnar GC spike (in the previous inhibitory epoch), the blocking period $\Delta_B$ imposed by that GC onto the soma of that MC was modified based on the learning rule $$\delta_b = \eta(t_{AD} - t_R) \tag{2}$$

where $\delta_b$ is the change in the blocking period $\Delta_B$ (inhibitory synaptic weight), $t_{AD}$ is the time of the MC spike initiation event in the AD, $t_R$ is the time at which the inhibitory synapse switched from the blocking state to the release state, and $\eta$ was the learning rate (set to 1.0 in the one-shot learning studies presented here). Consequently, the synaptic blocking period $\Delta_B$ was modified during training (rounding up fractions) until the release of inhibition from that synapse was aligned with the spike initiation event in the MC AD (FIG. 6B). If the GC spike was not followed by an MC spike initiation event during the following permissive epoch, the inhibitory weight $\Delta_B$ of that synapse grew until that MC was inhibited for the entire gamma cycle. Inputs from multiple local GCs onto a common MC were applied and modified independently.

In total, this inhibitory synaptic plasticity rule enabled the EPL network to learn the timing relationships between GC spikes and cocolumnar MC spikes associated with a given odor stimulus, thereby training the inhibitory weight matrix to construct a fixed-point attractor around the odor representation being learned. This served to counteract the consequences of destructive interference in odor stimuli presented during testing. It should be noted that this plasticity rule effectively learned the specific ratiometric patterns of activation levels among MCs that characterized particular odors; consequently, two odors that activated the same population of MCs, but at different relative levels, could be readily distinguished.

Testing Procedures

After training, we tested the network's performance on recognizing learned odorants in the presence of destructive interference from unpredictable sources of olfactory occlusion (impulse noise), alone or in combination with variance arising from sampling plume dynamics at different timepoints. All testing was performed with network plasticity disabled.

The responses of primary olfactory receptors to a given odorant of interest can be radically altered by the concomitant presence of competing background odorants that strongly activate or block some of the same receptors as the odorant of interest, greatly disrupting the ratiometric activation pattern across receptors on which odor recognition depends. We modeled this occlusion as destructive impulse noise. Specifically, an occluded test sample was generated by choosing a fraction P of the 72 elements of a sensor activity vector and replacing them each with random values drawn uniformly from the sensors' operating range (integer values from 0 to 15). When multiple occluded test samples were generated to measure average performance, both the identities of the occluded elements and the random values to which they were set were redrawn from their respective distributions.

Odor plume dynamics comprise a second source of stimulus variance encountered under natural conditions. To test network performance across this variance, we drew test samples from different timepoints within the odor plumes. Specifically we drew 30 samples per plume at 5 second intervals between 30 seconds and 180 seconds within the 180 second datastreams. After one-shot training with a single sample, we tested network performance on the other samples, with and without the addition of impulse noise (FIG. 9).

While certain of the present embodiments focus on one-shot learning, the network can also be configured for few-shot learning, in which it gradually adapts to the underlying statistics of training samples. In this configuration, the network learns robust representations even when the training samples themselves are corrupted by impulse noise.

Sample Classification

The pattern of MC spikes in each successive gamma cycle was recorded as a set of spikes, with each spike defined by the identity of the active MC and the spike latency with respect to the onset of that permissive epoch. Accordingly, five successive sets of spikes were recorded for each sample "sniff." When an impulse noise-occluded sample was presented to the network, the similarities were computed between each of the five representations evoked by the unknown and each of the network's learned odor representations In descriptive figures (but not for comparisons with other methods), the similarity between two representations was measured with the Jaccard index, defined as the number of spikes in the intersection of two representations, divided by the number of spikes in their union. Specifically, the permissive epoch of a gamma cycle included 16 discrete timesteps in which MCs could spike; these 16 bins were used for Jaccard calculations. Test samples were classified as one of the network's known odorants if the similarity exceeded a threshold of 0.75 in the fifth (final) gamma cycle. If similarities to multiple learned odorants crossed the threshold, the odorant exhibiting the greatest similarity value across the five gamma cycles was picked as the classification result. If none of the similarity values crossed the threshold within five gamma cycles, the odorant was classified as unknown. This combination of nearest-neighbor classification and thresholding enabled the network to present "none of the above" as a legitimate outcome. Summary figures each consist of averages across 100 independent instantiations of impulse noise, and/or averages across 30 different test samples drawn from different timepoints in the datastream (without or with added impulse noise), for each odor in the training set.

Benchmarks

We first compared the classification performance of the EPL network to three conventional signal processing techniques: a median filter (MF), a total variation filter (TVF), and principal component analysis (PCA; FIG. 10(a)). The MF and TVF are filters commonly used in signal processing for reducing impulse noise, while PCA is a standard preprocessor used in machine olfaction applications. The MF used a window size of 5, and was implemented with the Python signal processing library scipy.signal. The TVF used a regularization parameter equal to 0.5, and was implemented using the Python image processing library scikit-image. PCA was implemented using the Python machine learning library scikit-learn; data were projected onto the top five components.

Corrupted input signals also can be denoised by training an autoencoder, a modern rendition of autoassociative networks. We therefore compared the performance of the EPL network to a seven-layer deep autoencoder constructed using the Python deep learning library Keras. The seven layers consisted of an input layer of 72 units, followed by five hidden layers of 720 units each and an output layer of 72 units. This resulted in a network of 3744 units, identical to the number in the EPL model when trained with ten odors. The network was fully connected between layers, and the activity of each unit in the hidden layers was L1 regularized. The network was trained with iterative gradient descent until convergence using the Adadelta optimizer with a mean absolute error loss function. Its training set consisted of 7000 examples per odorant class. For the same training set, the performance of this seven-layer autoencoder exceeded that of shallower networks (6-, 5-, 4-, and 3-layer networks were tested).

For direct comparison, the outputs of all of these methods, including that of the EPL network, were presented to the same nearest-neighbor classifier for sample classification according to a Manhattan distance metric. Specifically, for each of the techniques, the output was read as a 72-dimensional vector and normalized such that their elements summed up to a value of unity. (In the case of the EPL network, the spiking output in each gamma cycle was read out as a 72-dimensional rank-order vector and normalized so that the elements summed to unity). The similarity between any two such vectors was measured as (1/(1+d)) where d is the Manhattan distance between the two vectors. Classification performance was measured by computing this similarity between the output of training data samples and those of test data samples. A test data sample was classified according to the identity of the training data sample to which it was most similar, provided that this similarity value exceeded a threshold of 0.75 (thresholding enabled the inclusion of a "none of the above" outcome).

We trained the DAE in three different ways for fair comparison with EPL network performance. First, the DAE was trained using the same ten non-occluded odor samples that were used to train the EPL model. These ten samples underwent 1000 training epochs to ensure training convergence. This method assesses DAE performance on "one-sample" learning, for comparison with the one-sample/one-trial learning of the EPL network (FIG. 10($a$)). Second, we trained the DAE on multiple impulse noise-occluded samples, so as to maximize its performance. Specifically, we trained the DAE on 500 to 7000 training samples, where each sample comprised an independently occluded instance of each of the ten odorants. Each training set was presented for 25 training epochs to ensure convergence. The occlusion levels for each training sample were drawn from the same distribution as the test samples, being randomly and uniformly selected from the range P=[0.2, 0.8]. With this procedure, we show that the DAE requires 3000 training samples per odorant to achieve the classification performance that the EPL model achieved with 1 training sample per odorant (FIG. 10($c$)); i.e., the EPL model is 3000 times more data efficient than the DAE. Third, we trained the DAE and EPL models first on one odorant (toluene) and then, subsequently, on a second odorant (acetone) in order to compare the models' sequential online learning capabilities. After training on toluene, the DAE classified test presentations of toluene with high fidelity (FIG. 10($c$); left panel). However, over the course of acetone training, the similarity between test samples of toluene and the learned representation of toluene progressively declined (FIG. 10($d$)), to the point that the DAE network became unable to correctly classify toluene (FIG. 10($c$), right panel). In contrast, training the EPL network with acetone exhibited no interference with the preexisting toluene representation (FIG. 10($d$), inset). The similarity between test samples of toluene and the learned representation of toluene was not affected as the EPL learned all of the ten odorants in sequence (FIG. 10($e$)).

Implementation on the Loihi Neuromorphic System

Neuromorphic systems are custom integrated circuits that model biological neural computations, typically with orders of magnitude greater speed and energy efficiency than general-purpose computers. These systems enable the deployment of neural algorithms in edge devices, such as chemosensory signal analyzers, in which real-time operation, low power consumption, environmental robustness, and compact size are important operational metrics. Loihi, a neuromorphic processor developed for research at Intel Labs, advances the state of the art in neuromorphic systems with innovations in architecture and circuit design, and a feature set that supports a wide variety of neural computations. Below we provide an overview of the Loihi system and our network implementation thereon.

Loihi is fabricated in Intel's 14-nm FinFET process and realizes a total of 2.07 billion transistors over a many-core mesh. Each Loihi chip contains a total of 128 neuromorphic cores, along with three embedded Lakemont x86 processors and external communication interfaces that enable the neuromorphic mesh to be extended across many interlinked Loihi chips (FIG. 5B). Each neuromorphic core comprises leaky-integrate-and-fire compute units that integrate filtered spike trains from a configurable set of presynaptic units and generate spikes when a threshold level of excitation is crossed. Postsynaptic spikes then are communicated to a configurable set of target units anywhere within the mesh. A variety of features can be configured in a core, including multicompartment interactions, spike timing-dependent learning rules, axonal conduction delays, and neuromodulatory effects. All signals in the system are digital, and networks operate as discrete-time dynamical systems.

We configured each column of our model within one neuromorphic core, thereby using a total of 72 cores on a single chip. Cocolumnar synaptic interactions took place within a core, whereas the global projections of MC somatic spikes were routed via the intercore routing mesh. The configured network utilized 12.5% of the available neural resources per core and 6% of the available synaptic memory.

Completing one inference cycle (sniff; 5 gamma cycles; 200 timesteps) of the 72-core network required 2.75 ms and consumed 0.43 mJ, of which 0.12 mJ is dynamic energy. It should be noted that the time required to solution was not significantly affected by the scale of the problem (FIG. 10($f$)), owing to the Loihi architecture's fine-grained parallelism. This scalability highlights a key advantage of neuromorphic hardware for application to computational neuroscience and machine olfaction. Energy consumption also scaled only modestly as network size increased (FIG. 10($g$)), owing to the colocalization of memory and compute and the use of sparse (spiking) communication, which minimize the movement of data. Using multichip Loihi systems, illustrative embodiments are readily scalable to hundreds of columns and hundreds of thousands of interneurons, and can integrate circuit models of the glomerular layer and the piriform cortex with the current EPL network of the MOB.

Further illustrative embodiments will now be described with reference to FIG. 11.

These embodiments, like others disclosed herein, provide SNN algorithms for signal restoration and identification based on principles extracted from the mammalian olfactory system and broadly applicable to input from arbitrary sensor arrays. For interpretability and development purposes, we here examine the properties of its initial feedforward projection. Like the full algorithm, this feedforward component is fully spike timing-based, and utilizes online learning based on local synaptic rules such as STDP rules. Using an intermediate metric to assess the properties of this initial projection, the feedforward network exhibits high classification performance after few-shot learning without catastrophic forgetting, and includes a "none of the above" outcome to reflect classifier confidence. We demonstrate online learning performance using a publicly available machine olfaction dataset with challenges including relatively small training sets, variable stimulus concentrations, and three years of sensor drift.

The SNN-based online learning algorithms in these embodiments, based on principles and motifs derived from the mammalian olfactory system, can accurately classify noisy high-dimensional signals into categories that have been dynamically defined by few-shot learning. In order to better interpret the basis for the algorithm's capabilities, we focus in this description on the properties of the first feedforward projection, omitting the spike timing-based feedback loop that forms the core network of the full MOB model. Glomerular-layer processing is represented here by two preprocessing algorithms, whereas plasticity for rapid learning is embedded in subsequent processing by the EPL network. Information in the EPL network is mediated by patterns of spike timing with respect to a common clock corresponding to the biological gamma rhythm, and learning is based on localized spike timing-based synaptic plasticity rules. The algorithm is illustratively implemented in PyTorch for GPU computation, but is also suitable for implementation on state-of-the-art neuromorphic computing hardware such as the Intel Loihi platform. We here demonstrate the interim performance of the feedforward algorithm using a well-established machine olfaction dataset with distinct challenges including multiple odorant classes, variable stimulus concentrations, physically degraded sensors, and substantial sensor drift over time.

The network is based on the architecture of the mammalian MOB. Primary olfactory sensory neurons (OSNs) express a single odorant receptor type from a family of hundreds (depending on animal species). The axons of OSNs that express the same receptor type converge to a common location on the surface of the MOB, forming a mass of neuropil called a glomerulus. Each glomerulus thus is associated with exactly one receptor type, and serves as the basis for an MOB column. The profile of glomerular activation levels across the hundreds of receptor types (~400 in humans, ~1200 in rats and mice) that are activated by a given odorant constitutes a high-dimensional vector of sensory input. Within this first (glomerular) layer of the MOB, a number of preprocessing computations also are performed, including a high-dimensional form of contrast enhancement and an intricate set of computations mediating a type of global feedback normalization that enables concentration tolerance. The cellular and synaptic properties of this layer also begin the process of transforming stationary input vectors into spike timing-based representations discretized by 30-80 Hz gamma oscillations. The EPL, which constitutes the deeper computational layer of the MOB, comprises a matrix of reciprocal interactions between principal neurons activated by sensory input (e.g., MCs) and inhibitory interneurons (e.g., GCs). Computations in this layer depend on fine-timescale spike timing and odor learning, and modify the information exported from the MOB to its follower cortices.

Chemical sensing in machine olfaction is similarly based upon combinatorial coding; specificity is achieved by combining the responses of many poorly-selective sensors. In the present algorithm, networks were defined with a number of columns such that each column received input from one type of sensor in the connected input array. Columns each comprised one ET cell and one PG cell to mediate glomerular-layer preprocessing, and one MC and a variable number of GCs to mediate EPL odorant learning and classification, as illustrated in FIG. 11. Sensory input was preprocessed by the ET and PG cells of the glomerular layer (for concentration tolerance), and then delivered as excitation to the array of MCs, which generated action potentials. Each MC synaptically excited a number of randomly determined GCs drawn from across the entire network, whereas activated GCs synaptically inhibited the MC in their home column. It should be noted that, in the present embodiments, these inhibitory feedback weights were illustratively all reduced to zero to disable the feedback loop and EPL attractor dynamics, enabling evaluation of the initial feedforward transformation based on excitatory synaptic plasticity alone. During learning, the excitatory synapses followed a spike timing-dependent plasticity rule that systematically altered their weights, thereby modifying the complex receptive fields of recipient GCs in the service of odor learning. In the present embodiments, in lieu of the modified spike timing of the MC ensemble that characterizes the output of the full model, the binary vector describing GC ensemble activity in response to odor stimulation (0: non-spiking GC; 1: spiking GC) served as the processed data for classification. Because we here describe the capacities of the initial feedforward projection of preprocessed data onto the GC interneuron array within the EPL—an initial transformation that sets the stage for ongoing dynamics not discussed herein—we refer to such an embodiment as the EPLff network algorithm.

Figure 11:
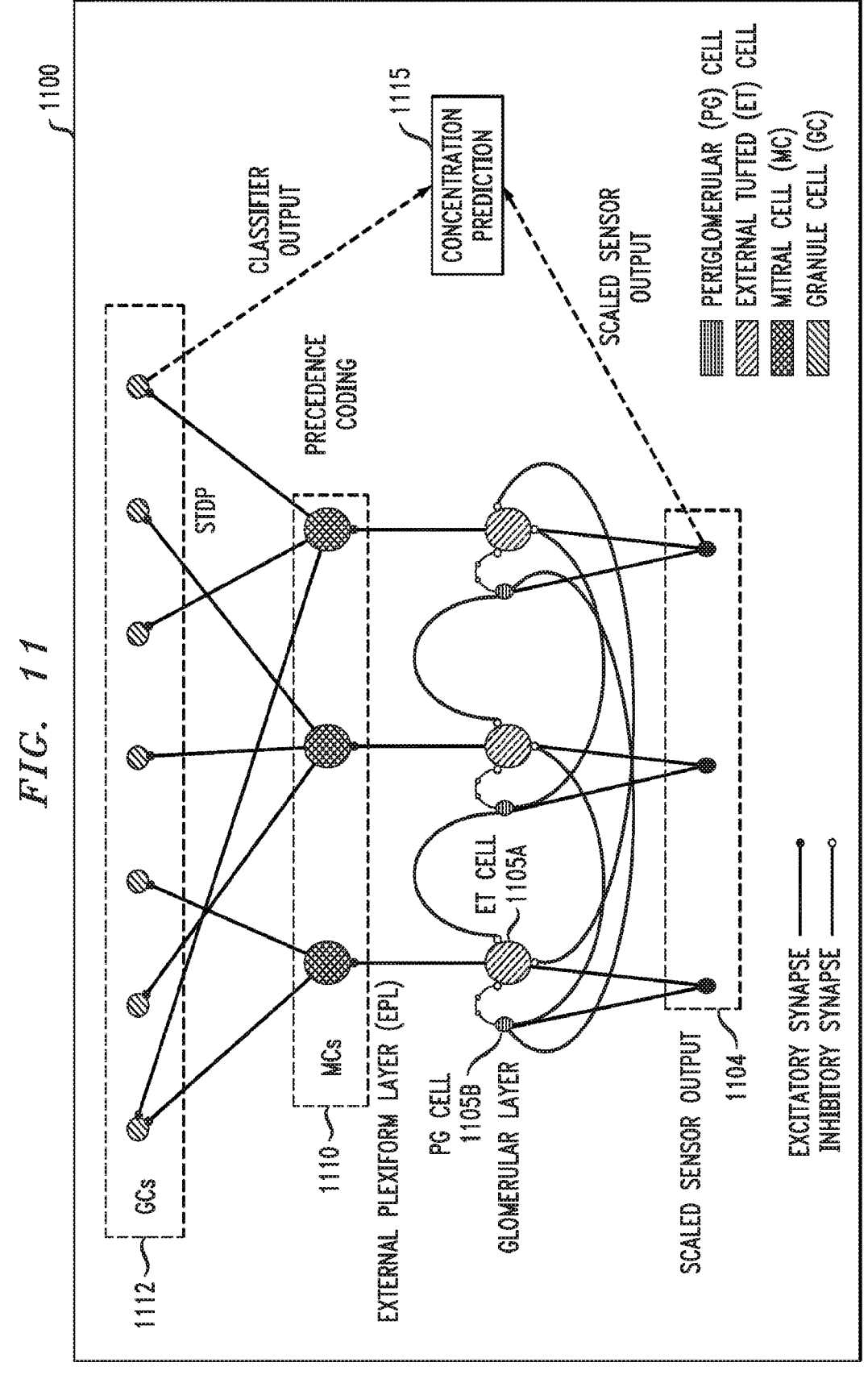
FIG. 11 is a schematic diagram showing multiple columns of network circuitry including an external plexiform layer (EPL) of an SNN implementing a neuromorphic algorithm in an illustrative embodiment.

FIG. 11 shows a detailed view of a portion 1100 of the above-described SNN implementing a neuromorphic algorithm in accordance with illustrative embodiments. The portion 1100 more particularly comprises EPLff network circuitry. Three columns are depicted in this view, for clarity and simplicity of illustration, but it is to be appreciated that other columns of the SNN are configured in a similar manner. Scaled sensor output is presented as sensor-scaled input data 1104 in parallel to excitatory ET cells 1105A and inhibitory PG cells 1105B in a glomerular layer of a preprocessor of the SNN. This glomerular-layer circuit performs an unsupervised concentration tolerance preprocessor step based on the graded inhibition of ET cells 1105A by PG cells 1105B. The concentration-normalized ET cell activity then is presented as input to their co-columnar MCs 1110. In the EPL, comprising MC interactions with inhibitory GCs 1112, levels of sensory input are encoded in MCs 1110 as a spike time precedence code across the MC population. MCs project randomly onto GCs 1112 with a connection probability of 0.4. These synaptic connections are plastic, following an STDP rule that enables GCs 1112 to learn high-order receptive fields. The GC population consequently learns to recognize specific odorants by measuring the similarity of high dimensional GC activity vectors with the Hamming distance metric. The SNN in the present embodiments generates a concentration prediction 1115 for particular input data using a readout from the GCs 1112 as illustrated.

Data preprocessing techniques in these illustrative embodiments will now be described in more detail.

Sensor scaling. We defined a set of preprocessing algorithms, any or all of which could be applied to a given data set to prepare it for efficient analysis by the core algorithm. The first of these, sensor scaling, is applied to compensate for heterogeneity in the scales of different sensors—for example, an array comprising a combination of 1.8V and 5V sensors. One simple solution is to scale the responses of each sensor by the maximum response of that sensor. Let $x_1$, $x_2$, $x_3$, . . . , $x_n$ be the responses of n sensors to a given odor and $s_1$, $s_2$, $s_3$, . . . , $s_n$ be the maximum response values of those sensors. Then, $$\frac{x_1}{s_1}, \frac{x_2}{s_2}, \frac{x_3}{s_3}, \dots, \frac{x_n}{s_n}$$

$$\frac{x_1^{ET}}{\sum x^{pg}}, \frac{x_2^{ET}}{\sum x^{pg}}, \frac{x_3^{ET}}{\sum x^{pg}}, \dots, \frac{x_n^{ET}}{\sum x^{pg}} \tag{3}$$

represent the sensor-scaled responses. The maximum sensor response vector S could be predetermined (as in sensor voltages), or estimated using a model validation set. Here, we defined S using the model validation set (10% of Batch 1 data) and utilized the same value of S for scaling all subsequent learning and inference data. This preprocessing algorithm becomes particularly useful when analyzing data from arbitrary or uncharacterized sensors, or from arrays of sensors that have degraded and drifted nonuniformly over time.

Unsupervised concentration tolerance. Concentration tolerance is an important feature of mammalian as well as insect olfaction. Changes in odorant concentration evoke nonlinear effects in receptor activation patterns that are substantial in magnitude and often indistinguishable from those based on changes in odor quality. Distinguishing concentration differences from genuine quality differences appears to rely upon multiple coordinated mechanisms within MOB circuitry, but the most important of these is a global inhibitory feedback mechanism instantiated in the deep glomerular layer. The consequence of this circuit is that MC spike rates are not strongly or uniformly affected by concentration changes, and the overall activation of the MOB network remains relatively stable. We implemented this concentration tolerance mechanism as the graded inhibition of ET cells by PG cell interneurons in the MOB glomerular layer, as shown in FIG. 11—a mechanism based upon recent experimental findings in which ET cells serve as the primary gates of MC activation—and tested its importance empirically on machine olfaction data sets. This concentration tolerance mechanism facilitates recognition of odor stimuli even when they are encountered at concentrations on which the network has not been trained; moreover, once an odor has been identified, its concentration can be estimated based on the level of feedback that the network delivers in response to its presentation. This preprocessing step requires no information about input data labels, and greatly facilitates few-shot learning.

Input from each sensor was delivered directly to ET and PG interneurons associated with the column corresponding to that sensor, and the resulting PG cell activity was delivered via graded synaptic inhibition onto all ET cells within all columns in the network. ET cells in turn then synaptically excited their corresponding, cocolumnar MCs, as illustrated in FIG. 11. The approximate outcome of this preprocessor algorithm is as follows: given that $$x_1^{ET}, x_2^{ET}, x_3^{ET}, \dots, x_n^{ET}$$

denote the responses of ET cells to odor inputs (prior to their inhibition by PG cells), and $$x_1^{pg}, x_2^{pg}, x_3^{pg}, \dots, x_n^{pg}$$

denote the analogous responses of PG interneurons to these same inputs, the resulting input to MC somata from ET cells following their PG-mediated lateral inhibition will be A version of this algorithm has been implemented using spiking networks on IBM TrueNorth neuromorphic hardware.

The core algorithm in these embodiments will now be described in more detail.

Cellular and synaptic models. We modeled the MCs and GCs as leaky integrate-and-fire neurons with an update period of 0.01 ms. The evolution of the membrane potential v of MCs and GCs over time was described as $$\tau \frac{dv}{dt} = -v + IR \tag{4}$$

where $\tau = r_m c_m$ was the membrane time constant and $r_m$ and $c_m$ denote the membrane resistance and capacitance respectively. For MCs, the input current I corresponded to sensory input received from ET cells (after preprocessing by the ET and PG neurons of the glomerular layer as illustrated in FIG. 11), whereas for GCs, 1 constituted the total synaptic input from convergent presynaptic MCs. In GCs, the parameter R was set to equal $r_m$, whereas in MCs it was set to $r_m / r_{shunt}$ where $r_{shunt}$ was the oscillatory shunting inhibition of the gamma clock (described below). When $v \geq v_{th}$, where $v_{th}$ denotes the spike threshold, a spike event was generated and v was reset to 0. The total excitatory current to GCs was modeled as $$I = g_w (E_n - v) \tag{5}$$

where $E_n$ was the Nernst potential of the excitatory current (+70 mv), v was the GC membrane potential, and $$g_w = \sum_{1-1}^{n} w_i g_{max} \frac{\tau_1 \tau_2}{\tau_1 - \tau_2} \left( e^{\frac{-(t-t_i)}{\tau_1}} - e^{\frac{-(t-t_i)}{\tau_2}} \right)$$

describes the open probability of the AMPA-like synaptic conductances. Here, denotes presynaptic spike timing, $w_i$ denotes the synaptic weight, and $g_{max}$ is a scaling factor.

The parameters $c_m$, $r_m$, $r_{shunt}$, $E_n$, $g_{max}$, $\tau_1$, and $\tau_2$ were determined only once each for MCs and GCs using a synthetic data set and remained unchanged during the application of the algorithm to real datasets. The value of $w_i$ at each synapse also was set to a fixed starting value based on synthetic data, but was dynamically updated according to the STDP learning rule. The spiking thresholds $v_{th}$ of MCs and GCs were determined by assessing algorithm performance on the training and validation sets. Because we observed that using heterogeneous values of $v_{th}$ across GCs improved performance, the values of $v_{th}$ were randomly assigned across GCs from a uniform distribution.

Gamma clock and spike precedence code. Oscillations in the local field potential are observed throughout the brain, arising from the synchronization of activity in neuronal ensembles. In the MOB, gamma-band (30-80 Hz) oscillations are associated with the coordinated periodic inhibition of MCs by GCs that constrains MC spike timing, thereby serving as a common clock. For this work, we modeled a single cycle gamma oscillation as a sinusoidal shunting inhibition $r_{shunt}$ delivered onto all MCs, $$r_{shunt} = -3.8 * \cos\left(\frac{2\pi * f * t}{1000}\right) + 5 \qquad (6)$$

where f is the oscillation frequency (40 Hz) and t is the simulation time. We used a spike precedence coding scheme for MCs where earlier MC spike phases correspond to stronger sensor input and are correspondingly more effective at growing and maintaining spike timing-dependent plastic synapses. In the full model, the gamma clock serves as the iterative basis for the attractor; for present purposes in the EPLff context it served only to structure the spike times of active MCs converging onto particular GCs (precedence coding), and thereby to govern the changes in excitatory synaptic weights according to the STDP rule.

Connection topology. MC lateral dendrites support action potential propagation to GCs across the entire extent of the MOB, whereas inhibition of MCs by GCs is more localized. Excitatory MC-GC synapses were initialized with a uniformly distributed random probability cp of connection and a uniform weight $w_0$; synaptic weights were modified thereafter by learning. The initial connection probability cp was determined using a synthetic data set, and was set to cp=0.4 in the present simulations. For present purposes, as noted above, GC-MC inhibitory weights were set to zero to disable attractor dynamics.

STDP rule. We used a modified STDP to regulate MC-GC excitatory synaptic weight modification. Briefly, synaptic weight changes were initiated by GC spikes and depended exponentially upon the spike timing difference between the postsynaptic GC spike and the presynaptic MC spike. When a presynaptic MC spike preceded its postsynaptic GC spike within the same gamma cycle, w for that synapse was increased; in contrast, when MC spikes followed GC spikes, or when a GC spike occurred without a presynaptic MC spike, w was decremented. Synaptic weights were limited by a maximum weight $w_{max}$. The pairing of STDP with MC spike precedence coding discretized by the gamma clock generated a "k winners take all" learning rule, in which the value of k depended substantially on the GC spike threshold $v_{th}$ and the maximum excitatory synaptic weight $w_{max}$. Under this rule, activated GCs were transformed from nonspecialized cells receiving weak inputs from a broad and random distribution of MCs into specialized, fully differentiated neurons that responded only to coordinated activation across a specific ensemble of k MCs. Under all training conditions, for present purposes, we set a high learning rate such that, after one cycle of learning, each of the synapses could have one of only three values: $w_0$, $w_{max}$, or 0.

The STDP parameters were similar to those described for a synthetic data set in Ayon Borthakur and Thomas A. Cleland, "A neuromorphic transfer learning algorithm for orthogonalizing highly overlapping sensor array responses," in 2017 ISOCS/IEEE International Symposium on Olfaction and Electronic Nose (ISOEN), pp. 1-3, 2017. Among these, only the maximum synaptic weight $w_{max}$ was tuned based on validation set performance. For this feedforward implementation, online learning without the requirement of storing training data yielded its best validation set performance when $w_{max}=w_0$, such that learning was limited to long-term synaptic depression.

Classification. For the classification of test odorants in this reduced feedforward EPLff implementation, we calculated the Hamming distance between the binary vectors of GC odorant representations. Specifically, for every input, GCs generated a binary vector based upon whether the GC spiked (1) or did not spike (0). We matched the similarity of test set binary vectors with the training set vector(s) using the Hamming distance and classified the test sample based upon the label of the closest training sample. Alternatively, an overlap metric between GC activation patterns also was calculated; results based on this method were reliably identical to those of the Hamming distance. Classification was set to "none of the above" if the Hamming distance of the GC binary vectors was greater than 0.5, or if the overlap metric was less than 0.5.

We tested our algorithm on the publicly available UCSD gas sensor drift dataset, slightly reorganized to better demonstrate online learning. The original dataset contains 13910 measurements from an array of 16 polymer chemosensors exposed to 6 gas-phase odorants spanning a wide range of concentrations (10-1000 ppmv) and distributed across ten batches that were sampled over a period of three years to emphasize the challenge of sensor drift over time. Owing to drift, the sensors' output statistics change drastically over the course of the ten batches; between this property, the six different gas types, and the wide range of concentrations delivered, this dataset is well suited to test the capabilities of the present algorithm without exceeding the learning capacity of its feedforward architecture as illustrated in FIG. 11. For the online learning scenario, we sorted each batch of data according to the odorant trained, but did not organize the data according to concentration. Hence, each training set comprised 1 to 10 odorant stimuli of the same type but at randomly selected concentrations. Test sets always included all six different odorants, again at randomly selected concentrations. For sensor scaling and the fine-tuning of the algorithm, we used 10% of the Batch 1 data as a validation set. The six odorants in the dataset are, in the order of training used herein: ammonia, acetaldehyde, acetone, ethylene, ethanol, and toluene. Batches 3-5 included only 5 different odorant stimuli, omitting toluene.

Eight features per chemosensor were recorded in the UCSD dataset, yielding a 128-dimensional feature vector. However, we chose to use only one feature per sensor in our analysis (the steady state response level), for a total of 16 features. We imposed this restriction to challenge our algorithm, and because generating features from raw data requires additional processing, energy and time, all of which can impair the effectiveness of field-deployable hardware. It should be noted, however, that the sensor scaling and concentration tolerance preprocessors described above would enable the EPLff network to utilize the full 128-dimensional dataset without specific adaptations other than expanding the number of columns accordingly.

Results of the above-noted testing of the present embodiments will now be described.

Data preprocessing. All sensory input data were preprocessed before being presented to the network. First, sensor scaling was applied to weight the sixteen sensors equally in subsequent computations. The mean raw responses of the sixteen sensors differed widely, with some sensors exhibiting an order of magnitude greater variance than others across the ten odorants tested. Sensor scaling mitigated this effect by scaling each sensor's gain such that the dynamic ranges of all sensors across the test battery were effectively equal. This process enabled each sensor to contribute a comparable amount of information to subsequent computations (up to a limit imposed by each sensor's signal to noise ratio), and improved network performance by maintaining consistent mean activity levels across test odorants.

Since each odorant was presented at a wide range of randomly selected concentrations, the response of the sensor array to a given odorant varied widely across presentations. Application of the unsupervised concentration tolerance preprocessor sharply and selectively reduced the concentration-specific variance among responses to presented odorants. These preprocessed odorant signatures then were presented to the plastic EPLff network for training or classification. Notably, this preprocessor step greatly facilitated cross-concentration odorant recognition, even enabling the accurate classification of samples presented at concentrations that were not included in the training set. This was particularly important for one- and few-shot learning, in which the network was trained on just one or a few exemplars (respectively), at unknown concentration(s), such that most of the odorants in the test set were presented at concentrations on which the network had never been trained.

The sensor scaling preprocessor (retaining the scaling factors determined from the 10% validation set of Batch 1), combined with the normalization effects of the subsequent concentration tolerance preprocessor, had the additional benefit of restoring the dynamic range of degraded sensors in order to better match classifier network parameters. Because of this, the network did not need to be reparameterized to effectively analyze the responses of the degraded sensors in the later batches of this dataset. Compared to the raw sensor output of Batch 1 (collected from new sensors), the raw sensor output of Batch 7 (collected after 21 months of sensor deterioration) was reduced to roughly a third of its original range. Sensor scaling mitigated this effect by magnifying sensor responses into the dynamic range expected by the network. Subsequent preprocessing for concentration tolerance effectively reduced concentration-specific variance, revealing a set of odorant profiles that, while qualitatively dissimilar to their profiles based on the same sensors 21 months prior, appear only modestly degraded in terms of their distinctiveness from one another.

For many machine olfaction applications, it is useful to estimate the concentrations of gases in the vicinity of the sensors. We sought to use the information extracted from the concentration tolerance preprocessor to estimate the concentrations of test samples after classification. The concentration estimation curve was a function of both odorant identity and the total sensor response profile. Using the sum of the 16 sensor responses (S), we fitted an odorant-specific quadratic curve for an implicit model of response profiles across concentrations C: $C=ax^2+b$, where the parameters a and b were determined from the training set. The mean absolute error (MAE) of the prediction (in ppmv) was estimated as $$\frac{\sum_n |C_{pred} - C_{actual}|}{n} \qquad (7)$$

where n denotes the total number of samples. For the five-shot training of Batch 1 (i.e., five random samples drawn from Batch 1 for each odorant), the MAE was 35.14 units. This error was reduced to 23.35 for ten-shot learning. Similarly, the MAE for Batch 7 decreased from 76.60 (five-shot) to 58.18 (ten-shot). The parallel network architecture in this embodiment advantageously provides an estimate of concentration along with concentration tolerance.

Online learning. Unlike biological odor learning, artificial neural networks optimized for a certain task tend to suffer from catastrophic forgetting, and the pursuit of online learning capabilities in deep networks is a subject of active study. In contrast, the EPLff learning network described herein naturally resists catastrophic forgetting, exhibiting powerful online learning using a fast spike timing-based coding metric. Moreover, we include a "none of the above" outcome which permits classification only above a threshold level of confidence. Hence, after being trained on one odorant, the network could identify a test sample as either that odorant or "none of the above." After subsequently training the network on a second odorant, it could classify a test sample as either the first trained odorant, the second trained odorant, or "none of the above." This online learning capacity enables ad hoc training of the network, with intermittent testing if desired, with no need to train on or even establish the full list of classifiable odorants in advance. It also facilitates training under missing data conditions (e.g., batches 3-5 contain samples from only five odorants, unlike the other batches which include six odorants), and could be utilized to trigger new learning in an unsupervised exploration context. Finally, once learned, the training set data need not be stored.

To analyze the 16-sensor UCSD dataset, we constructed a 16-column spiking network with 4800 GC interneurons and a uniformly random MC-GC connection probability cp=0.4. This number of GCs was selected because it was the smallest network that achieved asymptotic performance on the validation dataset (Batch 1, one-shot learning). We then trained this network on ammonia using ten different few-shot training schemes: one-shot, two-shot, three-shot, up through ten-shot in order to measure the utility of additional training. Test data (across all trained odorants and all concentrations in the dataset) were classified with 100.0% accuracy in all cases. We subsequently trained each of these trained networks on acetaldehyde, using the same number of training trials in each case. After one-shot learning of acetaldehyde, the network classified all trained odorants with 99.61±0.28% accuracy (average of three runs). After subsequent one-shot learning of acetone, classification performance was 95.65±0.19%; after ethylene, 96.06±0.17%; after ethanol, 90.94±0.0%, and finally, after one-shot training on the sixth and final odorant, toluene, test set classification performance across all odorants was 90.27±0.12%. Multiple-shot learning generally produced correspondingly higher classification performance as the training regimen expanded. Classification using an overlap metric rather than the Hamming distance yielded almost identical results. It should be noted that classification performance did not catastrophically decline as additional odorants were learned in series, particularly when higher-quality sensors were used or when larger multiple-shot training sets were employed. These results illustrate that the EPLff network, even in the absence of the full model's recurrent component, exhibits true online learning.

The availability of data in the UCSD dataset from over three years of sensor deterioration enabled the testing of this online learning algorithm with both fresh and degraded sensor arrays. Classification results from the same procedures described above but using progressively older and more degraded sensors indicated that classification performance declined overall as the sensors deteriorated in later batches, but could be substantially rescued by expanding the training regimen from one-shot to few-shot learning. Overall, multiple-shot training reliably improved classification performance, though the residual variance across different training regimes suggests that the random selection of better or poorer class exemplars for training (particularly noting the uncontrolled variable of concentration) exerted a measurable effect on performance.

Batch 10 of the UCSD dataset poses a relatively challenging classification problem. To produce it, the sensors were intentionally degraded and contaminated by turning off sensor heating for five months following the production of Batch 9 data. Prior work with this dataset has achieved up to 73.28% classification performance on Batch 10, without online learning and using a highly introspective approach tailored for this specific dataset. In contrast, ten-shot learning on Batch 10 using the present EPLff algorithm achieved 85.43% classification accuracy.

To compare the EPLff network's resistance to catastrophic forgetting against an existing standard method, we built a 16-input multi-layer perceptron (MLP) comprising 16 input units for raw sensor input (ReLu activation), 4800 hidden units (ReLu activation), and 6 output units for odorant classification. The MLP was trained using the Adam optimizer with a constant learning rate of 0.001. Since there was no straightforward way of implementing "none of the above" in an MLP, the MLP was only trained using two or more odorants. After initial, interspersed training on two odorants from Batch 1, the MLP classified test odorants at high accuracy (99.41±0.0%; average of three runs). However, its classification accuracy dropped sharply after the subsequent, sequential learning of odorant 3 (30.61±0.0% accuracy), odorant 4 (16.24±9.29%), odorant 5 (18.13±0.0%), and odorant 6 (15.99±0.0%). Catastrophic forgetting is a well-known limitation of MLPs, and is presented here simply to quantify the contrast in online learning performance between the EPLff implementation and a standard network of similar scale.

Online reset learning for mitigating sensor drift. One of the most challenging problems of machine olfaction is sensor drift, in which the sensitivity and selectivity profiles of chemosensors gradually change over weeks to months of use or disuse. Efforts to compensate for this drift have taken many forms, from simply replacing sensors to designing highly introspective or specific corrective algorithms. For example, one approach requires the nonrandom, algorithmically guided selection of relevant samples across batches and/or the utilization of test data as unlabeled data for additional training. Despite some partial successes in these approaches, the real-world challenge of sensor drift is a fundamentally ill-posed problem, in which the rapidity and nature of functional drift is highly dependent on the idiosyncratic chemistry of individual sensors and specific sensor-analyte pairs.

A practical solution to this challenge is to retrain the network as needed to maintain performance, leveraging its rapid, online learning capacity. Specifically, MC-GC synaptic weights are simply reset to their untrained values and the network then is rapidly retrained using the new (degraded) sensor response profiles (reset learning). Retraining is not a new approach, of course, but overtly choosing a commitment to heuristic retraining as the primary method for countering sensor drift is important, as it determines additional criteria for real-world device functionality that candidate solutions should address, such as the need for rapid, ideally online retraining in the field and potentially a tolerance for lower-fidelity training sets. Specifically, retraining a traditional classification network may require:

1. Prior knowledge of the number of possible odor classes to be identified,
2. A sufficiently large and representative training set incorporating each of these classes, 3. The retuning of network hyperparameters to match the altered characteristics of the degraded sensors, requiring an indeterminate number of training iterations.

The EPL network is not constrained by the above requirements. As demonstrated above, it can be rapidly retrained using small samples of whatever training sets are available and then be updated thereafter—including the subsequent introduction of new classes. The storage of training data for retraining purposes is unnecessary as the network does not suffer from catastrophic forgetting. Finally, the present network does not require hyperparameter retuning. Here, only the MC-GC weights were updated during retraining (using the same STDP rule); sensor scaling factors and all other parameters were ascertained once, using the 10% validation set of Batch 1, and held constant thereafter. Moreover, the "none of the above" classifier confidence feature facilitates awareness of when the network may require retraining; an increase in "none of the above" classifications provides an initial cue that then can be evaluated using known samples.

To assess the efficacy of this approach, we tested the EPLff algorithm on the UCSD dataset framed as a sensor drift problem. The procedure for this approach, and consequently the results, are similar to those described above. It should be noted that the sensor scaling factors and network parameters were tuned only once, using the validation set from Batch 1, on the theory that the concept of rapid reset was incompatible with a strategy of re-optimizing multiple network hyperparameters. Hence, no parameter changes were permitted, other than the MC-GC excitatory synaptic weights that were updated normally during training according to the STDP rule. As described above, Batch 1 training samples from all six odorants again were presented to the network in an online learning configuration, and classification performance then was assessed by Batch 1 test data. MC-GC synaptic weights then were reset to the default values (the reset), after which Batch 2 training samples were presented to the network in the same manner, followed by testing with Batch 2 test data including all odorants and concentrations. We repeated this process for batches 3-10. We also assessed post-reset classification performance across all batches based on a maximally rapid reset (i.e., one-shot learning) and compared this to performance after expanded training protocols up through ten-shot learning. In general, while modest increases in classification accuracy were observed when the training set size was larger, these results demonstrate scalability, showing that the EPLff algorithm classifies large sets of test data with reasonable accuracy even based on small training sets and lacking control over the concentrations of presented odorants.

These illustrative embodiments provide neural network algorithms that achieve superior classification performance in an online learning setting while not being specifically tuned to the statistics of any particular dataset. This property, coupled with its few-shot learning capacity and SNN architecture, renders it particularly appropriate for field-deployable devices based on learning-capable SNN hardware, recognizing that the interim use of the Hamming distance for nearest-neighbor classification in the present EPLff framework can be replaced with other metrics. This algorithm is inspired by the architecture of the mammalian MOB, but is comparably applicable to any high-dimensional dataset that lacks internal low-dimensional structure.

The present EPLff incarnation of the network utilizes one or more preprocessor algorithms to prepare data for effective learning and classification by the core network. Among these is an unsupervised concentration tolerance algorithm derived from feedback normalization models of the biological system, a version of which has been previously instantiated in SNN hardware. Inclusion of this preprocessor enables the algorithm in illustrative embodiments to quickly learn reliable representations based on few-shot learning from odorant samples presented at different and unknown concentrations. Moreover, the network then can generalize across concentrations, correctly classifying unknown test odorants presented at concentrations on which the network was never trained, and even estimating the concentrations of these unknowns.

The subsequent, plastic EPL layer of the network is based on a high-dimensional projection of sensory input data onto a network of interneurons known as GCs. In the present feed-forward implementation, our emphasis is on the roles and capacities of two sequential preprocessor steps followed by the STDP-driven plasticity of the excitatory MC-GC synapses. Other embodiments can include the feedback architecture of the original model while enabling a more sophisticated development of learned classes within the high-dimensional projection field. Even in its present feed-forward form, however, the EPLff algorithm exhibits (1) rapid, online learning of arbitrary sensory representations presented in arbitrary sequences, (2) generalization across concentrations, (3) robustness to substantial changes in the diversity and responsivity of sensor array input without requiring network reparameterization, and, by virtue of these properties, is capable of (4) effective adaptation to ongoing sensor drift via a rapid reset-and-retraining process termed reset learning. This capacity for fast reset learning represents a practical strategy for field-deployable devices, in which a training sample kit could be quickly employed in the field to retune and restore functionality to a device in which the sensors may have degraded. It should be noted that, for such purposes, the EPLff algorithm was not, and need not be, crafted to the statistics of any particular data set, nor was the network pre-exposed to testing set data.

Because field-deployable devices require a level of generic readiness for undetermined or underdetermined problems, and these EPLff properties favor such readiness, we have emphasized the portability of these algorithms to neuromorphic hardware platforms that may come to drive such devices. Interestingly, many of the features of the biological olfactory system that have inspired this design are appropriate for such devices. Spike timing and event-based algorithms are attractive candidates for compact, energy-efficient hardware implementation. Spike timing metrics can compute similar transformations as analogue and rate-based representations; indeed, it has been proposed that spike based computations could in principle exhibit all of the computational power of a universal Turing machine. Spike timing-dependent plasticity is a localized learning algorithm that is highly compatible with the colocalization of memory and compute principle of neuromorphic design, and its theoretical capacities have been thoroughly explored in diverse relevant contexts. Our biologically constrained approach to algorithm design also provides a unified and empirically verified framework to investigate the interactions of these various algorithms and information metrics, to better interpret and apply them to artificial network design.

In illustrative embodiments, we provide artificial learning networks to replicate some of the most powerful capabilities of the biological olfactory system, in particular its capacity for rapid online learning and the fast and effective classification of learned odorants despite ongoing changes in sensor properties and the unpredictability of odor concentrations. Other embodiments can extend this framework to incorporate the feedback dynamics of the biological system, increase the dimensionality of sensor arrays, and provide more sophisticated biomimetic classifiers.

Additional aspects of illustrative embodiments will now be described with reference to FIG. 12.

The mammalian olfactory system learns rapidly from very few examples, presented in unpredictable online sequences, and then recognizes these learned odors under conditions of substantial interference without exhibiting catastrophic forgetting. We have developed, in the illustrative embodiments to be described below, a brain-mimetic algorithm that replicates these properties, provided that sensory inputs adhere to a common statistical structure. However, in natural, unregulated environments, this constraint cannot be assured. We here present a series of signal conditioning steps, inspired by the mammalian olfactory system, that transform diverse sensory inputs into a regularized statistical structure to which the learning network can be tuned. This preprocessing enables a single instantiated network to be applied to widely diverse classification tasks and datasets—here including gas sensor data, remote sensing from spectral characteristics, and multi-label hierarchical identification of wild species—without adjusting network hyperparameters.

The mammalian olfactory system learns and recognizes odors of interest under suboptimal circumstances and in unpredictable environments. Real-world odor stimuli vary in their concentrations and qualities, and are typically encountered in the presence of unpredictable configurations of competing background odors that can substantially occlude the profile of sensory receptor activation on which odor quality recognition nominally depends. Moreover, odor learning is rapid, and multiple odors can be learned in arbitrary sequences (online learning) without their learned representations interfering with one another (causing catastrophic forgetting) and without training data being somehow stored to maintain or restore learning performance. Altogether, this suite of sensory sampling challenges constitutes the problem that we refer to herein as "learning in the wild."

The present embodiments provide example SNN algorithms for learning and identifying chemosensor array responses and other intrinsically higher-dimensional signals, based on the architecture of the mammalian MOB. Briefly, primary chemosensory neurons expressing a single type of receptor converge to common locations on the MOB surface, there forming clusters of neuropil called glomeruli. Activity in these glomerular networks then is sampled and processed by second-order principal neurons and multiple classes of interneurons. Glomerular activation profiles across hundreds of receptor types (~1200 in rodents) constitute high dimensional vectors describing odor qualities embedded in multiple sources of noise.

It should be noted that glomerular-layer network interactions perform multiple signal conditioning tasks on raw chemosensory inputs. Recognizing odor stimuli across wide concentration ranges, for example, depends on the coordination of multiple computational elements, including a global inhibitory feedback loop within the MOB glomerular layer that limits concentration-dependent heterogeneity in the activity of MOB principal neurons. A version of this input normalization algorithm has been implemented on the IBM TrueNorth neuromorphic hardware platform.

Other embodiments of example SNN algorithms for machine olfaction disclosed herein, illustratively implemented on Intel Loihi, learn rapidly from one or few shots, resist catastrophic forgetting, and classify learned odors under high levels of impulse noise. Moreover, the interpretability of these algorithms enables the causes of the classification to be ascertained post hoc, in principle enabling the identification of the specific combinations of input features that determine a sample's classification. More generalized versions of this model relax control over key parameters in order to develop an experience-dependent metric of similarity for purposes of hierarchical classification. However, the plastic network at the core of this generalized algorithm is sensitive to the statistical parameters of sensory input, potentially requiring parameter retuning in order to maintain effective classification performance when the input statistics change. We instead implement a consistent set of adaptive signal conditioning mechanisms that illustratively enable any sensor array input profile to be accepted by a given instantiated network for learning and high-fidelity classification under noise without requiring parameter retuning. This strategy enables multiple, statistically diverse input signals to each be encountered, learned, and classified by the same network—an important capacity for an artificial sensory system deployed into an unknown "wild" environment.

An example algorithm adaptation for "learning in the wild" will now be described in more detail with reference to FIG. 12.

Figure 12:
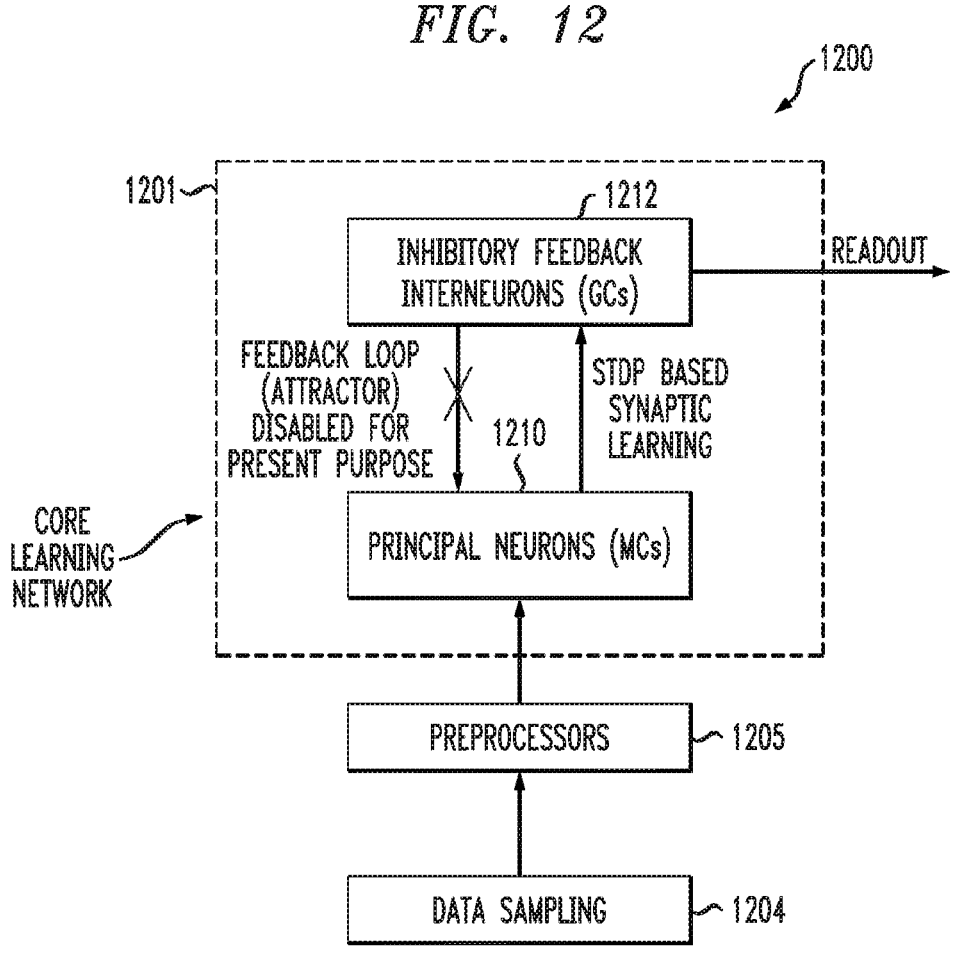
FIG. 12 is a combined system and flow diagram showing another possible implementation of a neuromorphic algorithm using an SNN in an illustrative embodiment.

FIG. 12 shows a schematic overview of brain-mimetic model. An implementation 1200 of a neuromorphic algorithm using an SNN in this embodiment comprises a core learning network 1201 driven by input received by a data sampling stage 1204 and preprocessed by a plurality of preprocessors 1205. The preprocessors 1205 include multiple signal conditioning functions attributed to glomerular layer circuitry in the biological system, including normalization, contrast enhancement, and statistical regularization. The core learning network 1201 comprises an inhibitory feedback loop between principal neurons 1210 and interneurons 1212 in which sensory information is conveyed by the phases of principal neuron spike times with respect to the underlying gamma cycle; learned patterns form attractors that classify test samples, as described elsewhere herein. For purposes of the present embodiments, this inhibitory feedback was disabled and the patterns of interneuron activation were read out directly. Classification was estimated based on the minimum Hamming distance between test sample and learned ensembles in the interneuron representation.

The feedback loop comprising the core learning network 1201 recruits populations of interneurons during learning to represent higher-order stimulus features, as described previously herein. To explicitly represent stimulus similarity (a prerequisite for constructing hierarchical representations on this metric), these recruited populations are permitted to overlap in their representation of similar input stimuli—a goal that requires relaxing control over interneuron recruitment. However, this poses a challenge, in that differently structured sensory inputs can be poorly suited for the parameterized network. Sensors in the array that are mismatched to the environment or to one another, sensory input profiles that differ substantially in mean amplitudes (e.g., higher or lower analyte concentrations), or even input profiles that are broader and flatter or steeper and narrower than expected all have the potential to disrupt learning and classification performance. In lieu of retuning network hyperparameters, we sought to construct a network architecture that could learn and classify input patterns irrespective of their statistical properties. That is, "learning in the wild" in some embodiments configures a single parameterized network to be able to learn and classify any set of relevant signal patterns that it may encounter.

We here present two elements of network architecture, inspired by the biological olfactory system, that enable "learning in the wild." First, we present a series of signal conditioning preprocessors, based on elements of MOB glomerular-layer circuitry, that effectively normalize and regularize sensory input patterns. Second, we show that the implementation of heterogeneity in key network parameters further broadens network tolerance and improves classification performance. To illustrate these effects more clearly, in describing the present embodiments we omit the inhibitory feedback loop that governs the attractor dynamics of the core learning network, and instead focus on an intermediate estimate of classification accuracy derived from the first projection of the preprocessed input stream onto the interneurons of the core network (i.e., the EPLff component described above and illustrated in FIG. 12). We also describe the profiles of interneuron recruitment as an indicator of the statistical similarities among input signals after preprocessing, and by extension the adaptiveness of these representations for the fixed hyperparameters of the core learning network.

Various features of preprocessors utilized in the present embodiments will now be described in more detail.

We implemented three preprocessors that were applied in sequence to sampled input vectors. Among these, the second (intensity normalization) is directly inspired by glomerular-layer operations in the MOB, and the third (heterogeneous duplication) makes use of known circuit motifs in the MOB to which no clear function has previously been attributed.

Sensor scaling. Sensor scaling enables the inclusion of heterogeneous sets of sensors or feature values that may be drawn from different scales of measurement. Based on a small sample of inputs (validation set), this preprocessor estimates the range of values received from each sensor and scales each sensor value accordingly. Because samples cannot be guaranteed to include the full range of values that a sensor may deliver, this step does not comprise idealized scaling, but order-of-magnitude approximate scaling that prevents a subset of inputs from inappropriately dominating network plasticity. To enhance feature value differences, the scaled parameters then are multiplied by an equidimensional vector with values drawn from a uniform distribution between 0.5 and 1.0; once defined, these vector values are a constant attribute of an instantiated network.

Unsupervised intensity normalization. For some input streams, stimulus intensity can interfere with identity. For example, increased concentrations of chemical analytes will nonuniformly increase the responses of array chemosensors, which impairs analyte recognition across concentrations. In the biological system, it has been proposed that multiple coordinated mechanisms serve to reduce the impact of intensity differences (i.e., yielding concentration tolerance, or concentration invariance), with the remaining uncompensated intensity effects being learned as part of the characteristic variance of that stimulus. We adopted this principle, implementing a nonspecific inhibitory feedback mechanism inspired by the deep glomerular layer of the olfactory system and comparable to one previously implemented in neuromorphic hardware. This preprocessor enables the recognition of odorant signatures presented at a range of untrained concentrations, even under few-shot learning conditions. Intensity normalization in the biological system also is required for regulated high-dimensional contrast enhancement, although the latter algorithm was not incorporated into the present simulations.

Heterogeneous duplication. Despite sensor scaling and intensity normalization, the different distributions of activity levels across the array of inputs still could disrupt the performance of the core attractor in the generalized network model, most prominently by recruiting widely divergent numbers of interneurons during learning. To address this problem without resorting to retraining network hyperparameters, we duplicated each input across a number of excitatory feedforward interneurons (e.g., five) and then randomly projected the activity of these interneurons onto a similar number of principal neurons, as previously described herein in conjunction with FIG. 4. Because the number of processing columns of the core learning network is determined by the number of principal neurons, this also expanded the dimensionality of the network. The integration and synaptic properties of both cell types were heterogeneous across the duplicates, drawn randomly from a defined range during network instantiation. This feedforward heterogeneous duplication with random projections regularized the statistical distribution of input levels into a consistent range, enabling a single parameterization of the core network to be effective across a wide range of poorly-behaved inputs.

Interestingly, the need for statistical regularization of afferent input activity has not yet been recognized as a problem in the biological olfactory system. It may be that the biological system is tolerant of statistically diverse inputs via other mechanisms that have yet to be elucidated, but it is nevertheless intriguing that this feedforward projection motif is the dominant mechanism of sensory sampling in the biological MOB. Specifically, convergent primary sensory neurons primarily excite ET cells within a glomerulus (along with inhibitory PG cells), and these ET cells then in turn excite the principal neurons of that glomerulus. This indirect pathway has been shown to be the dominant path of afferent excitation, with direct OSN-to-principal neuron excitation being relegated to a considerably smaller role.

Goodness of preprocessing metric, $g_p$. The preprocessor sequence described above regularized widely diverse input signals into a common statistical distribution to which the core network was optimized. Well-regularized sensory inputs recruit consistent numbers of interneurons into the representation during learning, and activate appropriate interneuron ensembles during testing. To assess the functional adequacy of preprocessing, we developed a goodness of preprocessing metric, $g_p$, as a measure of the consistency of interneuron recruitment efficacy across a heterogeneous range of samples:

$$g_p = \min(\min(v), 1) * \frac{\sum \frac{v_i}{\max(v)}}{dim\,v} \tag{8}$$

where v is an integer vector of interneuron spike counts and dim v denotes the number of samples under consideration. This equation has two factors. First, the no-spike penalty $$\min(\min(v), 1) \tag{9}$$

is zero if any of the stimuli presented fail to activate any interneurons at all; otherwise its value is unity. Second, the interneuron activation similarity index $$\frac{\sum \frac{v_i}{\max(v)}}{dim\,v} \tag{10}$$

reflects the similarity of interneuron recruitment levels across all stimulus presentations (i.e., across multiple different stimuli, potentially also including a range of stimulus intensities or concentrations). These two factors together generate a value of $g_p$ between 0 and 1. A $g_p$ value approaching unity indicates that all test stimuli activate approximately the same nonzero number of interneurons; lower values indicate that different stimuli recruit substantially different numbers of interneurons, or none at all, which may impair the performance of a given core network for some of these stimuli.

The core learning network in these embodiments will now be further described.

The core learning network comprises a recurrent excitatory-inhibitory feedback loop between populations of principal neurons (e.g., MCs) and inhibitory interneurons (e.g., GCs), as illustrated in FIG. 12. Rapid online learning progressively modifies the synaptic weights of this network, generating attractors that correctly classify even highly degraded, noisy inputs, as described elsewhere herein. It should be noted that this feedback loop recruits interneurons during learning; to model similarity, a prerequisite for constructing hierarchical representations, these recruited populations are permitted to overlap in their representation of similar input stimuli. This renders the network more sensitive to the statistics of sensory input, thereby requiring signal conditioning if parameter retuning is to be avoided. As noted above and as illustrated in FIG. 12, to focus on the statistical regularization of sensory inputs to this learning network, we include only the feedforward portion of the core network in the present simulations, reading out regularization and intermediate classification results (i.e., the goodness of preprocessing index $g_p$ and thresholded Hamming distances) directly from the interneuron population. As in the full model described previously, sensor activation levels are represented in principal neurons by a spike phase code with respect to an underlying gamma oscillation, and we use an asymmetric STDP learning rule, referred to herein as a heterogeneous STDP (hSTDP) learning rule, to modify MC-to-GC synaptic weights.

Heterogeneity in model parameters. Heterogeneity is abundant in biology; information is commonly represented in populations of neurons with similar but not identical properties. This is often elided as unavoidable biological variability, but may in fact serve an important computational purpose. For example, recent experimental studies in the retina have shown that the population code exhibited by a heterogeneous ensemble of neurons is considerably more reliable than that of a homogeneous ensemble. To assess and take advantage of this potential, we here incorporate network heterogeneities in three ways:

1. Nonuniform sensor scaling: This process is part of the sensor scaling preprocessor described above, employed to ensure feature value differences among inputs.

2. Heterogeneous duplication: The heterogeneous duplication preprocessor fans out a common input stream to a heterogeneous population of excitatory feedforward interneurons, which then deliver this input to n sister MCs via sparse random projections, as previously described in conjunction with FIG. 4.

3. Model parameter heterogeneities: We assigned variable spiking thresholds to sister MCs and to GC interneurons. These partially redundant MC groups further enabled us to assign a wide range of MC-to-GC synaptic connection densities across the core learning network. Finally, the maximum permitted synaptic weights $w_{max}$ under the STDP rule were heterogeneous; we refer to this overall rule as an hSTDP rule. These heterogeneities render the post-signal conditioning learning network more robust to statistically diverse datasets.

Heterogeneous spike timing-dependent plasticity (hSTDP) rule. Per this learning rule, MC-to-GC excitatory synaptic weights were potentiated when MC spikes preceded GC spikes; otherwise these synapses were depressed. The hSTDP rule parameters $a_p$, $a_m$, $tau_p$, $tau_m$, and $w_{scale}$ were tuned using a synthetic dataset, whereas the distribution of maximum synaptic weights $w_{max}$ was tuned only once using a validation set from Batch 1 of the UCSD chemosensor drift dataset. Training and testing with the additional datasets described herein also used this same instantiated, parameterized network.

Additional aspects of the testing of the present embodiments using experimental datasets will now be described.

The results presented here were generated using a common network with all hyperparameters predetermined except for the number of columns and, in one case, the number of GC interneurons per sensor. The number of processing columns depended directly on the number of sensor inputs provided by the dataset (input data dimensionality) multiplied by the divergence ratio n of the heterogeneous duplication preprocessor (held constant at 5 for all simulations herein; FIG. 4). Excitatory synaptic weights in the core network were plastic, governed by an hSTDP rule with fixed parameters as described above.

UCSD gas sensor drift dataset. We first applied our algorithm to the publicly available UCSD gas sensor drift dataset, modestly reconfigured to assess online learning. The dataset contains 13910 measurements in total, taken from an array of 16 MOS chemosensors exposed to 6 gas-phase odorants presented across a substantial range of concentrations (10-1000 ppmv). It should be noted that these data were gathered in ten batches over the course of three years; owing to sensor drift, the chemosensors' responses to odorants changed drastically over this timescale, presenting a challenge to classification algorithms that model or otherwise compensate for that drift. For the present embodiments, we used data from Batches 1 (sensor age 1-2 months) and 7 (sensor age 21 months). As in previous work, we used only the peak sensor responses (16 out of the available 128 features in the dataset) for training and testing. To better assess online learning, we reconfigured the dataset into six groups corresponding to the six gas types, and trained the network with data from each of these six groups separately, in order. Consequently, each training set comprised 1-10 samples (for 1-shot through 10-shot learning, respectively) of the same odorant, at randomly selected concentrations. After training on each odorant group, we tested all six odorants (at randomly selected concentrations) before proceeding to train the next group in the list, until the network had learned all six odorants. Testing an odorant on which the network had not yet been trained produced the classification result "none of the above"—an important capability for "learning in the wild," wherein many presented odorants would be unfamiliar and should not be forced incorrectly into existing classes. For sensor scaling and parameter tuning for this and all subsequent data sets, we used 10% of the Batch 1 data as a validation set. The six odorant groups, in the order of training, included ammonia (group 1), acetaldehyde (group 2), acetone (group 3), ethylene (group 4), ethanol (group 5), and toluene (group 6).

Forest type spectral mapping dataset. This dataset is designed to identify forest types in Japan using spectral data from ASTER satellite imagery. Each of the 326 samples includes 27 spectral features. We used 10% of the data as a validation set for preprocessor scaling. Because the dataset included negative values, we also, prior to sensor scaling, subtracted the minimum values of each feature (as obtained from the validation set) to render most feature values positive; any remaining negative data points were clipped to zero. To better assess online learning, we split the dataset into 4 groups corresponding to the four forest type classes, and trained with each of these groups in sequence: Sugi (group 1), Hinoki (group 2), Mixed deciduous (group 3), Other (group 4).

Species-specific anuran call dataset. This dataset includes acoustic features (mel frequency cepstral coefficients, MFCCs) extracted from the call syllables of 10 different frog and toad species, recorded in the wild in Brazil and Argentina. The dataset includes 7195 samples, with each sample comprising 22 MFCC features (values between −1 and 1), and exhibits significant class imbalance; i.e., the numbers of samples corresponding to each class (species) differ substantially. To make all data samples positive, we shifted each value by +1 so that each MFCC feature was in the range 0 to 2.

This dataset, uniquely among those tested, also included multilabel, multiclass classification, enabling us to illustrate the algorithm's innate capacity for natural hierarchical representation. Specifically, while training was performed using only species information (10 groups), we also measured the classification of calls into the correct anuran genus and family. Altogether, the 10 species in the dataset comprise 8 anuran genera within 4 families. 10% of the data were retained as a validation set, although these data were not used because the feature range was already known to be between 0 and 2 and hence validation per se was not required. As above, to assess online learning, we split the dataset into 10 groups corresponding to the 10 species, and trained with each in series: *Adenomera andre* (family Leptodactylidae, group 1), *Adenomera hylaedactylus* (family Leptodactylidae, group 2), *Ameerega trivittata* (family Dendrobatidae, group 3), *Hyla minuta* (since reclassified as *Dendropsophus minutus*, family Hylidae, group 4), *Hypsiboas cinerascens* (family Hylidae, group 5), *Hypsiboas cordobae* (family Hylidae, group 6), *Leptodactylus fuscus* (family Leptodactylidae, group 7), *Osteocephalus oophagus* (family Hylidae, group 8), *Rhinella granulosa* (family Bufonidae, group 9), *Scinax ruber* (family Hylidae, group 10).

After training the network with standard heterogeneous parameters, and tuning the $w_{max}$ distribution on the validation set of batch 1 of the UCSD chemosensor drift dataset, we trained the algorithm and tested its performance on three different datasets as described above. Specifically, we measured (1) the goodness of preprocessing ($g_p$) for each dataset, to assess how well the same instantiated, parameterized network would operate across a statistically diverse range of inputs, and (2) an interim estimate of classification performance based on a thresholded Hamming distance between activated ensembles in the interneuron representation, omitting the recurrent feedback loop of the full model, as illustrated in FIG. 12. The latter measure is used in the present embodiments in order to illustrate the importance of signal conditioning, and generally should not be used as a benchmark for the performance of illustrative embodiments of the full algorithm, which classifies signals successfully under high levels of synthetic impulse noise, as previously described herein.

An important feature for present purposes in the FIG. 12 embodiment is the uniformity of interneuron recruitment levels across a statistically diverse set of raw input signals, as assessed by $g_p$. Direct inputs from deployed sensors differ substantially. As the distribution of response amplitudes across a sensor array strongly affects the efficacy of interneuron recruitment in this framework, and interneuron recruitment profiles substantially determine learning and classification performance, input patterns in illustrative embodiments are transformed to exhibit a relatively consistent statistical structure in order to avoid the need to retune network parameters, and hence enable "learning in the wild."

To assess preprocessor efficacy, we first implemented a 16-column network including 16 principal neurons (e.g., MCs) and 3200 inhibitory interneurons (e.g., GCs), and presented this network with Batch 1 data from the UCSD sensor drift dataset. Interneuron recruitment into the active ensemble by these raw sensor inputs (after being linearly scaled by a factor of $5 \times 10^{-5}$) differed substantially among samples and was zero for some lower-concentration samples, resulting in a $g_p$ value of zero. Subsequent preprocessor stages regularize the distribution of input amplitudes and improve interneuron recruitment uniformity as reflected by $g_p$.

Sensor scaling. Heterogeneous sensor arrays require sensor-specific rescaling to a common range so that sensors producing the largest output ranges do not inappropriately dominate network operations. Accordingly, in the first preprocessing step, we scaled both the training set and the test set by the maximum observed sensor responses determined from the 10% validation set of Batch 1 (uniform sensor scaling). We then further scaled all inputs by an equidimensional uniform vector $v_{uni}$, where $v_{uni} \in [0.5, 1.0]$ (nonuniform sensor scaling). Sensor response profiles became more comparable in amplitude, but still exhibit concentration-dependent activation profiles and less uniform interneuron recruitment.

Unsupervised intensity normalization. Distinguishing concentration differences from genuine quality differences in the biological system (concentration tolerance) depends in part on a global inhibitory feedback mechanism instantiated in the MOB glomerular layer. We applied this normalization operation to the output of the sensor scaling preprocessor. The diverse sensor response profiles observed for the same gas types arise from concentration differences; this preprocessor substantially eliminates those within-type differences. Notably, this step removes the need to train the algorithm with multiple concentrations of a given gas type, enabling generalization beyond experience in the concentration domain.

Heterogeneous duplication. In this step, the output of the intensity normalization preprocessor first is projected to a higher dimension in a column-specific manner by duplicating each output onto m feedforward excitatory interneurons with heterogeneous properties and then randomly connecting those interneurons to n principal neurons (e.g., MCs), thereby multiplying the number of columns of the subsequent core learning network by a factor of n (column duplication). In the present simulations, m=n=5 (FIG. 4). After applying this preprocessing step, sensor response distributions become regularized and interneuron recruitment becomes substantially uniform across samples, exhibiting a $g_p$ of 0.94 for Batch 1 data. It should be noted that this transformation occurs in a naturally online manner, without destroying inherent similarity relationships among data samples or reducing test set classification performance.

These sequential preprocessor steps, which we refer to collectively as signal conditioning, ensure that statistically diverse inputs are transformed so as to recruit comparable numbers of interneurons, and consequently can be effectively learned and classified by the same instantiated, parameterized network.

UCSD gas sensor drift. Using these preprocessors, we tested the "learning in the wild" capability of our feedforward learning network, first using Batch 1 data, and then, without changing any network parameters, Batch 7 data. We first trained the network on raw sensor data from Batch 1 using one-shot learning with odorant concentration uncontrolled. In total, the training set constituted 1.35% of the dataset. As noted above, we trained on each group (odorant type) in sequence, testing performance on all six groups at each step (with odorants from untrained groups generating "none of the above" classifications). Unsurprisingly, performance deteriorated after training on two or more groups, with the average accuracy across all training stages being only 35.86%. Following the same training procedure, but using a network incorporating the preprocessors and heterogeneities described above, we obtained a mean classification accuracy of 96.00%.

To assess the effects of heterogeneity per se, we next trained a separate network, using the same parameters and including the three preprocessors, but excluding parameter heterogeneity. Specifically, this exclusion implied:

1. No modulation of sensor scaling parameters by an equidimensional random vector.
2. No heterogeneity in the parameters of feedforward interneurons.
3. No heterogeneity in core learning network parameters.

In this scenario, the average performance across all 6 groups dropped to 89.66%, largely owing to performance reductions in later-trained groups. Because of the generally high performance on Batch 1 data, we did not also analyze performance with multiple-shot learning.

Later batches in the UCSD dataset exhibited responses to odorants that differed sharply from those in earlier batches, owing to gradual sensor contamination and other forms of drift. Because the practical goal of "learning in the wild" is to enable the same instantiated network to operate effectively on statistically diverse datasets, we trained the same network (identical parameters) on these Batch 7 data, which comprise odorant responses from the same sensors as in Batch 1, but following 21 months of sensor degradation. It should be noted that the sequentially applied preprocessors, with heterogeneity, regularized the distribution of sensor input amplitudes to a form consistent with that of the processed Batch 1 data, resulting in a uniform recruitment of interneurons across samples and concentrations.

We trained this network using one-shot learning of randomly selected Batch 7 samples (concentrations uncontrolled), using the same procedures as for Batch 1. As with Batch 1, performance dropped rapidly as additional groups were learned; the average performance across all stages of learning was 42.42%, with a training set comprising 0.17% of the data. After applying the three preprocessors, including heterogeneities, average performance improved to 81.42%. Omitting heterogeneity as above reduced average performance to 77.38%.

We then trained the network using two-shot, five-shot, and 10 shot online learning protocols. Training trials were grouped by odorant identity to demonstrate online learning (i.e., not intercalated); concentrations again were uncontrolled. Classification accuracy improved substantially with the additional training yielding a maximum of 91.10% average accuracy for 10-shot training. The 10-shot training set comprised 1.7% of the Batch 7 data.

Forest type spectral maps. Despite being inspired by the neural circuitry of the MOB, this network was expected to perform comparably well on datasets exhibiting structural properties similar to odorant stimuli: relatively high dimensionalities without low-dimensional structure such as that exhibited by visual images. To demonstrate this, and to test the capacities of our preprocessors to appropriately regularize the statistical structures of non-chemosensory datasets, we tested the same network utilized above on two additional datasets.

We first tested the algorithm's performance on a 27-dimensional dataset of hyperspectral mapping data derived from ASTER satellite imagery, intended to identify four classes of Japanese forest cover. The network was expanded from 16 input dimensions (for the UCSD dataset) to 27 input columns to match dataset dimensionality, and included 200 granule cells per sensor. Despite substantial differences in signal statistics, our preprocessor cascade regularized the input distribution and achieved near-uniform interneuron recruitment.

We trained the network with one shot of each of the four forest types; the training set consequently comprised 0.76% of the data (4 of 523 samples), and the test set comprised 89.24% (463 of 523 samples). The average classification accuracy across all groups was 82.03%. Because of the special status of the "other" group, "other" classifications were pooled with "none of the above" classifications after the network was trained on all four groups. Performance improved after two-, five-, and 10-shot training, reaching 88.39% after ten-shot learning (the training set here comprised 7.65% of the data). When we omitted network heterogeneities, as with the UCSD chemosensory dataset, the average accuracy for one-shot learning dropped from 82.03% to 74.53%.

Species-specific anuran calls. Finally, we also tested the algorithm on an implicitly hierarchical classification task using a dataset derived from a corpus of recordings of vocalizations from ten anuran species. As detailed above, the dataset comprised 22 mel frequency cepstral coefficients describing the acoustic features of these call syllables. We sought to identify the animal species, but also the genus and family, associated with each call. To do this, we deployed a network with hyperparameters identical to those used in prior datasets, with two exceptions. First, the network was necessarily sized for the 22 input dimensions of the dataset. Second, the number of interneurons was expanded to 300 per sensor; this was necessary in order to adequately learn all ten classes without the ANE function of the fully intact network described in conjunction with FIG. 2. As with the earlier datasets, preprocessing yielded a consistent statistical distribution of input amplitudes and a near-uniform recruitment of interneurons.

One-shot online learning of the ten groups (species) in this dataset yielded somewhat poorer classification accuracy than in the previous datasets tested; the accuracy across groups averaged 75.72%, with the training set size comprising just 0.14% of the dataset (10 of 7195 samples). Expanding to two- and five-shot training produced little improvement. However, expansion to 10-shot training improved classification accuracy to 93.25%, with the training set comprising 1.39% of the data (100 of 7195 samples). Removing parameter heterogeneity reduced 10-shot classification performance to 90.54%.

Finally, we assessed classification performance with respect to the eight anuran genera and four families embedding the ten species on which the network was trained. No additional training or network design was performed; output was simply reclassified with respect to these higher cladistic levels. Performance on this classification task largely tracked that of classifying by species, with accuracy increasing substantially given 10-shot training and being modestly impaired by the removal of network heterogeneity. This implicit capacity to respect hierarchical similarity relationships is a substantial benefit of the generalized, similarity-representing variant of this algorithm as described herein.

Some "learning in the wild" embodiments herein illustratively comprise a set of capacities for artificial networks that reflect the performance of biological systems operating in natural environments. Most of the difficult challenges in the "learning in the wild" context arise from a sharply limited ability to regulate the stimuli presented by the external environment, whether in their unpredictable diversity, their interference with one another, or their intrinsic variances. A given illustrative embodiment disclosed herein has one or more of the following advantageous features:

1. Robust to "wild," poorly-matched inputs without resorting to hyperparameter re-tuning.
2. Robust to environmental and stimulus variance, including unpredictable stimulus intensities (e.g., odorant concentrations), other forms of stimulus heterogeneity, and the effects of environmental temperature and humidity.
3. Exhibits concentration tolerance where appropriate, and also provide an estimate of concentration.
4. Robust to missing or noisy sensor data, and to unlabeled training sets.
5. Exhibits rapid, semi-supervised or unsupervised, one- or few-shot learning of novel stimuli.
6. Supports online learning (no catastrophic forgetting, no need to store trained data).
7. Adapts to sensor drift owing to time and/or contamination.
8. Provides a "none of the above" option during classification (classifier confidence).
9. Identifies the signatures of known inputs despite substantial interference from background stimuli (whether previously or simultaneously delivered).

Some embodiments disclosed herein exhibit all or a majority of these advantageous properties. For example, in illustrative embodiments, we have configured the network's rapid learning capabilities to achieve a practical solution to the problem of sensor drift and generalized the algorithm to embed an explicit representation of similarity so as to enable support for hierarchical clustering. A preliminary example of this capacity is illustrated here in the classification of anuran calls with respect to species, genus, and family. This generalized implementation of the algorithm, however, becomes necessarily more sensitive to the statistical structure of sensory inputs. We here have outlined a signal conditioning solution in which wild sensory inputs are regularized by a series of preprocessors modeled on the features and circuits of the MOB glomerular layer. Consequently, a single instantiated network is capable of productively learning and classifying widely heterogeneous sets of input stimuli.

Data normalization in some form is a common procedure in non-SNNs. In some embodiments herein, we implement a data regularization procedure for SNNs that is compatible with rapid learning, localized brain-mimetic computational principles, and "learning in the wild" constraints. Notably, under these constraints, samples may be rare, and batch sizes small, such that aggregate data features such as means and standard deviations are difficult to ascertain. We further ensure that single instantiated networks could effectively learn and classify a wide diversity of datasets. The successive preprocessors described herein transformed four different datasets with different patterns of internal sample diversity into a common statistical form, such that the same network could effectively operate on them all without the need for hyperparameter retuning.

The final preprocessor in the sequence, heterogeneous duplication (FIG. 4), is a statistical regularization algorithm based on the properties of sparse random projections. Interestingly, its implementation closely adheres to an anatomical circuit motif within MOB intraglomerular networks, to which function has yet to be attributed. The need for statistical regularization of input patterns in this way has not yet been recognized in the literature on biological olfaction (except in the specific case of concentration), so it is an interesting possibility that this network motif may present a solution to a previously unrecognized neurophysiological problem.

The simulations described in conjunction with the present embodiments concern the initial preprocessing steps and first feed-forward projection of the biomimetic algorithm (FIG. 12; corresponding to the EPLff component described previously), omitting the dynamical spike timing-based attractor functionality of the full network in favor of a closer examination of preprocessor properties. Accordingly, the metrics of greatest interest are the uniformity of interneuron recruitment and a preliminary estimate of classification performance based on the Hamming distances calculated between interneuronal activation patterns. The latter metric, in particular, should not be confused with the performance of a fully implemented brain-mimetic implementation, of the type described elsewhere herein; obtaining optimized classification accuracy was not the primary purpose of this reduced network. Among other limitations, the Hamming distance metric cannot accommodate the ANE method, by which new interneurons are dynamically added to the network after the fashion of adult neurogenesis in the MOB, as described elsewhere herein, because ANE alters the dimensionality of the space in which the Hamming distance is calculated. Owing to the absence of ANE, the present network's performance begins to drop off as the number of learned stimuli increases. The average performance values, accordingly, are underestimates of the performance of the fully intact network described in conjunction with FIG. 2.

The present embodiments illustrate that a series of preprocessing steps, modeled after particular attributes of the mammalian MOB, successfully conditions statistically diverse input signals from both chemosensory and non-chemosensory sources, such that a single instantiated, parameterized network can rapidly learn and successfully classify these signals. We have termed this robustness to uncontrolled environmental variance "learning in the wild." This is an important capability for field-deployed devices expected to process and identify similarly diverse sensory signatures within unregulated environments. Moreover, as with the intact network described in conjunction with FIG. 2, these preprocessor algorithms were implemented using localized computational and plasticity rules and hence are amenable to implementation on neuromorphic hardware platforms.

It should also be understood that the particular arrangements shown and described in conjunction with FIGS. 1 through 12 are presented by way of illustrative example only, and numerous alternative embodiments are possible. The various embodiments disclosed herein should therefore not be construed as limiting in any way. Numerous alternative arrangements of neuromorphic algorithms can be utilized in other embodiments. Those skilled in the art will also recognize that alternative processing operations and associated system entity configurations can be used in other embodiments.

It is therefore possible that other embodiments may include additional or alternative system elements, relative to the entities of the illustrative embodiments. Accordingly, the particular system configurations and associated algorithm implementations can be varied in other embodiments.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a neuromorphic processor, a microprocessor, an ASIC, an FPGA, a CPU, an ALU, a GPU, a DSP, or other similar processing device component, as well as other types and arrangements of processing circuitry, in any combination. For example, a given processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with implementation of a neuromorphic algorithm.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

A given processing platform implementing a neuromorphic algorithm as disclosed herein can alternatively comprise a single processing device, such as a computer, mobile telephone or handheld sensor device, that implements not only the neuromorphic algorithm but also a sensor array and one or more controlled components. It is also possible in some embodiments that one or more such system elements can run on or be otherwise supported by cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. A computer-implemented method of training a neural network to recognize sensory patterns, the method comprising:

obtaining input data utilizing a processor-based data sampling loop;

preprocessing the input data in one or more preprocessors of the neural network;

applying the preprocessed input data to a core portion of the neural network, the core portion of the neural network comprising a plurality of principal neurons and a plurality of interneurons, the core portion of the neural network implementing a processor-based feedback loop between the interneurons and the principal neurons that supports persistent unsupervised differentiation of multiple learned sensory patterns over time;

storing in the core portion of the neural network synaptic weights for interconnections between at least a subset of the principal neurons and at least a subset of the interneurons;

executing multiple cycles of the processor-based feedback loop of the core portion of the neural network for the applied preprocessed input data within each cycle of the processor-based data sampling loop utilized in obtaining the input data;

adjusting at least a portion of the stored synaptic weights in each of the multiple cycles of the processor-based feedback loop as part of a learning process of the core portion of the neural network;

obtaining an output from the core portion of the neural network; and performing at least one automated action based at least in part on the output obtained from the core portion of the neural network;

wherein the neural network comprises a spiking neural network (SNN) configured to provide spike timing for the processor-based feedback loop with inhibition delaying the spike timing and excitation advancing the spike timing, and further wherein the processor-based feedback loop is configured to adapt one or more of the synaptic weights of the core portion of the neural network, and operation of the processor-based feedback loop in adapting one or more of the synaptic weights is controlled based at least in part on spike timing information determined at least in part from relative timing of spikes for at least a portion of the principal neurons and the interneurons; and wherein the method is performed by at least one processing device comprising a processor coupled to a memory.

2. The method of claim 1 wherein at least a subset of the principal neurons of the core portion of the neural network are configured to represent respective mitral cells of an olfactory learning system and at least a subset of the interneurons of the core portion of the neural network are configured to represent respective granule cells of the olfactory learning system.

3. The method of claim 1 further comprising adaptively expanding the neural network by incorporating additional interneurons into to one or more of:

(i) at least one of the one or more preprocessors of the neural network; and (ii) the core portion of the neural network.

4. The method of claim 3 wherein the additional interneurons are incorporated into the core portion of the neural network in a manner that does not disrupt existing learned sensory patterns of the core portion of the neural network.

5. The method of claim 1 wherein obtaining input data comprises obtaining the input data from one or more sensors.

6. The method of claim 1 wherein a given one of the one or more preprocessors of the neural network comprises a plurality of input nodes each adapted to receive input data associated with a different data source.

7. The method of claim 6 wherein the input nodes are adapted to receive input data from respective different sensors.

8. The method of claim 6 wherein the given preprocessor of the neural network comprises a heterogeneous duplication preprocessor configured to statistically regularize diverse sensory inputs of the obtained input data.

9. The method of claim 6 wherein the given preprocessor of the neural network further comprises for a particular one of the input nodes:

a plurality of excitatory feed-forward interneurons each coupled to the particular input node; and a plurality of principal neurons each coupled to one or more of the excitatory feed-forward interneurons.

10. The method of claim 1 wherein the core portion of the neural network comprises a synaptic interaction matrix of the principal neurons and the interneurons in which an n-dimensional representation in the principal neurons is mapped to an m-dimensional representation in the interneurons, where m>>n.

11. The method of claim 1 wherein the neural network further comprises a neuromodulatory dynamic state trajectory configured to adjust neuronal properties systematically and select a particular outcome.

12. The method of claim 1 wherein the neural network further comprises an inference network arranged between the principal neurons and the interneurons and configured to deliver input to the interneurons that influences how the interneurons affect the principal neurons such that the principal neurons thereby exert different effects on the interneurons and the inference network.

13. The method of claim 1 wherein the processor-based feedback loop is configured to control delivery of synaptic inhibition information from the interneurons of the core portion back to the principal neurons of the core portion based at least in part on synaptic excitatory information delivered from the principal neurons to the interneurons.

14. The method of claim 1 wherein the one or more preprocessors of the neural network comprise at least one layer that includes a plurality of neurons of a first type and a plurality of neurons of a second type different than the first type, and further wherein at least a subset of the neurons of the second type are configured to inhibit at least a subset of the neurons of the first type.

15. The method of claim 14 wherein said at least one layer is configured to represent at least one glomerular layer of an olfactory learning system, the neurons of the first type are configured to represent respective external tufted (ET) cells of the olfactory learning system, and the neurons of the second type are configured to represent respective periglomerular (PG) cells of the olfactory learning system.

16. The method of claim 14 wherein the inhibition of at least a subset of the neurons of the first type by at least a subset of the neurons of the second type comprises a graded lateral inhibition.

17. The method of claim 1 wherein the one or more preprocessors of the neural network comprise at least one concentration tolerance preprocessor configured to limit concentration-specific variance in outputs generated in response to respective different instances of input data.

18. The method of claim 1 wherein the one or more preprocessors of the neural network comprise at least one sensor scaling preprocessor configured to rescale outputs of multiple heterogeneous sensors such that corresponding inputs to the core portion of the neural network are statistically similarly scaled.

19. The method of claim 1 further comprising adding one or more neurons to the neural network without disrupting an existing learned pattern obtained through previous training of the neural network.

20. The method of claim 1 wherein the neural network is configured to implement online learning in which one or more new patterns are learned with a size of the neural network dynamically expanded, relative to a previous size of the neural network, without impairing one or more previous learned patterns of the neural network.

21. A system comprising:

at least one processing device comprising a processor coupled to a memory;

the processing device being configured:

to obtain input data utilizing a processor-based data sampling loop;

to preprocess the input data in one or more preprocessors of a neural network;

to apply the preprocessed input data to a core portion of the neural network, the core portion of the neural network comprising a plurality of principal neurons and a plurality of interneurons, the core portion of the neural network implementing a processor-based feedback loop between the interneurons and the principal neurons that supports persistent unsupervised differentiation of multiple learned sensory patterns over time;

to store in the core portion of the neural network synaptic weights for interconnections between at least a subset of the principal neurons and at least a subset of the interneurons;

to execute multiple cycles of the processor-based feedback loop of the core portion of the neural network for the applied preprocessed input data within each cycle of the processor-based data sampling loop utilized in obtaining the input data;

to adjust at least a portion of the stored synaptic weights in each of the multiple cycles of the processor-based feedback loop as part of a learning process of the core portion of the neural network;

to obtain an output from the core portion of the neural network; and to perform at least one automated action based at least in part on the output obtained from the core portion of the neural network;

wherein the neural network comprises a spiking neural network (SNN) configured to provide spike timing for the processor-based feedback loop with inhibition delaying the spike timing and excitation advancing the spike timing, and further wherein the processor-based feedback loop is configured to adapt one or more of the synaptic weights of the core portion of the neural network, and operation of the processor-based feedback loop in adapting one or more of the synaptic weights is controlled based at least in part on spike timing information determined at least in part from relative timing of spikes for at least a portion of the principal neurons and the interneurons.

22. The system of claim 21 wherein the processing device is further configured to adaptively expand the neural network by incorporating additional interneurons into one or more of:

(i) at least one of the one or more preprocessors of the neural network; and (ii) the core portion of the neural network.

23. The system of claim 21 wherein the core portion of the neural network comprises a synaptic interaction matrix of the principal neurons and the interneurons in which an n-dimensional representation in the principal neurons is mapped to an m-dimensional representation in the interneurons, where m>>n.

24. The system of claim 21 wherein at least a subset of the principal neurons of the core portion of the neural network are configured to represent respective mitral cells of an olfactory learning system and at least a subset of the interneurons of the core portion of the neural network are configured to represent respective granule cells of the olfactory learning system.

25. The system of claim 21 wherein the neural network further comprises a neuromodulatory dynamic state trajectory configured to adjust neuronal properties systematically and select a particular outcome.

26. The system of claim 21 wherein the neural network further comprises an inference network arranged between the principal neurons and the interneurons and configured to deliver input to the interneurons that influences how the interneurons affect the principal neurons such that the principal neurons thereby exert different effects on the interneurons and the inference network.

27. The system of claim 21 wherein the processor-based feedback loop is configured to control delivery of synaptic inhibition information from the interneurons of the core portion back to the principal neurons of the core portion based at least in part on synaptic excitatory information delivered from the principal neurons to the interneurons.

28. A computer program product comprising a non-transitory processor-readable storage medium having stored therein program code of one or more software programs, wherein the program code, when executed by at least one processing device comprising a processor coupled to a memory, causes the processing device:

to obtain input data utilizing a processor-based data sampling loop;

to preprocess the input data in one or more preprocessors of a neural network;

to apply the preprocessed input data to a core portion of the neural network, the core portion of the neural network comprising a plurality of principal neurons and a plurality of interneurons, the core portion of the neural network implementing a processor-based feedback loop between the interneurons and the principal neurons that supports persistent unsupervised differentiation of multiple learned sensory patterns over time;

to store in the core portion of the neural network synaptic weights for interconnections between at least a subset of the principal neurons and at least a subset of the interneurons;

to execute multiple cycles of the processor-based feedback loop of the core portion of the neural network for the applied preprocessed input data within each cycle of the processor-based data sampling loop utilized in obtaining the input data;

to adjust at least a portion of the stored synaptic weights in each of the multiple cycles of the processor-based feedback loop as part of a learning process of the core portion of the neural network;

to obtain an output from the core portion of the neural network; and to perform at least one automated action based at least in part on the output obtained from the core portion of the neural network;

wherein the neural network comprises a spiking neural network (SNN) configured to provide spike timing for the processor-based feedback loop with inhibition delaying the spike timing and excitation advancing the spike timing, and further wherein the processor-based feedback loop is configured to adapt one or more of the synaptic weights of the core portion of the neural network, and operation of the processor-based feedback loop in adapting one or more of the synaptic weights is controlled based at least in part on spike timing information determined at least in part from relative timing of spikes for at least a portion of the principal neurons and the interneurons.

29. The computer program product of claim 28 wherein the program code when executed further causes the processing device to adaptively expand the neural network by incorporating additional interneurons into one or more of:

(i) at least one of the one or more preprocessors of the neural network; and (ii) the core portion of the neural network.

30. The computer program product of claim 28 wherein the core portion of the neural network comprises a synaptic interaction matrix of the principal neurons and the interneurons in which an n-dimensional representation in the principal neurons is mapped to an m-dimensional representation in the interneurons, where m>>n.

* * * * *